(12) United States Patent
Patel et al.

(10) Patent No.: US 12,250,953 B2
(45) Date of Patent: Mar. 18, 2025

(54) STRUCTURED PROTEIN ISOLATES AND RELATED METHODS

(71) Applicant: Climax Foods Inc., Berkeley, CA (US)

(72) Inventors: Avinash Singh Patel, Berkeley, CA (US); Daniel Westcott, Berkeley, CA (US); Malgorzata Jakubasch, Berkeley, CA (US); Vivian Jones, Berkeley, CA (US)

(73) Assignee: Climax Foods Inc., Berkeley, CA (US)

( * ) Notice: Subject to any disclaimer, the term of this patent is extended or adjusted under 35 U.S.C. 154(b) by 0 days.

(21) Appl. No.: 18/210,799

(22) Filed: Jun. 16, 2023

(65) Prior Publication Data

US 2023/0404099 A1    Dec. 21, 2023

Related U.S. Application Data

(60) Provisional application No. 63/432,915, filed on Dec. 15, 2022, provisional application No. 63/352,773, filed on Jun. 16, 2022.

(51) Int. Cl.
*A23C 20/02* (2021.01)
*A23J 3/14* (2006.01)

(52) U.S. Cl.
CPC ............... *A23C 20/02* (2013.01); *A23J 3/14* (2013.01)

(58) Field of Classification Search
CPC .................................. A23C 20/02; A23J 3/14
See application file for complete search history.

(56) References Cited

U.S. PATENT DOCUMENTS

| | | | |
|---|---|---|---|
| 4,072,669 A | 2/1978 | Betschart | |
| 4,088,795 A | 5/1978 | Goodnight et al. | |
| 4,285,862 A | 8/1981 | Murray et al. | |
| 4,435,438 A * | 3/1984 | Lehnhardt | A23J 3/14 426/582 |
| 5,844,086 A | 12/1998 | Murray | |
| 6,005,076 A | 12/1999 | Murray | |
| 7,662,922 B2 * | 2/2010 | Logie | C07K 14/415 530/427 |
| 7,794,762 B2 * | 9/2010 | Barker | A23J 1/14 400/439 |
| 8,594,909 B2 | 11/2013 | Koci et al. | |

(Continued)

FOREIGN PATENT DOCUMENTS

| | | |
|---|---|---|
| AU | 2002339797 A1 | 6/2003 |
| CA | 2244398 C | 9/2002 |

(Continued)

OTHER PUBLICATIONS

"Fermentation-induced valorization of side stream blends from oilseed and dairy industry", Ferblend Core Organic Susfood2, https://susfood-db-era.net/main/FERBLEND, downloaded Jan. 4, 2022.

(Continued)

*Primary Examiner* — Stephanie A Cox
(74) *Attorney, Agent, or Firm* — Jeffrey Schox; Diana Lin

(57) ABSTRACT

A food product and/or an ingredient thereof can include: a lipid component, structured protein isolates, and/or any other ingredients. The method for forming structured protein isolates can include: obtaining protein isolate units from a protein source, and collecting the structured protein isolates.

16 Claims, 72 Drawing Sheets

(56) References Cited

U.S. PATENT DOCUMENTS

| | | | |
|---|---|---|---|
| 9,011,949 | B2 | 4/2015 | Brown et al. |
| 2003/0054087 | A1* | 3/2003 | Monagle .............. A23L 33/185 426/656 |
| 2003/0109679 | A1* | 6/2003 | Green ..................... A23J 3/14 530/370 |
| 2004/0254353 | A1 | 12/2004 | Barker et al. |
| 2005/0165220 | A1* | 7/2005 | Barker .................... A23J 3/14 530/377 |
| 2007/0207244 | A1* | 9/2007 | Crank ..................... A23J 1/14 426/489 |
| 2010/0047389 | A1 | 2/2010 | Yura et al. |
| 2010/0209994 | A1 | 8/2010 | Liu et al. |
| 2012/0276265 | A1 | 11/2012 | Crank |
| 2015/0250205 | A1* | 9/2015 | Knowlton ............ A23K 20/147 426/598 |
| 2017/0238590 | A1* | 8/2017 | Bansal-Mutalik ...... A23J 1/148 |
| 2018/0213818 | A1 | 8/2018 | Schweizer et al. |
| 2019/0307149 | A1* | 10/2019 | Willemsen .............. A23L 11/30 |
| 2020/0037632 | A1 | 2/2020 | Schmitt et al. |
| 2020/0138055 | A1 | 5/2020 | Schein |
| 2020/0236966 | A1 | 7/2020 | Riihinen et al. |
| 2020/0352195 | A1* | 11/2020 | Bansal-Mutalik ...... A23L 11/40 |
| 2021/0045400 | A1 | 2/2021 | Bowman et al. |
| 2021/0106018 | A1 | 4/2021 | Iruthayathasan et al. |
| 2022/0053808 | A1 | 2/2022 | Randolph |
| 2022/0225628 | A1 | 7/2022 | Bowman et al. |
| 2023/0000100 | A1 | 1/2023 | Zahn et al. |
| 2023/0000106 | A1 | 1/2023 | Zahn et al. |
| 2023/0320378 | A1* | 10/2023 | Ellis .......................... A23J 1/14 |

FOREIGN PATENT DOCUMENTS

| | | |
|---|---|---|
| CN | 101448409 B | 1/2012 |
| CN | 108977393 B | 11/2021 |
| EP | 3620059 B1 | 12/2020 |
| JP | 2016202163 A | 12/2016 |
| WO | 2017171601 A1 | 10/2017 |
| WO | 2018191629 A1 | 10/2018 |
| WO | 2021113985 A1 | 6/2021 |
| WO | 2022109130 A1 | 5/2022 |

OTHER PUBLICATIONS

Ancuta, Petraru, et al., "Oil-Press Cakes and Meals Valorization through Circular Economy Approaches: A Review", Apps. Sci. 2020, 10, 7432; doi: 10.3390/app10217432, www.mdpi.com/journal/applsci.

Beuchat, L.R., "Fungal fermentation of peanut press cake", Economic Botany 30, Article No. 227 (1976).

Dan, Tong, et al., "Profiles of Volatile Flavor Compounds in Milk Fermented with Different Proportional Combinations of Lactobacillus delbrueckii subs. bulgaricus and *Streptococcus* thermophilus", Molecules 2017, 22, 1633.

Day, Adrienne, "How one man's philosophy of data and food science could help save the planet", Grist.org, Nov. 10, 2020.

Dube, Mark, et al., "Texturisation and modification of vegetable proteins for food applications using microbial transglutaminase", Eur. Food. Res. Technol (2007) 225:287-299.

Ismond, M.A.H., et al., "Formation and Interaction of Plant Protein Micelles in Food Systems", Interactions of Food Proteins, Chapter 7, pp. 91-103, ACS Symposium Series; American Chemical Society: Washington, D.C. 1991.

Nicosia, Fabrizio Domenico, et al., "Plant Milk-Clotting Enzymes for Cheesemaking", Foods 2022, 11, 871, https://www.mdpi.com/2304-8158/11/6/871/htm.

Orsavova, Jana, et al., "Fatty Acids Composition of Vegetable Oils and Its Contribution to Dietary Energy Intake and Dependence of Cardiovascular Mortality on Dietary Intake of Fatty Acids", Int. J. Mol. Sci. 2015, 16, 12871-12890.

Pour-El, Akiva, "Protein Functionality: Classification, Definition, and Methodology", ACS Symposium Series; American Chemical Society: Washington, D.C. 1981.

Shiebar, Jonathan, "Founded by an Impossible Foods and Google data scientist, Climax Foods raises $7.5 million to tackle the cheesiest market", Techcrunch, Sep. 1, 2020.

Wang, Qingling, et al., "Processing, Nutrition, and Functionality of Hempseed Protein: A Review", Comprehensive Reviews in Food Science and Food Safety, vol. 18, 2019.

Watson, Elaine, "Climax Foods raises $7.5m: 'We want to replace animals as inefficient factories for converting plants into meat and dairy'", FoodNavigator-usa.com, Sep. 2, 2020.

Watson, Elaine, "Four emerging plant proteins to watch: Pongamia, hemp, barley, and chickpea", Food Navigator, Apr. 8, 2022, https://www.foodnavigator-usa.com/Article/2022/04/08/Four-emerging-plant-proteins-to-watch-Pongamia-hemp-barley-and-chickpea.

Arntfield, S.D., et al., "The Fate of Antinutritional Factors During the Preparation of a Fababean Protein Isolate Using a Micellization Technique", Can. Inst. Food Sci. Technol. J . vol. 81 No. 2, pp. 137-143, 1985.

Fang, Baochen, et al., "Structural, functional properties, and volatile profile of hemp protein isolate as affected by extraction method: Alkaline extraction-isoelectric precipitation vs salt extraction", Food Chemistry, vol. 405, Part B, Mar. 30, 2023, 135001.

HadnaÐev, Miroslav S., et al., "Progress in Vegetable Proteins Isolation Techniques: A Review", Food and Feed Research, 44 (1), 11-21, 2017.

Sun, Xin, et al., "Identification and Characterization of the Seed Storage Proteins and Related Genes of Cannabis sativa L.", Front. Nutr. 8:678421. doi: 10.3389/fnut.2021.678421, published Jun. 7, 2021.

Arrutia, Fátima, et al., "Oilseeds beyond oil: Press cakes and meals supplying global protein requirements", Trends in Food Science &Technology 10 (2020) 88-102.

De Al Cruz-Torres, Luis F., et al., "Physicochemical and functional properties of 11S globulin from chan (Hyptis suaveolens L. poit) seeds", Journal of Cereal Science 7 (2017) 66-72.

* cited by examiner

Product A

Product B

Product C

Product D

Product E

Product F

Product G

Commercial plant-based cheese

Dairy cheese

Product A  Product B  Product C  Product D  Product E

Product F  Product G  Commercial plant-based cheese  Dairy cheese

Product H

Product I

Product J

Product K

| Product | Initial G' (Pa) | Final G' (Pa) | Delta G' (Pa) | G' Recovery (%) |
|---|---|---|---|---|
| Product M | 4352 | 3992 | 360 | 91.73 |
| Product N | 4191 | 3165 | 1026 | 75.52 |
| Product O | 2028 | 857 | 1171 | 42.26 |

STRUCTURED PROTEIN ISOLATES AND RELATED METHODS

CROSS-REFERENCE TO RELATED APPLICATIONS

This application claims the benefit of US Provisional Application No. 63/352,773 filed 16 Jun. 2022 and U.S. Provisional Application No. 63/432,915 filed 15 Dec. 2022, each of which are incorporated in its entirety by this reference.

This application is related to U.S. application Ser. No. 17/857,871 filed 5 Jul. 2022, which is incorporated in its entirety by this reference.

TECHNICAL FIELD

This invention relates generally to the food science field, and more specifically to a new and useful system and method in the food science field.

DETAILED DESCRIPTION

The following description of the embodiments of the invention is not intended to limit the invention to these embodiments, but rather to enable any person skilled in the art to make and use this invention.

1. Overview

Figure 1:
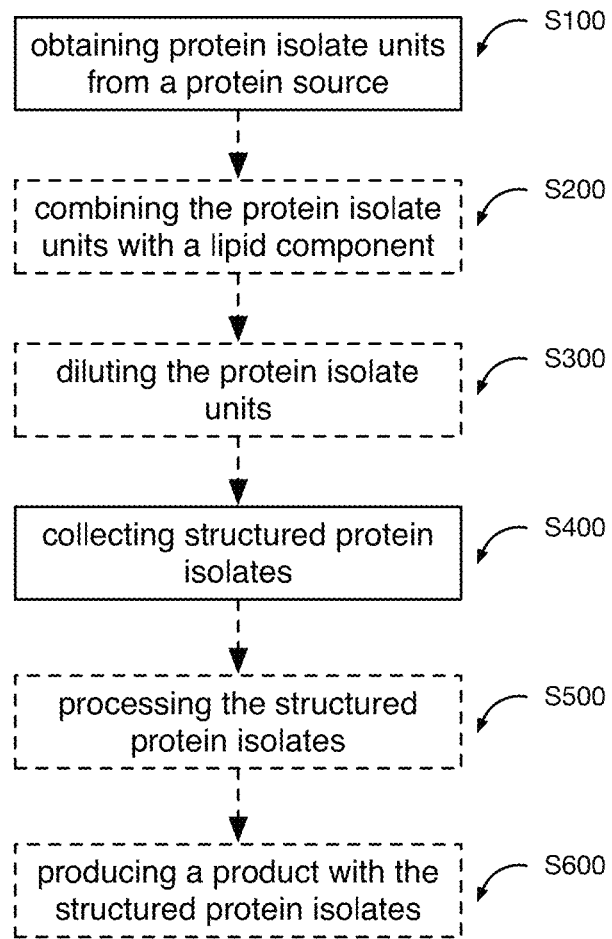
FIG. 1 is a schematic representation of a variant of the method.

As shown in FIG. 1, the method can include: obtaining protein isolate units from a protein source S100, and collecting structured protein isolates S400. However, the method can additionally or alternatively include any other suitable steps.

In variants, the method can function to produce: a food product with target characteristics (e.g., stretchy and/or meltable characteristics), a replacement (e.g., analog) for a target food product, an ingredient used to manufacture a food product, and/or any other product.

2. Examples

In a first example, the method includes: obtaining a protein isolate solution (e.g., containing protein isolate units) from a protein source (e.g., plant matter); diluting the protein isolate solution using water, an antisolvent, and/or any other diluent; separating an insoluble fraction from the diluted protein isolate solution (e.g., sedimentation, precipitation, fractionation, etc.); and collecting structured protein isolates (e.g., aggregates of structured protein isolates) from the insoluble fraction (e.g., collecting the insoluble fraction as an ingredient, wherein the insoluble fraction includes the structured protein isolates). In a second example, the method includes: obtaining a protein isolate solution from a protein source; mixing (e.g., emulsifying) the protein isolate solution with a lipid component to form a protein isolate mixture (e.g., oil-water emulsion); diluting the protein isolate mixture (e.g., a mixture containing protein isolates and lipids); separating an insoluble fraction from the diluted protein isolate mixture (e.g., fractionation of an insoluble fraction, wherein the insoluble fraction includes structured protein isolates); and collecting structured protein isolates from the insoluble fraction. In a third example, the method includes: obtaining a protein isolate solution from a protein source; diluting the protein isolate solution using a diluent containing an aqueous solution mixed (e.g., emulsified) with a lipid component; separating an insoluble fraction from the diluted protein isolate solution; and collecting structured protein isolates from the insoluble fraction.

The collected structured protein isolates can optionally be used to produce a food product (e.g., a plant-based food product). In a first example, the collected structured protein isolates can be combined with an aqueous component (e.g., water with gelation additives), a lipid component, and/or other ingredients, and processed (e.g., emulsified) to form a structured protein isolate emulsion. The structured protein isolate emulsion can be heated (e.g., below the denaturation point of the proteins) and molded to form a gel. The gel can be the food product (e.g., a fresh cheese replicate) and/or be further processed to produce the food product. In a second example, the collected structured protein isolates can be combined with an aqueous component, a lipid component, microbial cultures (e.g., cheese cultures), and/or any other ingredients, and processed (e.g., emulsified) to form a structured protein isolate emulsion. The emulsion can be gelled, fermented, and/or otherwise processed to produce the food product (e.g., an aged cheese replicate). In a third example, the collected structured protein isolates are used as an ingredient in a food product (e.g., dairy or animal protein alternatives).

3. Technical Advantages

Variants of the technology can confer one or more advantages over conventional technologies.

In contrast to certain dairy proteins, plant-based proteins denature and form new bonds (e.g., across an entire substrate; form cross-links; etc.) when exposed to heat, resulting in an isotropically connected gel, which can limit stretch and melt. Variants of the technology can enable meltable, stretchy products (e.g., food products) to be made using plant-based proteins.

First, variants of the technology can enable a mixture of proteins, water, and lipid components to exhibit dairy-like stretch and/or melt characteristics when heated. In an example, a plant-based protein solution, including structured protein isolates (SPIs) suspended in water, can be mixed (e.g., emulsified) with a lipid component, wherein the mixture melts and/or forms a stretchable matrix upon heating. In another example, stretch and/or melt characteristics can be enabled by the SPIs themselves (e.g., without the lipid component). In variants, stretch and/or melt characteristics can be produced without animal-derived products (e.g., animal proteins) and/or without soy derivatives.

Second, variants of the technology can reduce or eliminate the percentage of carbohydrates (e.g., gums, starches, etc.) used in a plant-based food alternative while maintaining desirable stretch and/or melt characteristics. This can enable the plant-based food alternative to have a nutritional profile (e.g., including high protein content) more closely aligned with a target food (e.g., a dairy food product).

Third, variants of the technology can induce gelation (e.g., curd formation) in a plant-based product. The resultant gel can be used directly as a food product and/or be used as a component in a food product. In a specific example, this resultant gel can include a solution of SPIs, wherein the SPI solution is at a target pH (e.g., a basic pH, an acidic pH, etc.) and/or a target protein concentration. The resultant gel can be used as a cheese (e.g., a shreddable cheese, a stretchy cheese, a meltable cheese, etc.).

Figure 12:
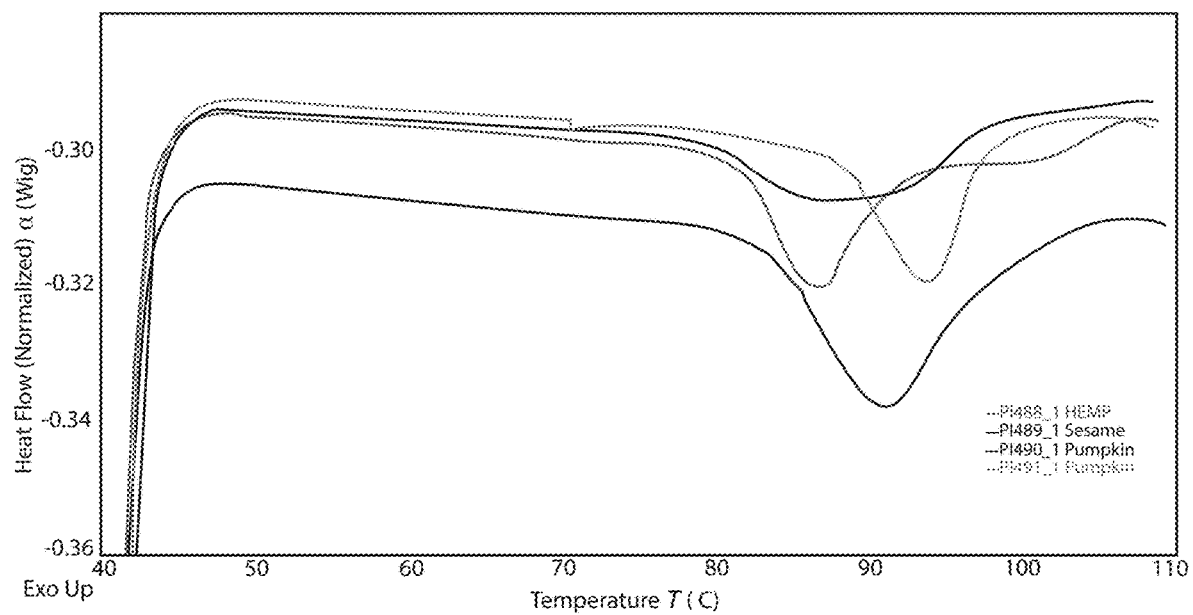
FIG. 12 depicts an example of differential scanning calorimeter results (e.g., measuring melt profiles) for products manufactured using SPIs derived from hemp, sesame, pumpkin, and watermelon protein sources.

Fourth, variants of the technology can produce a product with unexpected characteristics. In a first example, a mixture (e.g., a heated gel, an unheated gel, etc.) of SPIs and a lipid component can result in unexpected stretch characteristics; examples are shown in FIG. 8A, FIG. 8B, FIG. 8C, FIG. 10A, FIG. 10B, FIG. 22, FIG. 23A, FIG. 23B, FIG. 23C, FIG. 25A, FIG. 25B, FIG. 25C, FIG. 25D, and FIG. 25E. In a second example, a mixture of SPIs and a lipid component can result in unexpected melt characteristics; examples are shown in FIG. 9A, FIG. 9B, FIG. 21, FIG. 23A, FIG. 23D, FIG. 24, and FIG. 25A. In a third example, a mixture of SPIs and a lipid component can result in unexpected protein unfolding and/or denaturation behavior (e.g., associated with gelation behavior); an example is shown in FIG. 12.

Fifth, variants of the technology can include forming SPIs in the presence of lipids, which can result in SPIs and/or SPI aggregates (e.g., an SPI structure and/or SPI aggregate structure) that can have increased, stable interactions with lipids. For example, lipids can be trapped within the SPIs and/or SPI aggregates. In specific examples, these lipid interactions can facilitate stretch and/or melt characteristics by enabling 'sliding' between SPIs and/or SPI aggregates. These interactions can support a cohesive gel that includes a lipid component, wherein the gel has improved stretch and/or melt characteristics.

Fifth, conventional methods of isolating proteins can denature the proteins. In particular, isoelectric precipitation methods can denature all or a portion of the isolated proteins. Variants of the technology can include forming SPIs without denaturing the constituent proteins and/or by denaturing less than a threshold proportion (e.g., 10%, 5%, 2%, 1%, etc.) of the constituent proteins. In examples, this can increase the stretch, melt, and/or other characteristics of products produced using the SPIs. In a specific example, SPIs formed without denaturing constituent proteins can interact with other SPIs without forming bonds (e.g., covalent bonds) between the SPIs; this can facilitate stretch and/or melt.

However, further advantages can be provided by the system and method disclosed herein.

4. Method

As shown in FIG. 1, the method can include: obtaining protein isolate units from a protein source S100, and collecting structured protein isolates S400. The method can optionally include combining the protein isolate units with a lipid component S200, diluting the protein isolate units S300, processing the structured protein isolates S500, producing a product with the structured protein isolates S600, and/or any other suitable steps.

All or portions of the method can be performed iteratively, concurrently, asynchronously, periodically, during food manufacturing, and/or at any other suitable time. All or portions of the method can be performed automatically, manually, semi-automatically, and/or otherwise performed.

In examples, the method can include systems and/or methods as described in U.S. application Ser. No. 17/857, 871, filed 5 Jul. 2022, which is incorporated in its entirety by this reference.

All or portions of the method can be performed without denaturing proteins (e.g., protein isolate units) and/or by denaturing less than a percentage of proteins within a sample (e.g., within a protein source, protein source solution, protein isolate mixture, structured protein isolates, structured protein isolate mixture, product, any other sample, etc.). For example, the sample is preferably formed and/or processed such that less than a threshold percentage of proteins within the sample are denatured, but can alternatively be otherwise formed and/or processed. The threshold percentage of the proteins can be between 0.01%-50% or any range or value therebetween (e.g., 0.05%, 1%, 2%, 5%, 10%, 15%, 20%, 25%, etc.), but can alternatively be less than 0.01% or greater than 50%. In a first specific example, the sample is exposed to pH levels during formation and/or processing that are below a first pH threshold (e.g., an acid-induced denaturation threshold) and/or above a second pH threshold (e.g., a base-induced denaturation threshold). The first pH threshold can be between 2-6.5 or any range or value therebetween (e.g., 3, 4, 5, 6, etc.), but can alternatively be less than 2 or greater than 6.5. The second pH threshold can be between 7.5-12 or any range or value therebetween (e.g., 8, 9, 10, 11, etc.), but can alternatively be less than 7.5 or greater than 12. In a second specific example, the sample is exposed to temperatures during formation and/or processing that are below a temperature threshold (e.g., a thermal denaturation threshold). The temperature threshold can be between 60° C.-100° C. or any range or value therebetween (e.g., 70° C., 75° C., 80° C., 85° C., 90° C., etc.), but can alternatively be less than or greater than 100° C. The sample can optionally be exposed to temperatures above the temperature threshold for below a threshold period of time (e.g., 1 s, 2 s, 5 s, 10 s, 15 s, 30 s, 1 min, 5 min, 10 min, 30 min, 1 hr, any range or value therebetween, etc.). In a third specific example, the sample is exposed to salt concentration levels during formation and/or processing that are below a salt concentration threshold. The salt concentration threshold can be between 0.1 M-5M or any range or value therebetween (e.g., 0.1M-1M, 0.8M-0.9M, etc.), but can alternatively be less than 0.1 M or greater than 5M. The salt concentration threshold can optionally depend on the pH of the sample. The salt concentration threshold can optionally be associated with a conductivity threshold between 100 millisiemens-25,000 millisiemens or any range or value therebetween, but can alternatively be less than 100 millisiemens or greater than 25,000 millisiemens. The denaturation thresholds (first and/or second pH threshold, temperature threshold, exposure time threshold, salt concentration threshold, etc.) can optionally be determined based on the protein type.

The method can be used with one or more sources (e.g., substrates) and/or source components (e.g., a part of the source), wherein proteins and/or other ingredients can be derived from the sources and/or source components. Examples of sources include: plant matter (e.g., processed and/or unprocessed plant matter), animal matter (e.g., milk such as cow milk, insects such as *Acheta domesticus*, meat, etc.), non-animal matter, fungi matter, algal matter, seaweed matter, microbial matter (e.g., bacterium), any organism, a food product, a naturally-occurring source, a synthetic source, dairy sources, non-dairy sources, and/or any other source. Examples of source components include: a nut, fruit, seed, legumes, stem, leaves, root, flower, stamen, muscle, carapace, and/or any other component of the associated source. The source can be dry or in solution. The source can be processed (e.g., lipid-removal including defatting, mechanical processing, chemical processing, extraction, fermentation, protein modifications, filtration, enriching, and/or any other processing) and/or unprocessed. In a specific example, the source can be in a ground and/or powdered form. In another specific example, the source can be an oilseed cake. A source can optionally be a protein source (e.g., a source from which proteins can be extracted). In a specific example, the protein source can be an enriched protein source. The protein source can optionally have a protein concentration greater than a threshold percentage, wherein the threshold percentage can be between 5%-90% or any range or value therebetween (e.g., 10%, 20%, 30%, 40%, 50%, 60%, 70%, etc.), but can alternatively be less than 5% or greater than 90%. The source can be a whole ingredient (e.g., in or close to their natural state), processed ingredient (e.g., includes additives or other ingredients, etc.), and/or be any other suitable source.

Plant matter can include: peas (e.g., pea flour, pea starch, etc.), rice (e.g., rice flour, glutinous rice flour, white rice flour, brown rice flour, etc.), fruits, cassava (e.g., cassava flour), potato, cocoa beans, truffles, olives, coconut flesh, grape pomace, pumpkin (e.g., pumpkin seed), cottonseed, canola, sunflower (e.g., sunflower seed), pistachio, almond, walnut, crude walnut, cashew, brazil nuts, hazelnut, macadamia nuts, pecan, peanut, hemp, hops, hackberries (e.g., *celtis*), oat, rice, poppy, watermelon (e.g., watermelon seed), chestnut, chia, flax, quinoa, soybean, split mung beans, aquafaba, lupini, fenugreek, kiwi, Sichuan pepper, mustard, sesame, algae, duckweeds (e.g., lemna), squash, chickpeas, pine nuts, citrus (e.g., citrus fiber), fava bean (e.g., fava bean flower), grape (e.g., grape pomace), lima bean (e.g., lima bean paste), corn (e.g., zein from corn), carrageenan (e.g., Kappa carrageenan); plants selected from the *cucurbita, anacardium, cannabis, salvia, arachis, brassica, sesamun, legume*, and/or other genuses; plants selected from the Anacardiaceae, Asteraceae, Leguminosae, Cucurbits, Rosaceae, Lamiaceae, and/or other family; a combination thereof, and/or any other plant matter. The plant matter may include major production oilseeds (e.g., soybean, rapeseed, sunflower, sesame, niger, castor, canola, cottonseed, etc.), minor production oilseeds (coconut, palm seed, pumpkin, etc.), and/or other crops or plant matter. The plant matter may include a single variety of plant matter, a mixture of various plant matter, include animal matter (e.g., insect matter, mammalian products, etc.), and/or include matter from any other source.

The method can be used with one or more lipid components (e.g., fat, oil, butter, any lipid, etc.). Lipid components are preferably derived from one or more plant sources (e.g., plant matter), but can alternatively be derived from animal sources (e.g., dairy butter, lard, tallow, insect fats, etc.) and/or any other source. A lipid component is preferably a triglyceride, but can alternatively be a monoglyceride, diglyceride, free fatty acids, phospholipid, and/or any other lipid. Lipid components can be saturated, unsaturated (e.g., monounsaturated, polyunsaturated, etc.), and/or have any other classification. In specific examples, to ensure the chemical stability of monounsaturated and/or polyunsaturated lipids (e.g., during storage, cooking, etc.), natural antioxidants (e.g., tocopherols, ascorbic acid, carotenoids, flavonoids, amino acids, phospholipids, sterols, etc.) and/or synthetic antioxidants (e.g., BHT) can optionally be used. Lipid components can be liquid at a target temperature (e.g., room temperature), solid at a target temperature, and/or be any other state of matter. Examples of lipid components include fats and/or oils from: avocado, mustard, coconut, palm, palm fruit, palm fruit stearin, peanut, canola, cocoa, grapeseed, olive, rice bran, safflower, sesame, sunflower, soybean, pumpkin (e.g., pumpkin seed), kokum, shea, mango, hemp, vegetable, any neutral lipid, a synthetic lipid, any combination thereof, no or less than a threshold percentage of a lipid type (e.g., canola fats), and/or any other lipid. The lipid component may include a combination of lipid components (e.g., a blend). In a first example, a blend of lipids that are solid at room temperature (e.g., fats) and lipids that are liquid at room temperature (e.g., oils) can be used. In a second example a blend of different varieties of plant-based lipids, a blend of different varieties of animal-based lipids, and/or a blend of plant- and animal-based lipids may be used. Optionally, the lipid component can be selected, modified, and/or otherwise processed such that the lipid component is stable at room temperature and/or has a melt property profile that matches a target melt property profile (e.g., for a target product). Lipid component modifications include interesterification, refining, clarifying, fractionating, adjusting saturation, adjusting lipid crystalline structure, adjusting chain length, adjusting melt point, adjusting smoke point, and/or modifications.

The method can optionally be used with phospholipids. Phospholipids can include lecithin, phosphatidylcholine, phosphatidylethanolamine, phosphatidylinositol, phosphatidylserine, and/or any other phospholipid or combination thereof. Phospholipids are preferably derived from one or more plant sources, but can additionally or alternatively be derived from animal sources and/or any other source. In a specific example, the lipid component includes phospholipids (e.g., wherein the lipid component in all or parts of the method refers to a mixture of lipids and phospholipids).

The method can be used with one or more protein isolate units. Protein isolate units can include: globulins (e.g., 2S globulins, 11S globulins, 7S globulins, conglutin, napin, sfa, edestin, amandin, concanvalin, vicilin, legumin, cruciferin, helianthinin, etc.), pseudoglobulins, globular proteins, prolamins, albumins, gluten, conjugated proteins (e.g., lipoprotein, mucoprotein, etc.), other storage proteins (e.g., albumin, prolamin, gluten, etc.), animal proteins (e.g., casein, insect proteins, etc.), and/or any other suitable protein or combination thereof. In a specific example, the proteins (e.g., in a protein source) include edestin proteins (e.g., about 75%-80%), vicilin proteins (e.g., about 20%-25%), and other proteins (e.g., about 0%-5%). In another specific example, the proteins (e.g., in a protein source) include globulins (about 65%-75%), albumins (about 25%-37%), and sulfur-rich proteins. However, the protein isolate units can include any other suitable composition of proteins. The protein isolate units can include casein proteins, non-casein proteins, mammalian proteins, non-mammalian proteins, animal proteins, non-animal proteins, and/or any other proteins or combination thereof. In a specific example, protein isolate units can include allergen proteins (e.g., soy proteins, wheat proteins, etc.), casein, mammalian, and/or animal proteins below a threshold amount, wherein the threshold amount can be between 0.1%-10% or any range or value therebetween (e.g., 10%, 5%, 3%, 2%, 1%, 0.1%, etc.), but can alternatively be greater than 10% or less than 0.1% (e.g., 0%).

The protein isolate units can be or include protein monomers arranged in an oligomeric complex and/or have any other quaternary structure. For example, the protein isolate units can include hexamers (e.g., stacked trimers). The protein isolate units preferably have both hydrophilic and hydrophobic regions, but alternatively can have mostly or entirely hydrophilic or hydrophobic regions (e.g., multiple hydrophilic regions with differing degrees of hydrophilicity, regions with similar hydrophilicity/hydrophobicity, etc.). The diameter of the protein isolate unit can be between 5 nm-500 nm or any range or value therebetween (e.g., 10 nm-50 nm, 50 nm-200 nm, 100 nm-200 nm, greater than 50 nm, less than 200 nm, etc.), but can alternatively be less than 5 nm or greater than 500 nm. The thickness of the protein isolate unit can be between 5 nm-500 nm or any range or value therebetween (e.g., 10 nm-50 nm, 50 nm-200 nm, 100 nm-200 nm, greater than 50 nm, less than 200 nm, etc.), but can alternatively be less than 5 nm or greater than 500 nm. Shapes of protein isolates can be spherical, fractal, fibrillar, and/or any regular and/or irregular shapes. Protein isolates can optionally have homo or heterogeneous size distribution and shapes. One or more ingredients (e.g., lipid component, aqueous component, salt, mineral, etc.) can optionally be bonded to the protein isolate unit, located (e.g., trapped) within the protein isolate unit (e.g., within the oligomeric complex), located outside (e.g., surrounding) the protein isolate unit, and/or otherwise associated with the protein isolate unit. Protein isolate units are preferably extracted and/or otherwise obtained via S100 methods, but can additionally or alternatively be otherwise obtained. Protein isolate units can optionally be located within a protein isolate mixture. The protein isolate mixture can include protein isolate units and one or more other ingredients (e.g., an aqueous component, a lipid component, etc.). In a specific example, the protein isolate mixture is a protein isolate solution (e.g., including protein isolate units, an aqueous or non-aqueous liquid, and/or any other ingredient).

Figure 5A:
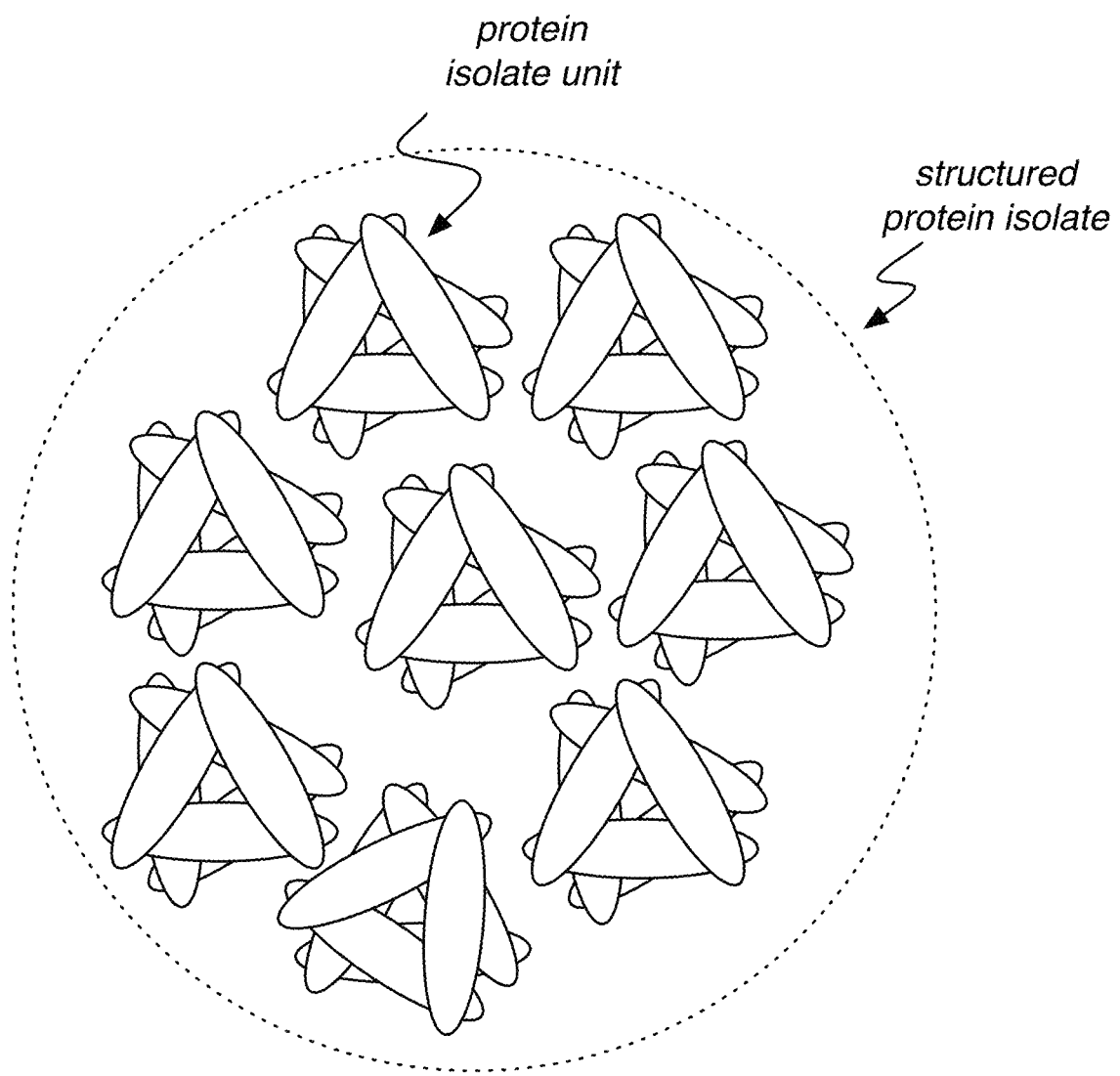
FIGS. 5A, 5B, 5C, and 5D depict schematic examples of a cross-section of a structured protein isolate (SPI).
Figure 5B:
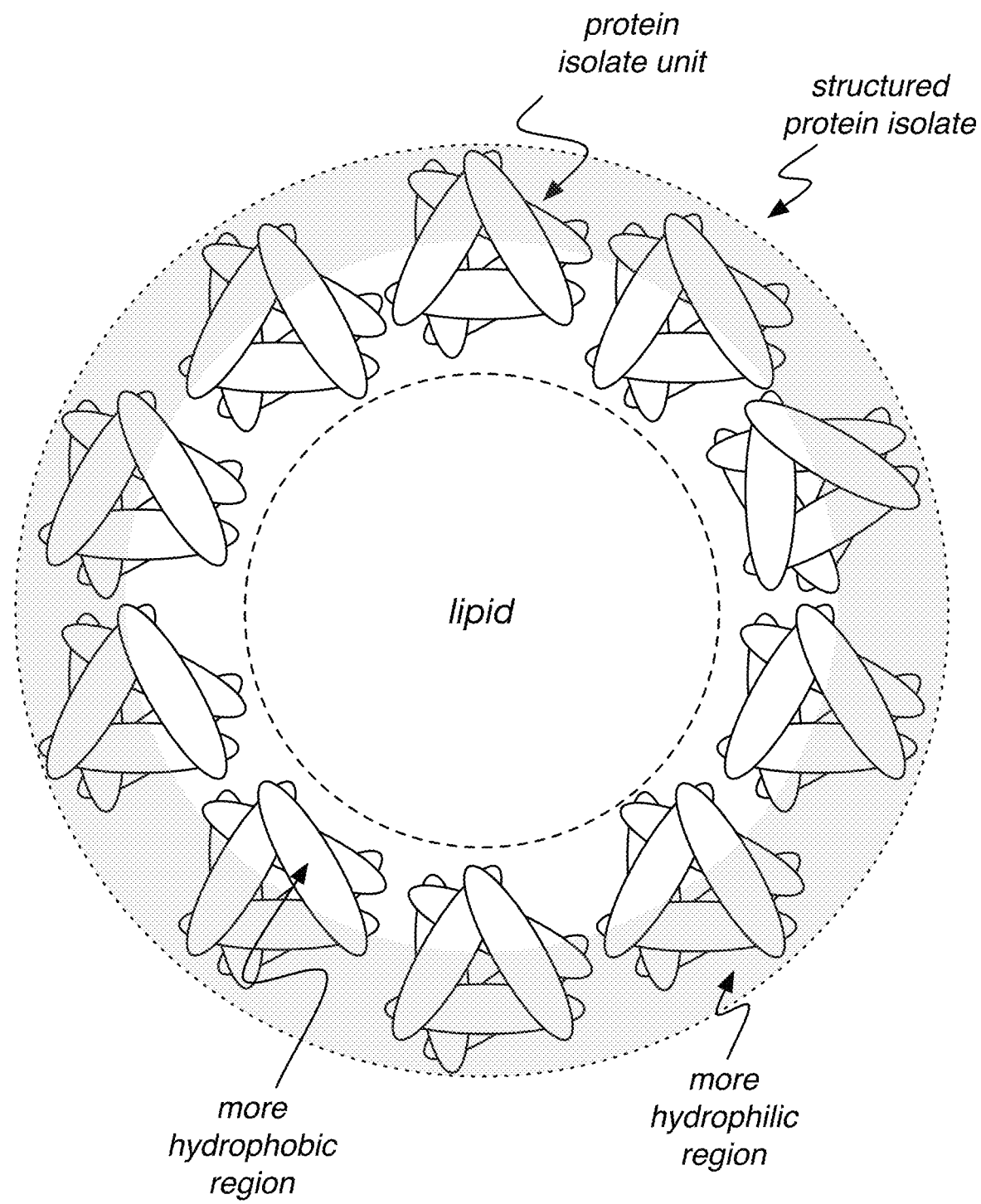
Figure 5C:
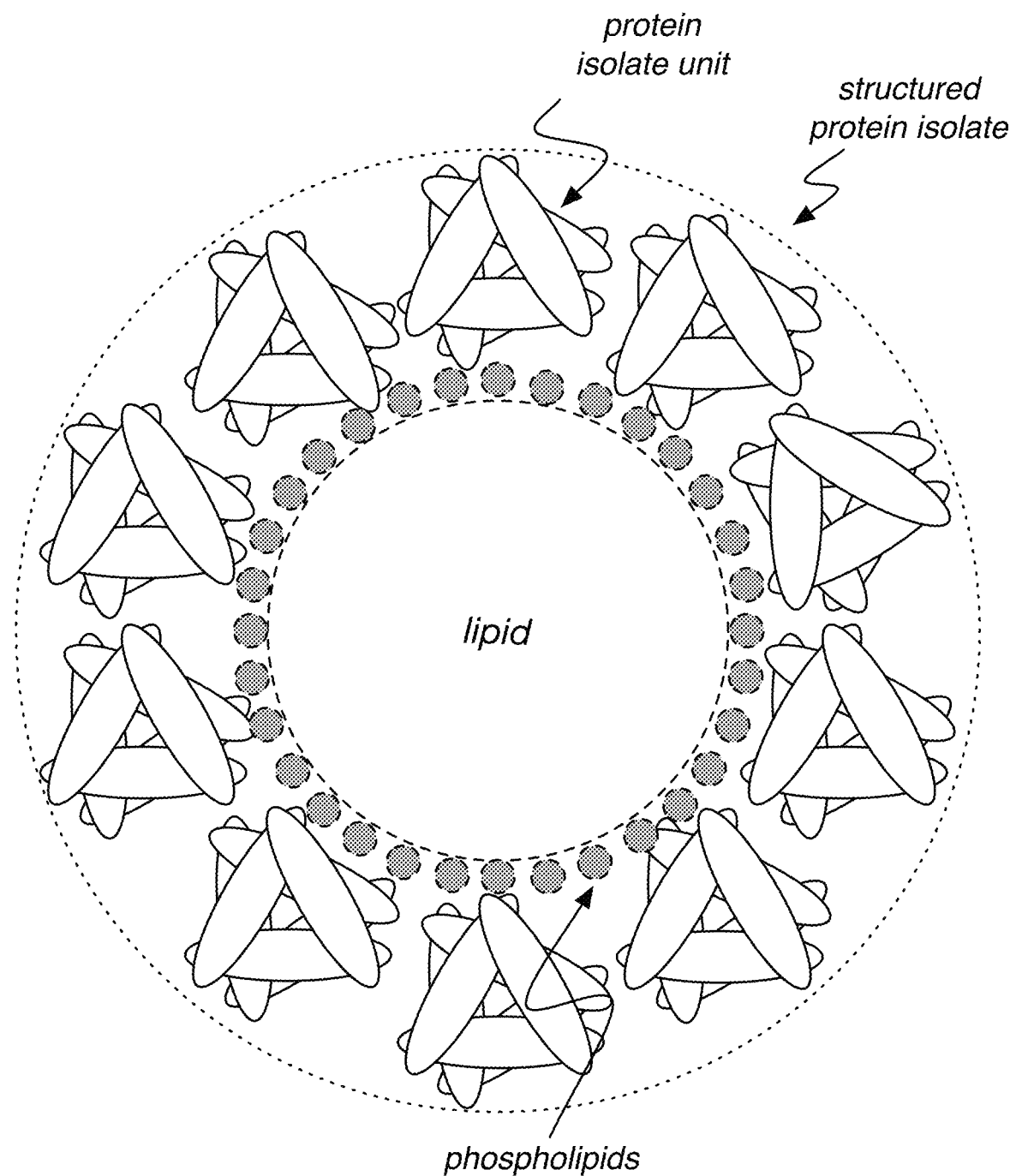
Figure 5D:
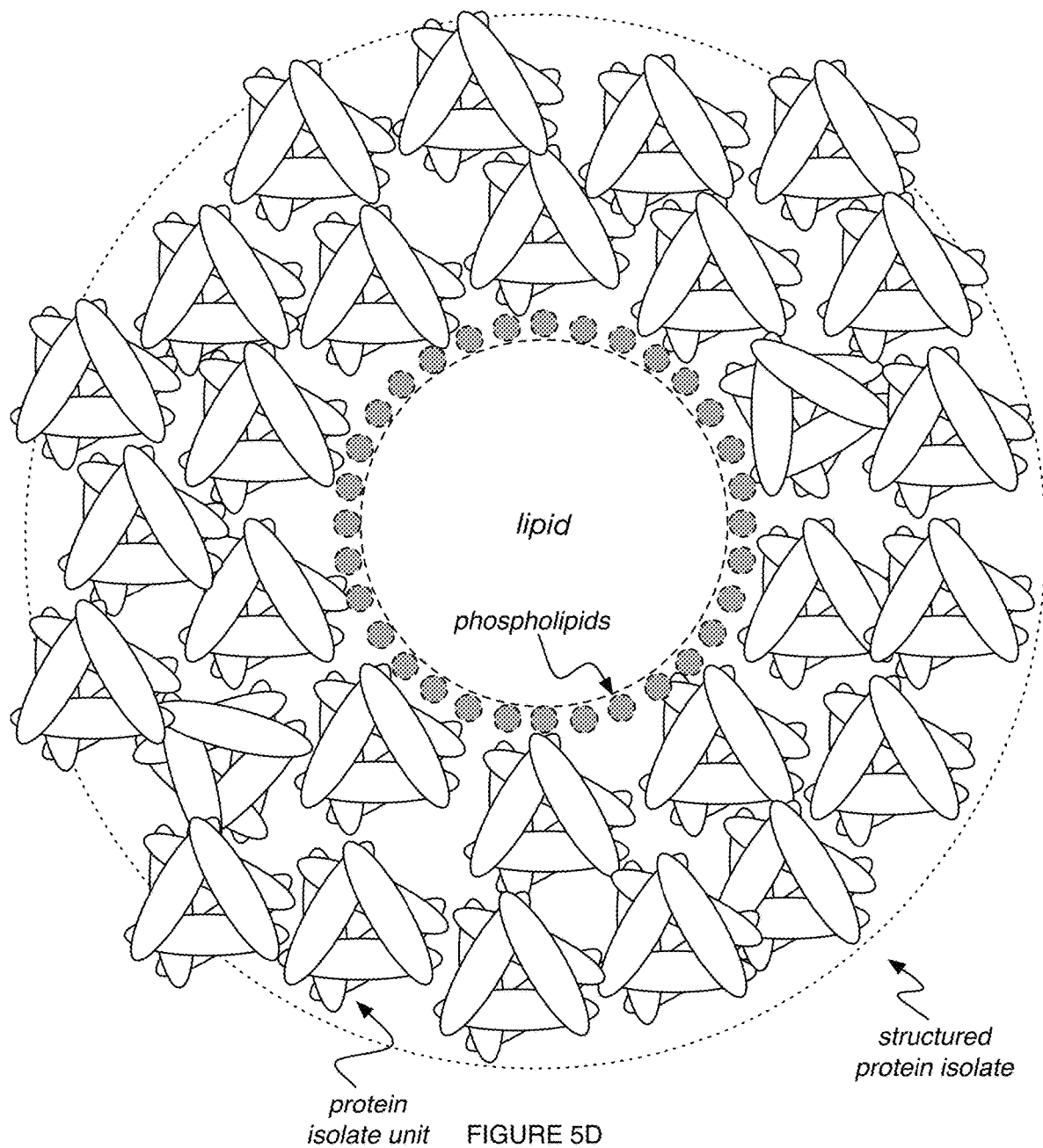

The method can be used with one or more structured protein isolates. A structured protein isolate (SPI) can include multiple proteins isolate units (e.g., an aggregate, cluster, agglomerate, etc.) arranged into a structure. The SPI structure can be a sphere (e.g., a shell of protein isolate units), an amorphous structure, and/or any other structure; examples are shown in FIG. 5A, FIG. 5B, FIG. 5C, and FIG. 5D. The SPI structure can optionally be a micelle (e.g., colloquially referred to as a micelle), wherein the micelle can be a true micelle (e.g., with more hydrophilic regions of constituent protein isolate units arranged towards the micelle edge and more hydrophobic regions arranged towards the micelle center, or vice versa such as in a reverse micelle) or a false micelle (e.g., a "micelle" similar to a casein "micelle"); examples are shown in FIG. 5B, FIG. 5C, and FIG. 5D. A micellar SPI can optionally include one or more layers of protein isolate units (e.g., surrounding a lipid component, surrounding an aqueous component, etc.). The number of protein isolate units within an SPI can be between 2-50 or any range or value therebetween (e.g., 2-10, at least 2, at least 3, at least 5, at least 10, etc.), but can alternatively be greater than 50. The diameter of an SPI can be between 50 nm-5000 nm or any range or value therebetween (e.g., 100 nm-500 nm, 100 nm-200 nm, 150-400 nm, 180 nm-300 nm, etc.), but can alternatively be less than 50 nm or greater than 5000 nm.

Interactions (e.g., bonds) can optionally exist between protein isolate units within an SPI. One or more ingredients (e.g., lipid component, phospholipids, aqueous component, salt, mineral, etc.) can optionally interact (e.g., bond, trap, attract, repel, surround, etc.) with the SPI, be located within the SPI (e.g., within the oligomeric complex), located outside the SPI, be intertwined between the SPI's constituent protein isolate units, interact (e.g., bond, trap, attract, repel, surround, etc.) with the SPI's constituent protein isolate units, and/or be otherwise associated with the SPI. The interactions can be covalent bonds, ionic bonds, hydrogen bonds, van der Waals bonds, London dispersion forces, and/or other bonds or interactions. In specific examples, a lipid component can: be located within the SPI (e.g., encapsulated within the SPI structure), surround the SPI, interact with the SPI, and/or otherwise associate with the SPI. SPIs are preferably formed via S300 and/or S400 methods, but can additionally or alternatively be otherwise formed. In another specific example, the SPI can interact with phospholipids. For example, the phospholipids can facilitate encapsulation of a lipid component within a micellar SPI by forming hydrophilic bonds and/or other interactions with the constituent protein isolate units and forming hydrophobic bonds and/or other interactions with the lipid component (e.g., the phospholipids form a layer between the protein isolate units and the lipid component).

The SPIs preferably have both hydrophilic and hydrophobic regions, but alternatively can have mostly or entirely hydrophilic or hydrophobic regions (e.g., multiple hydrophilic regions with differing degrees of hydrophilicity, regions with similar hydrophilicity/hydrophobicity, etc.). The SPIs can have a different distribution of hydrophilic and/or hydrophobic regions relative to protein isolate units (e.g., relative to unaggregated protein isolate units, relative to the constituent protein isolate units, etc.). For example, the SPIs can have increased and/or decreased hydrophobicity and/or hydrophilicity of a region. In a specific example, the SPIs can have an increased outer surface hydrophobicity relative to protein isolate units (e.g., the protein isolate units prior to forming the SPIs). In a first example, the proportion of the outer surface area of the SPI that is hydrophobic can be greater than the proportion of the outer surface area of the protein isolate unit that is hydrophobic. The increase in the proportion of the outer surface area that is hydrophobic for the SPIs relative to the protein isolate units can be between 1%-50% or any range or value therebetween (e.g., 2%, 5%, 10%, 25%, etc.), but can alternatively be less than 1% or greater than 50%. In a second example, all or a portion of the outer surface area of the SPI can be less polar than of all or a portion of the outer surface area of the protein isolate unit. The differing distribution of hydrophilic and/or hydrophobic regions for SPIs relative to protein isolate units can optionally result in increased interactions (e.g., increased number of interactions, increased stability in interactions, increased bond affinity, etc.) interactions between the SPI and: a lipid component, a phospholipid, one or more other SPIs, and/or any other ingredient. In an illustrative example, an increase in the hydrophobicity of all or a portion of the outer surface of the SPI can increase the interactions between the SPI and a lipid component (e.g., relative to the interaction between the SPI and water). The differing distribution of hydrophilic and/or hydrophobic regions for SPIs relative to protein isolate units can optionally result in decreased interactions (e.g., decreased number of interactions, decreased stability in interactions, decreased bond affinity, etc.), between the SPI and: an aqueous component, one or more other SPIs, other proteins, and/or any other ingredient. In an illustrative example, an increase in the hydrophobicity of all or a portion of the outer surface of the SPI can increase the interactions between the SPI and a lipid component relative to the interaction between the SPI and water.

The differing distribution of hydrophilic and/or hydrophobic regions for SPIs relative to protein isolate units can be associated with (e.g., a result of): conformational changes of constituent protein isolate units within the SPI (e.g., conformational changes that occur during aggregation), the arrangement of the constituent protein isolate units within the SPI, the interaction between ingredients and the SPIs, and/or any other differences between unaggregated protein isolate units and the SPIs. In a first specific example, conformational changes of constituent protein isolate units within the SPIs can increase hydrophobicity and/or hydrophilicity of a region. In a specific example, conformational changes of constituent protein isolate units within the SPIs can increase hydrophobicity of one or more regions on the outer surface of the SPI. In examples, conformational changes of a constituent protein isolate unit can be induced by: a pH change, temperature change, salt concentration change, protein concentration change, interactions between neighboring constituent protein isolate units, interactions between the constituent protein isolate unit and other compounds (e.g., water, salts, polar and/or non-polar solvents, other ingredients, etc.), and/or otherwise induced. In a specific example, an interaction (e.g., non-covalent bond, covalent bond, etc.) between a constituent protein isolate unit and a second ingredient (e.g., another protein isolate unit) can result in a conformational change in the protein isolate unit; the favorability of this interaction can be increased and/or decreased with a change in environment (e.g., adjusting the salt concentration). Conformational changes preferably do not include denaturation (e.g., the conformational changes of a protein isolate unit are reversible when the protein isolate unit dissociates from the SPI), but can alternatively include partial or complete denaturation. In a second specific example, the one or more constituent protein isolate units can be arranged with hydrophilic regions of the constituent protein isolate units positioned to face the interior of the SPI, and hydrophobic regions of the constituent protein isolate units positioned to face the exterior of the SPI.

Figure 7:
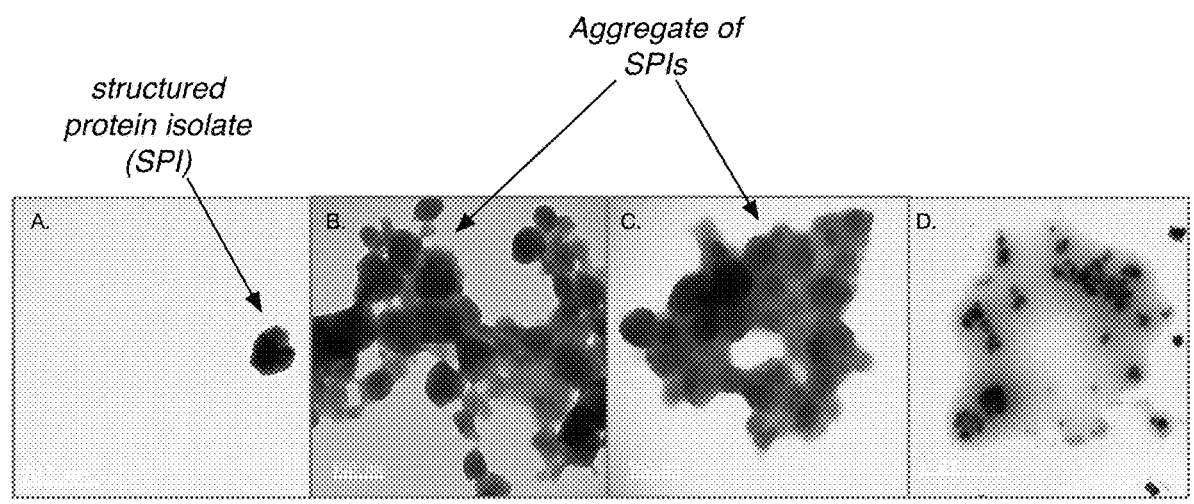
FIG. 7 depicts an illustrative example of transmission electron micrographs of SPIs. A) A single SPI. B) Aggregates of SPIs. C) Aggregates of SPIs. D) SPIs dispersed in an oil droplet.
Figure 8A:
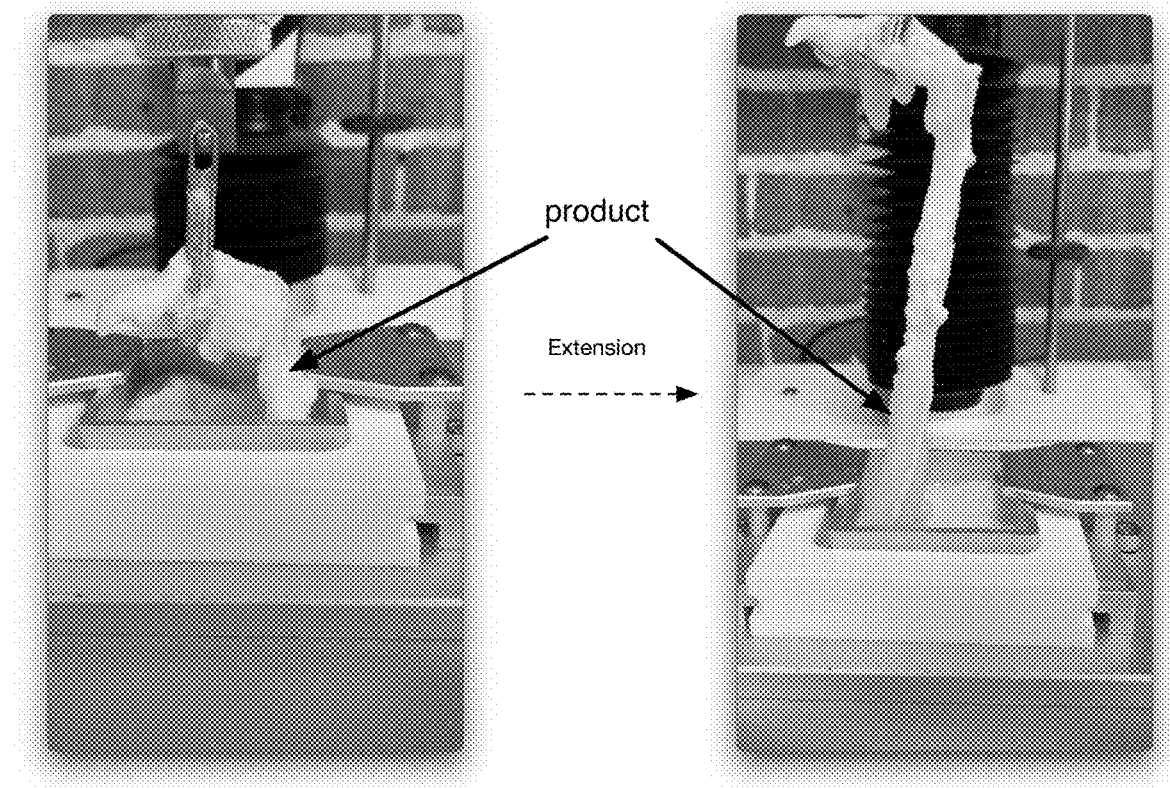
FIGS. 8A, 8B, and 8C depict example images of stretchable products.
Figure 8B:
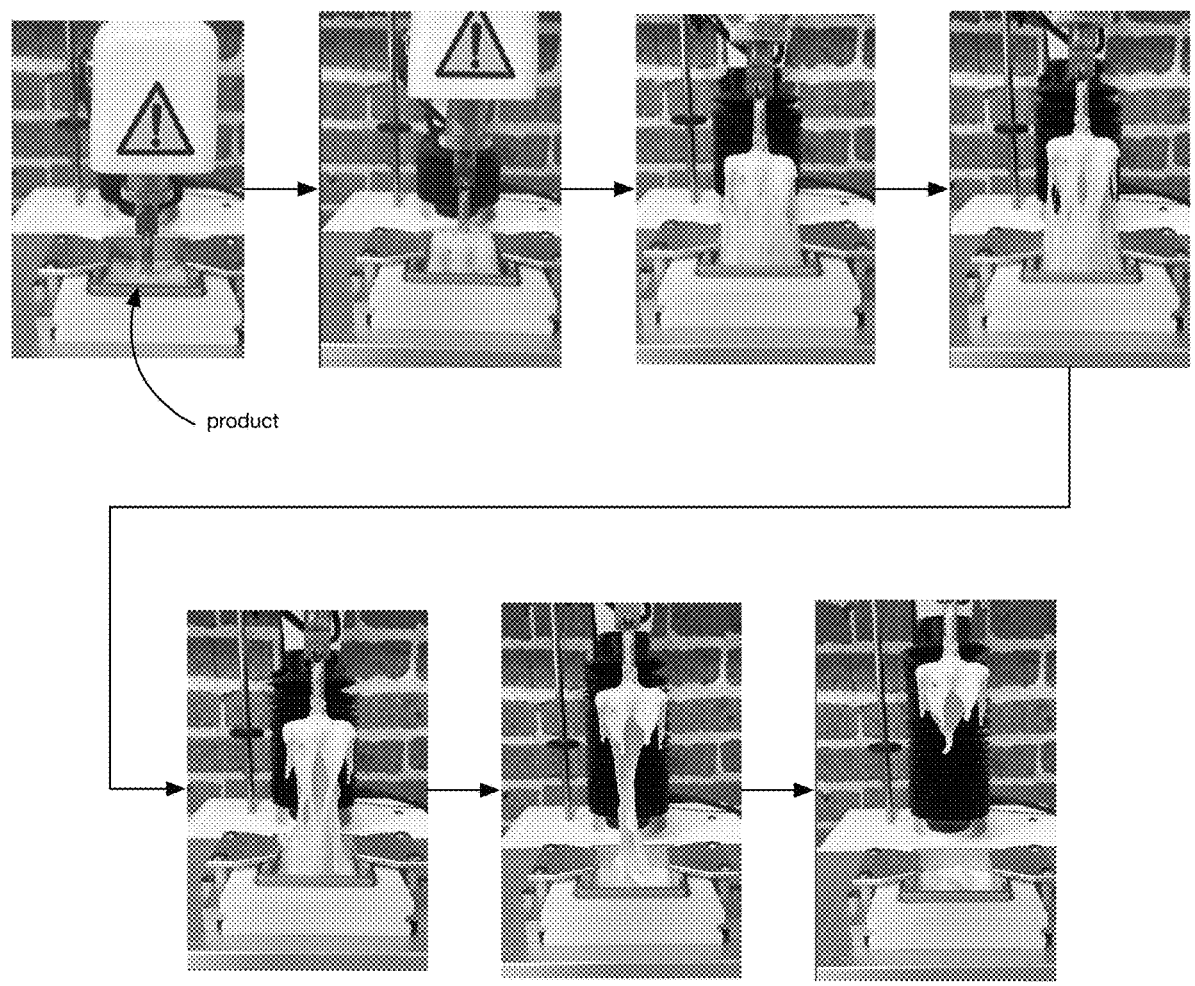
Figure 8C:
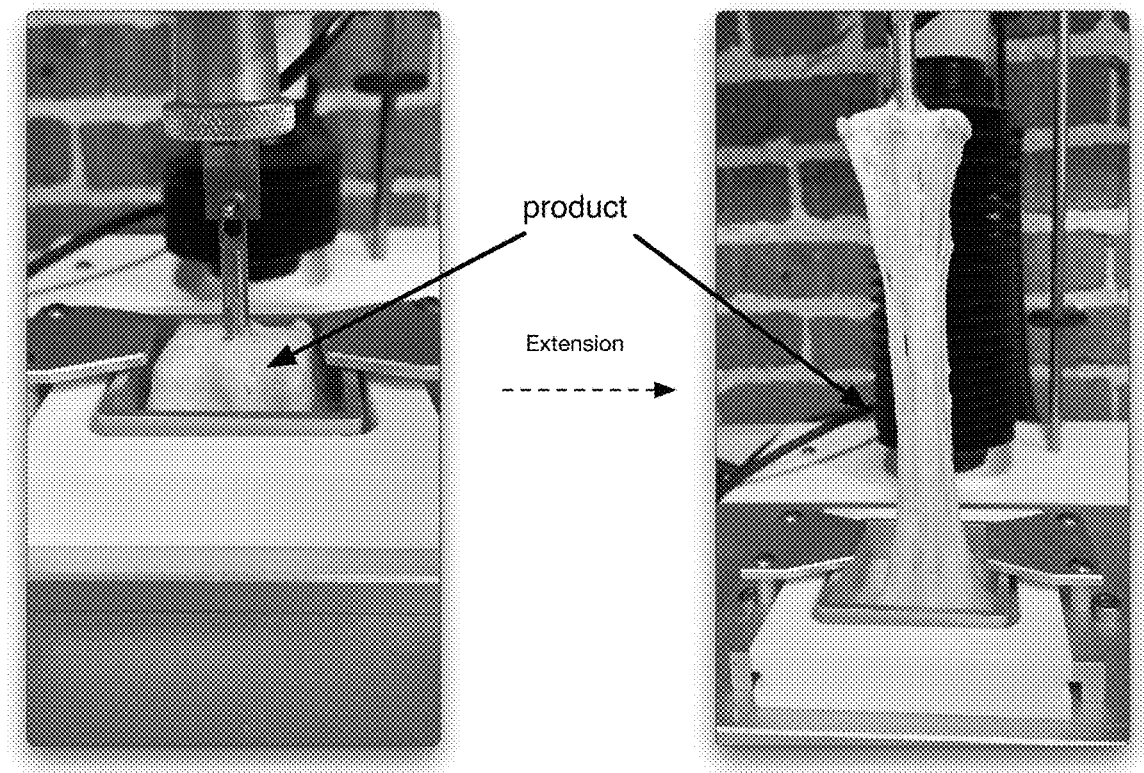
Figure 9A:
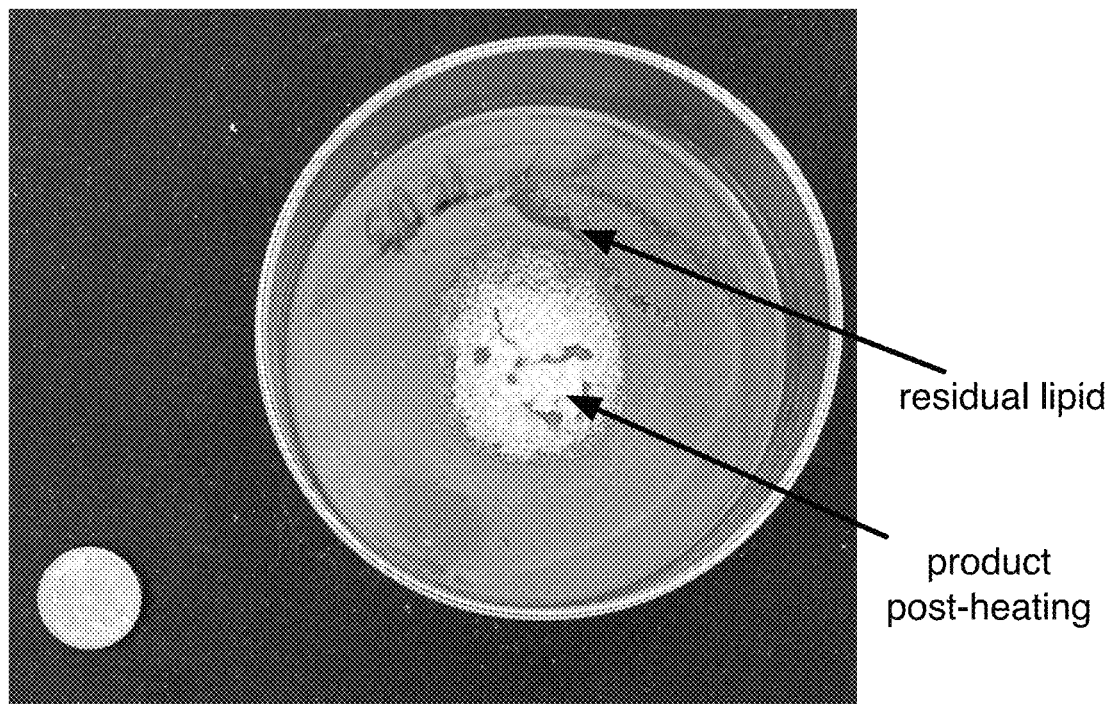
FIGS. 9A and 9B depict example images of a meltable product.
Figure 9B:
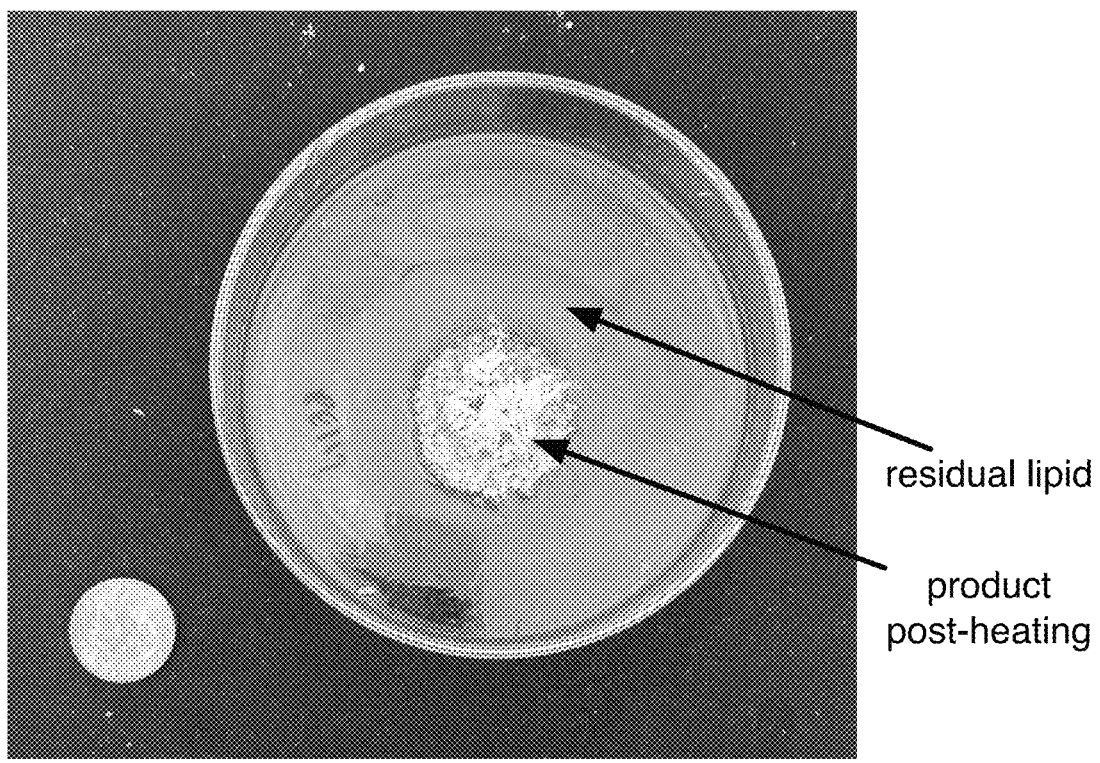
Figure 16A:
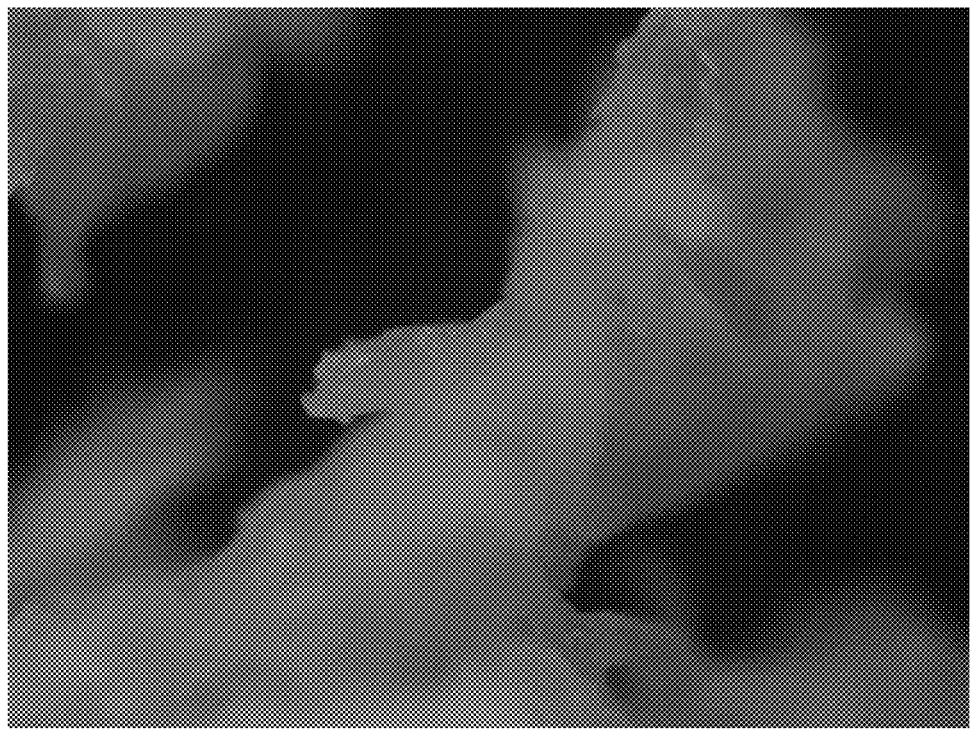
FIGS. 16A-16F depict example images of a product manufactured using watermelon-derived SPIs. The images were captured using a 18 MP AmScope digital microscope camera and an optical microscope with a 4× lens.
Figure 16B:
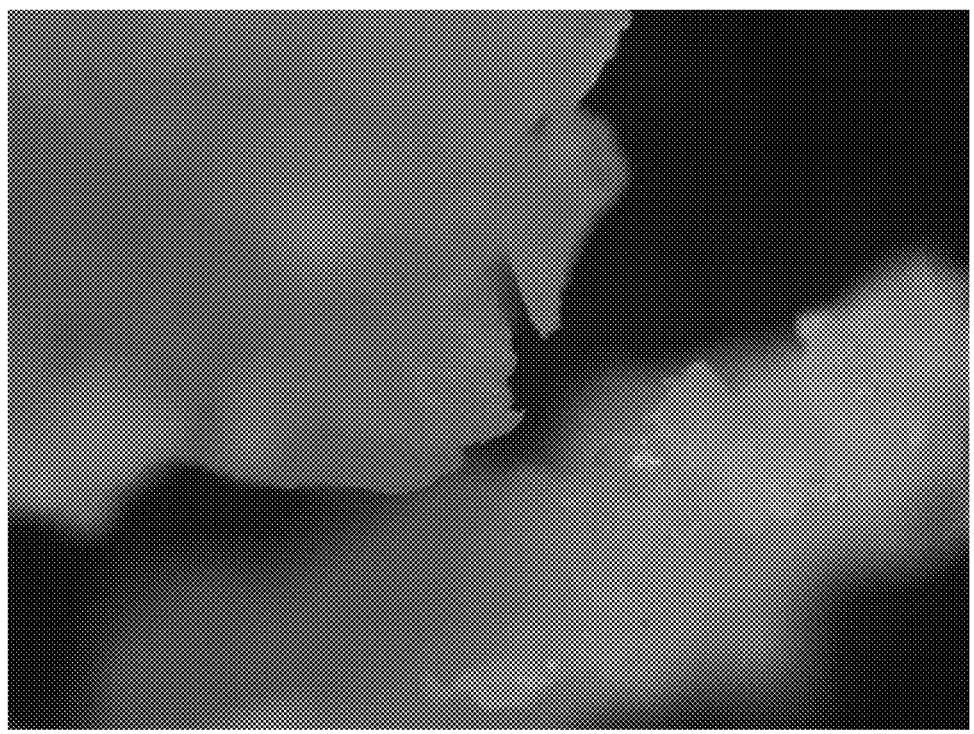
Figure 16C:
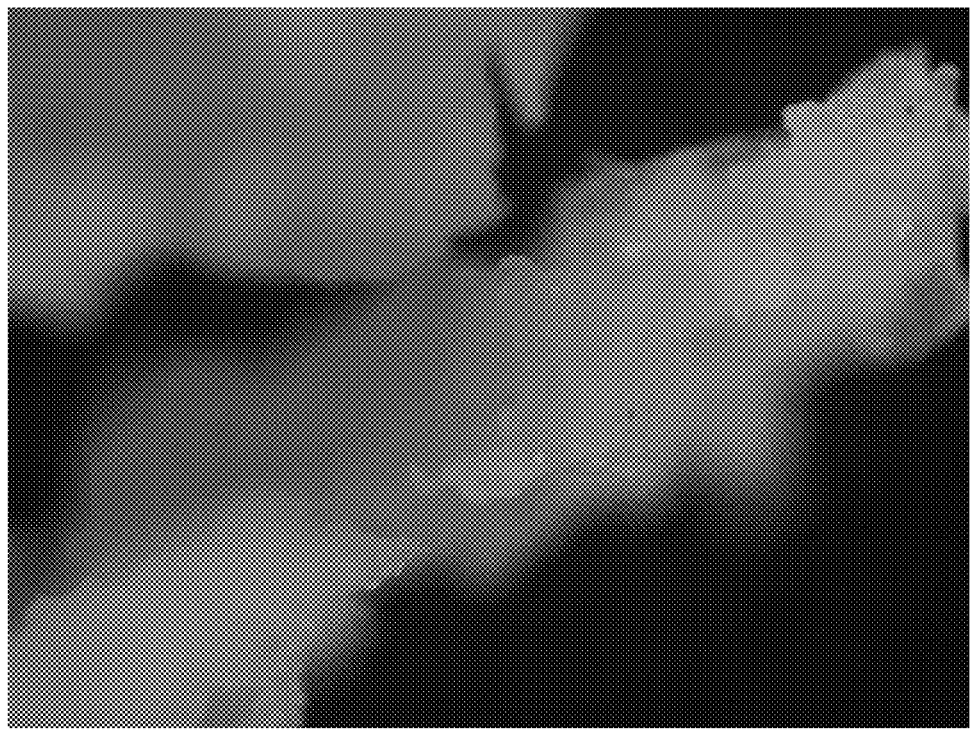
Figure 16D:
Figure 16E:
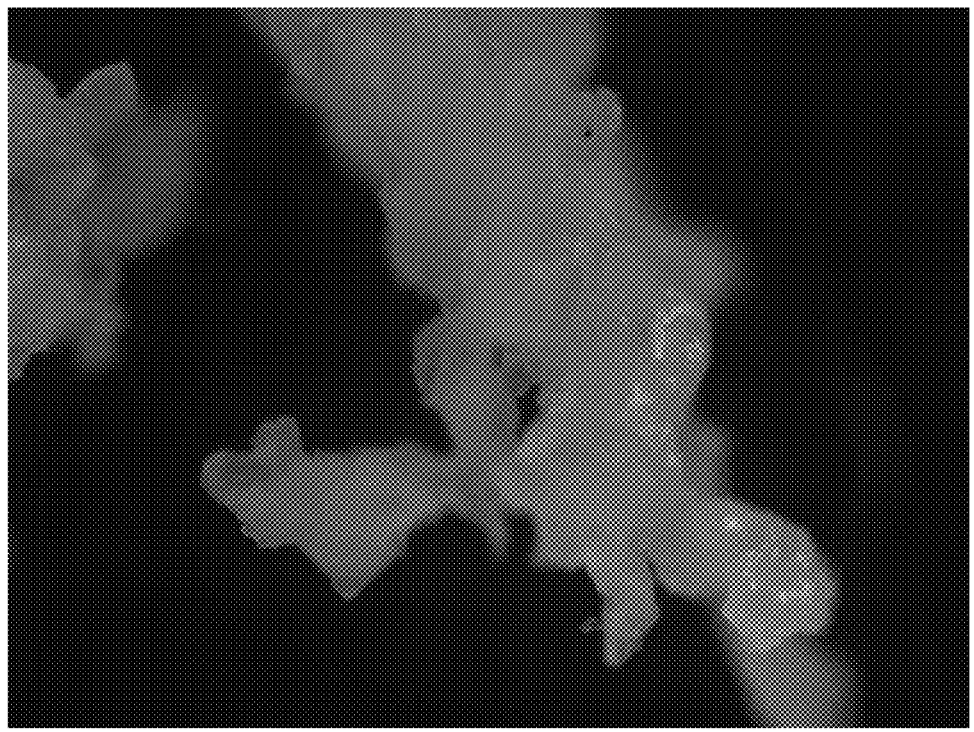
Figure 16F:
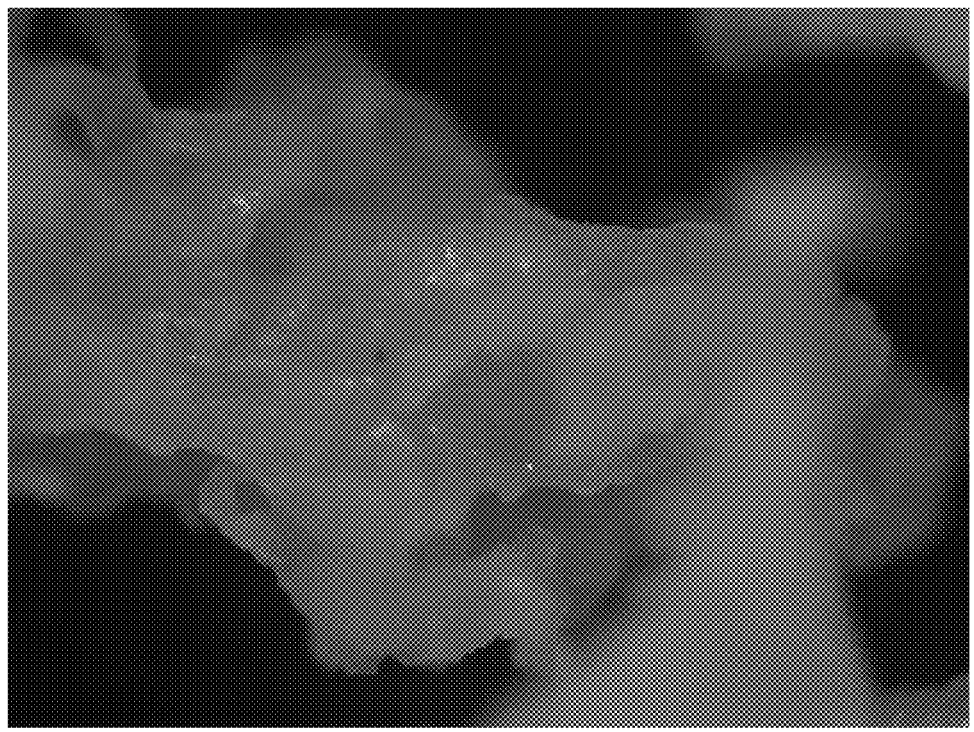
Figure 17A:
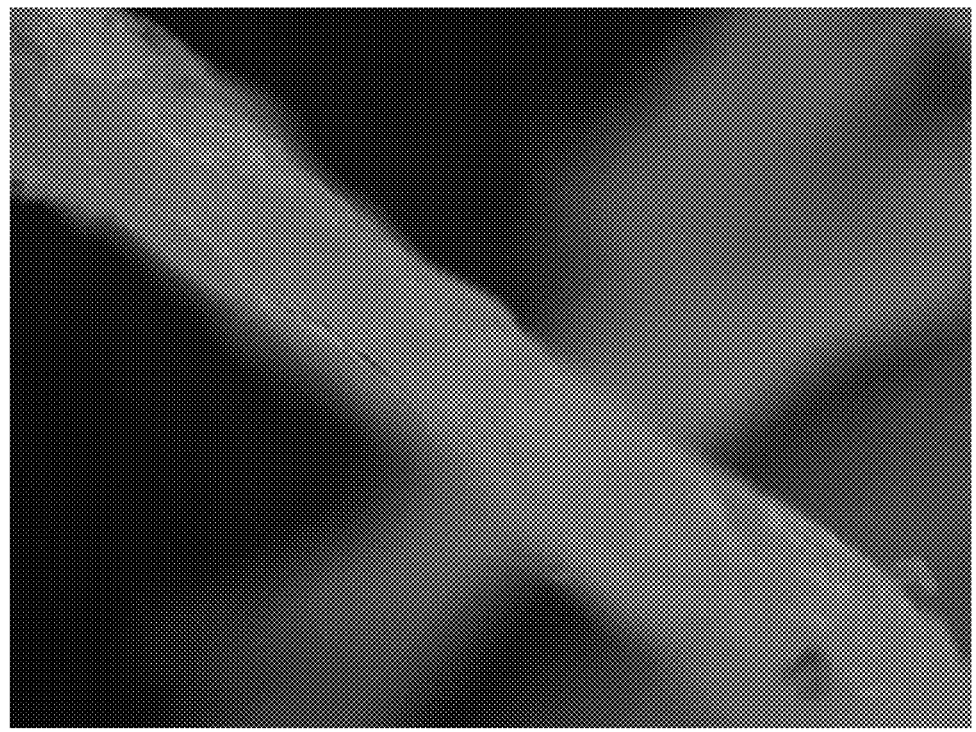
FIGS. 17A-17L depict example images of mozzarella. The images were captured using a 18 MP AmScope digital microscope camera and an optical microscope with a 4× lens.
Figure 17B:
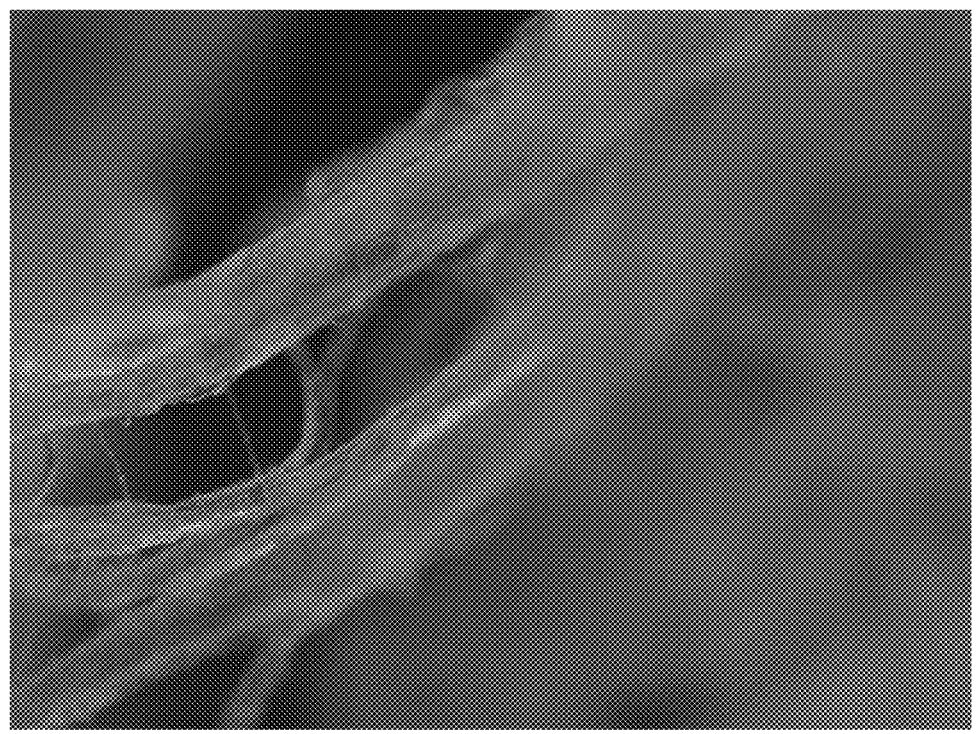
Figure 17C:
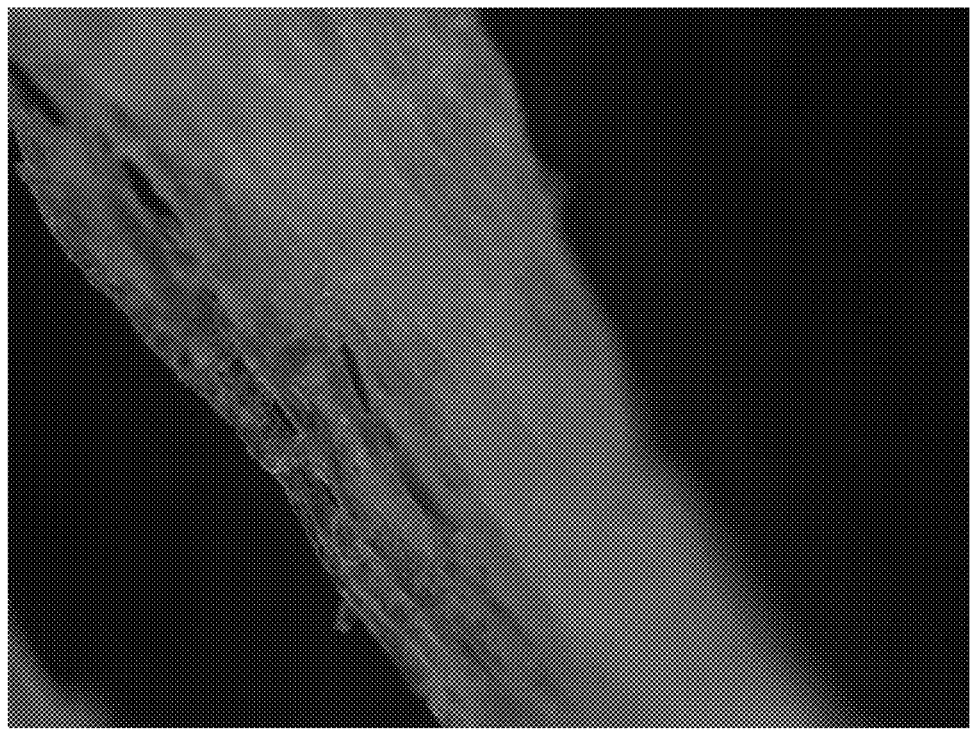
Figure 17D:
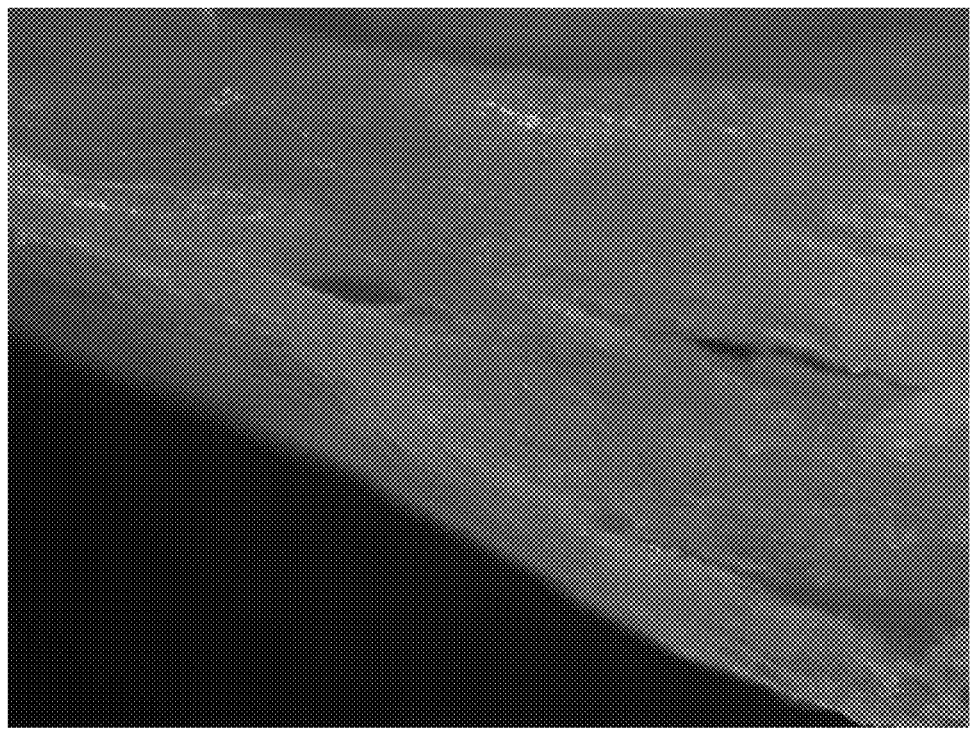
Figure 17E:
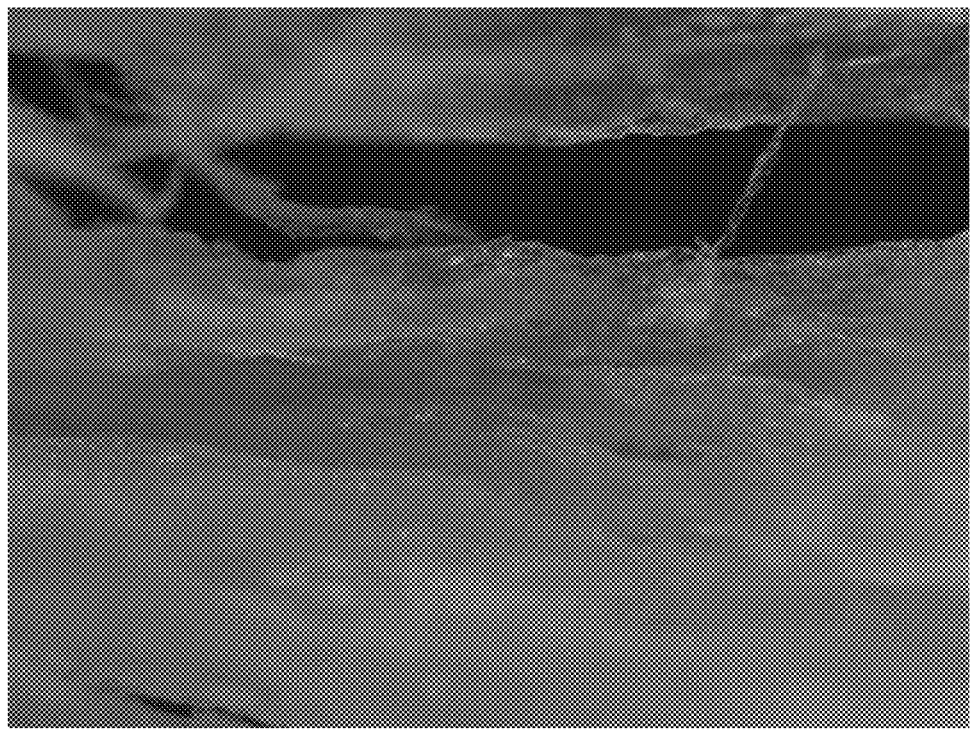
Figure 17F:
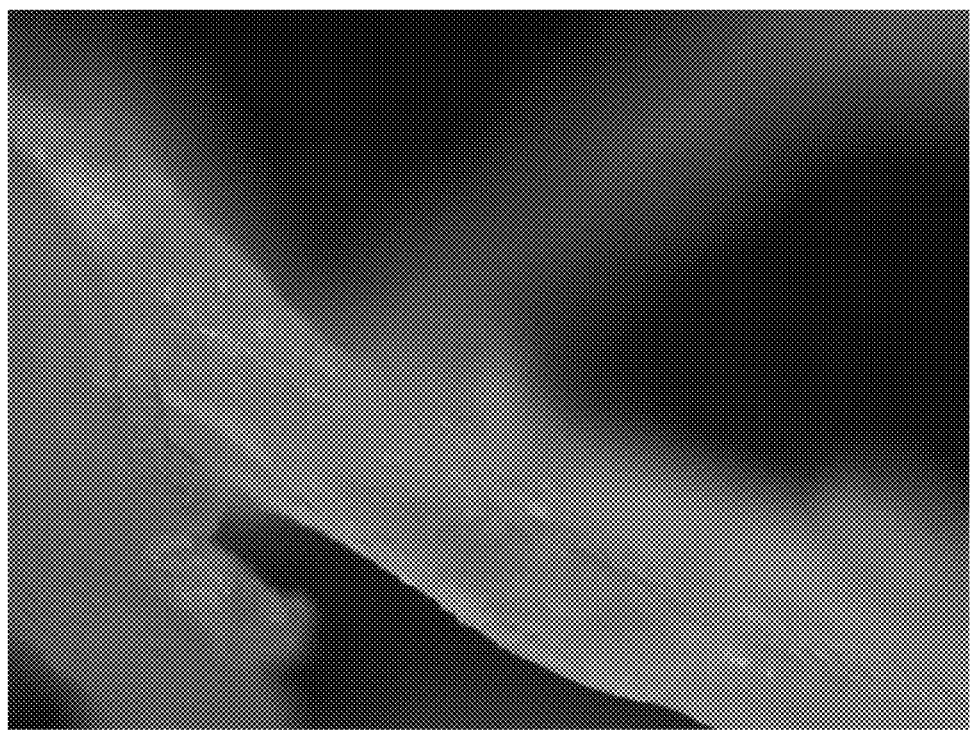
Figure 17G:
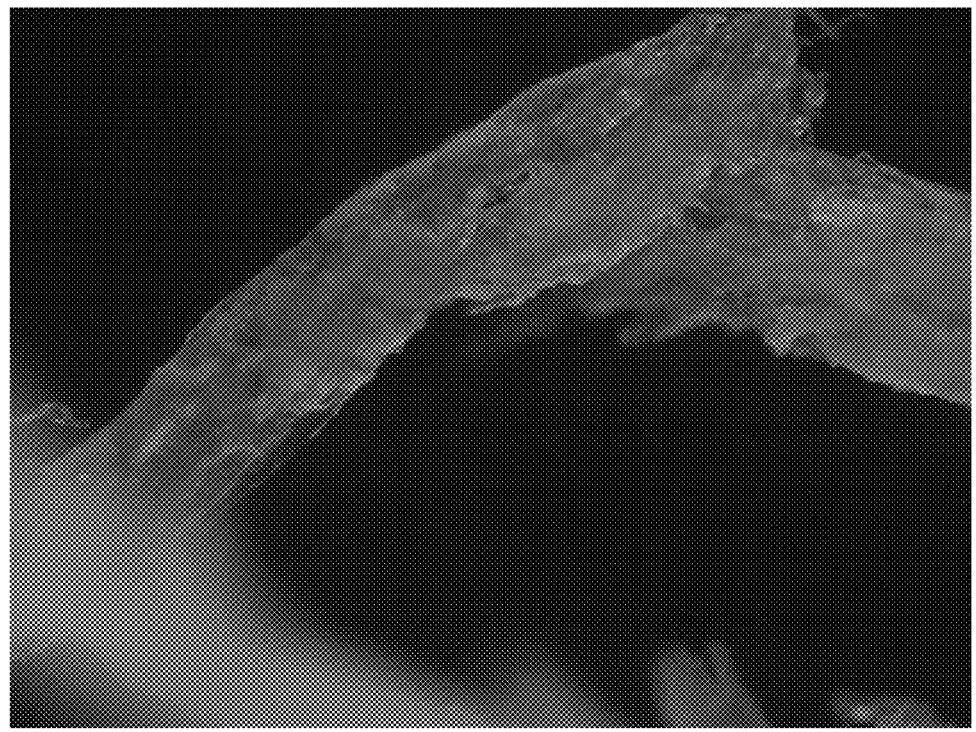
Figure 17H:
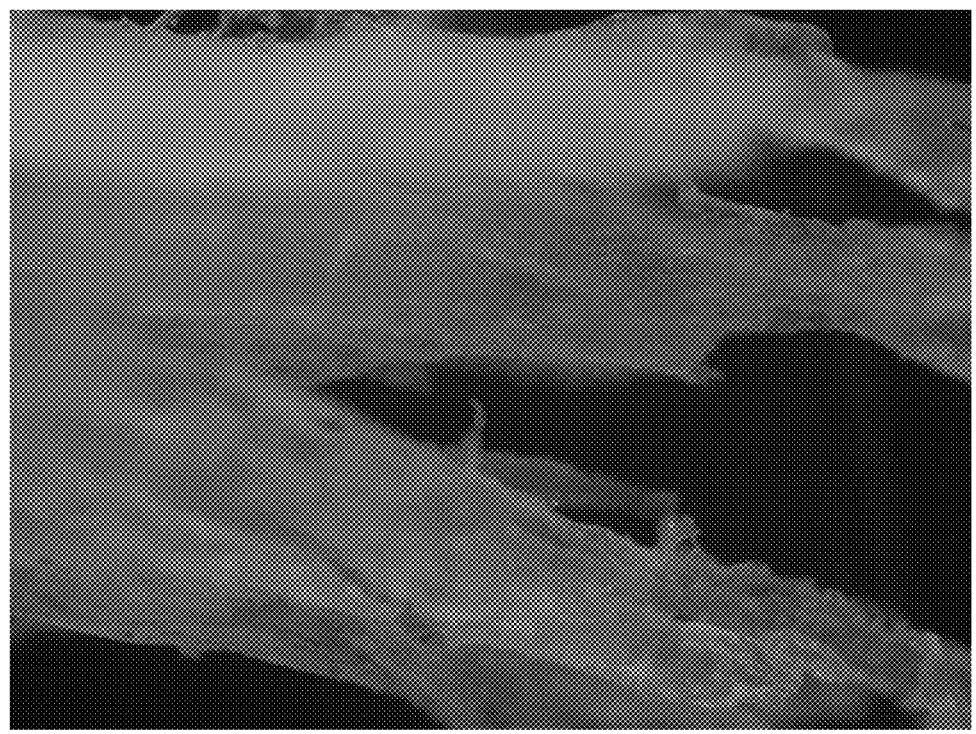
Figure 17I:
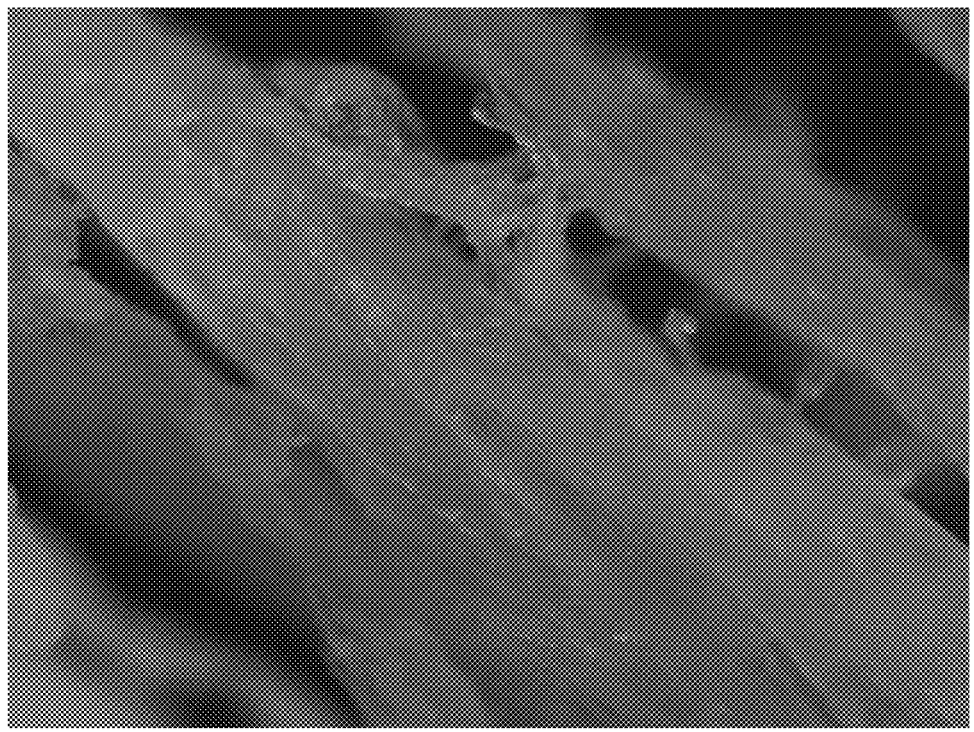
Figure 17J:
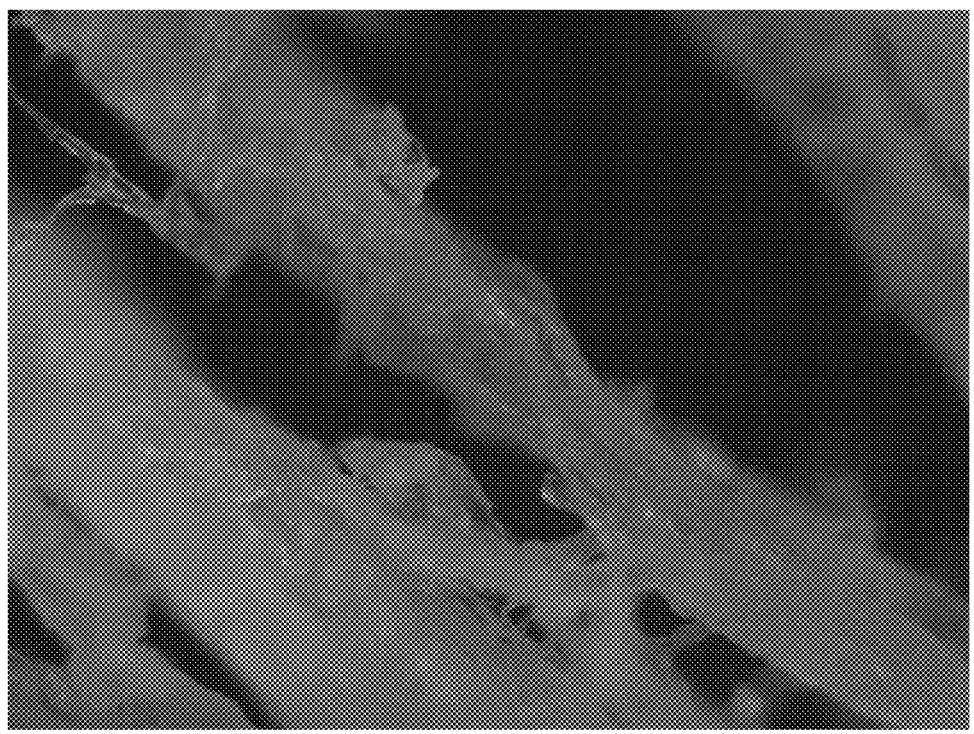
Figure 17K:
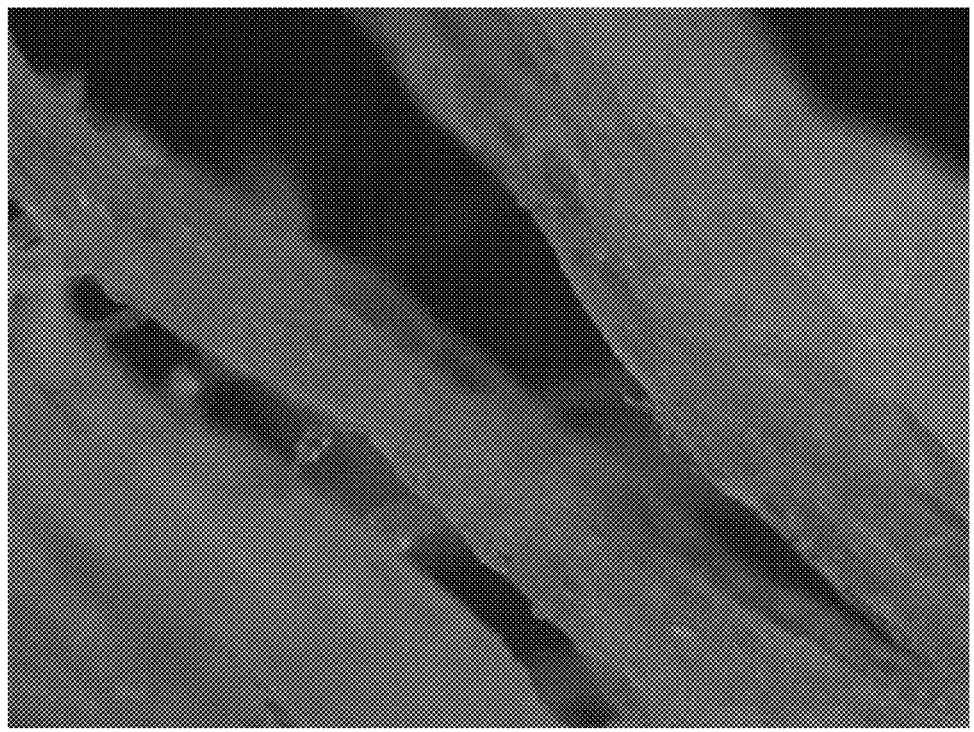
Figure 17L:
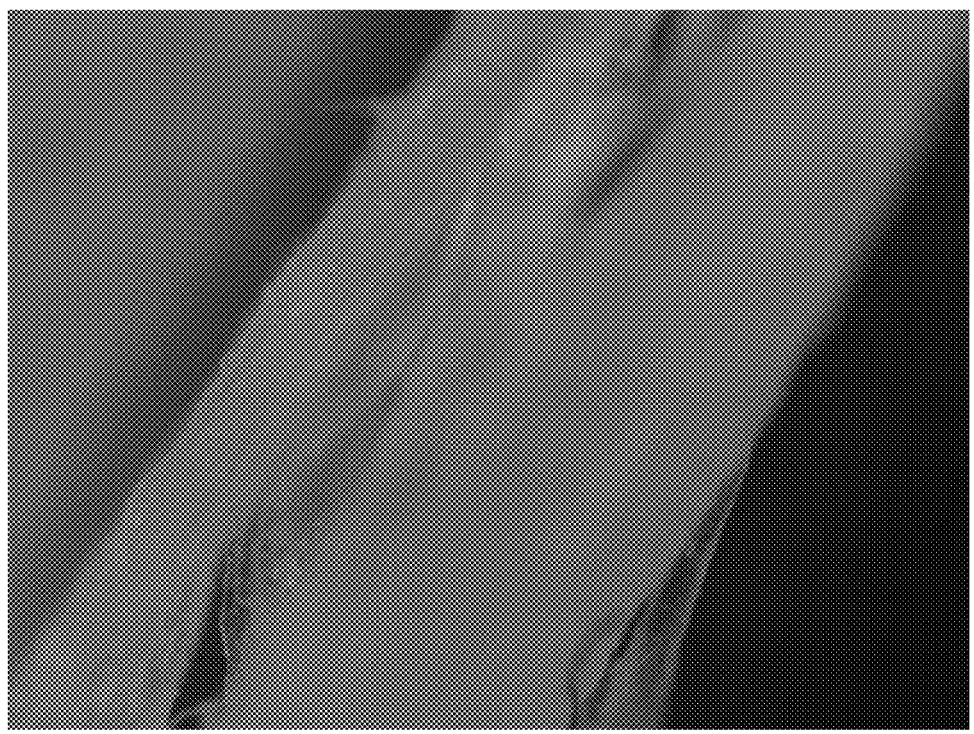

Structured protein isolates can optionally be clustered into one or more aggregates (an aggregate of SPIs, a superaggregate). The aggregate of SPIs can include one or more spheres (e.g., droplets, micelles, etc.) of SPIs, fibril aggregates, amorphous aggregates, and/or any other structure of multiple SPIs. The number of SPIs within an aggregate of SPIs can be between 2-50 or any range or value therebetween (e.g., 2-10, 20-40, 40-50, 30-50, greater than 2, greater than 3, greater than 5, greater than 10, etc.), but can alternatively be greater than 50. The diameter of the aggregate of SPIs can be between 100 nm-100 µm or any range or value therebetween (e.g., 100 nm-1000 nm, 500 nm-10,000 nm, 1,000 nm-50,000 nm, etc.), but can alternatively be less than 100 nm or greater than 100 µm. Interactions (e.g., bonds) can optionally exist between SPIs within the aggregate of SPIs. One or more ingredients (e.g., lipid component, phospholipids, aqueous component, salt, mineral, etc.) can optionally interact with the aggregate of SPIs, be located within the aggregate of SPI, located outside the aggregate of SPIs, be intertwined between the SPIs, interact with the aggregate of SPIs, and/or be otherwise associated with the aggregate of SPIs. In specific examples, a lipid component can: be located between the SPIs in the aggregate, surround the aggregate of SPIs, be encapsulated within the aggregate of SPIs (e.g., examples shown in FIG. 16D and FIG. 16E), interact with the aggregate of SPIs, and/or otherwise associate with the SPI. The aggregate of SPIs can optionally be contained in and/or support aqueous solution droplets (e.g., within a lipid component) and/or lipid component droplets (e.g., within an aqueous solution). Additionally or alternatively, the aggregate of SPIs can be distributed across both a lipid component and water, be dry (e.g., a dried aggregate of SPIs), and/or be located within any other ingredient. In a specific example, the aggregate of SPIs can optionally interact with phospholipids. For example, the phospholipids can facilitate encapsulation of a lipid component within a micellar aggregate of SPIs by forming hydrophilic bonds and/or other interactions with the SPIs and forming hydrophobic bonds and/or other interactions with the lipid component (e.g., the phospholipids form a layer between the SPIs and the lipid component). The aggregates of SPIs can be formed via S300, S400, S500, and/or S600 methods. Examples are shown in FIG. 7.

Figure 6A:
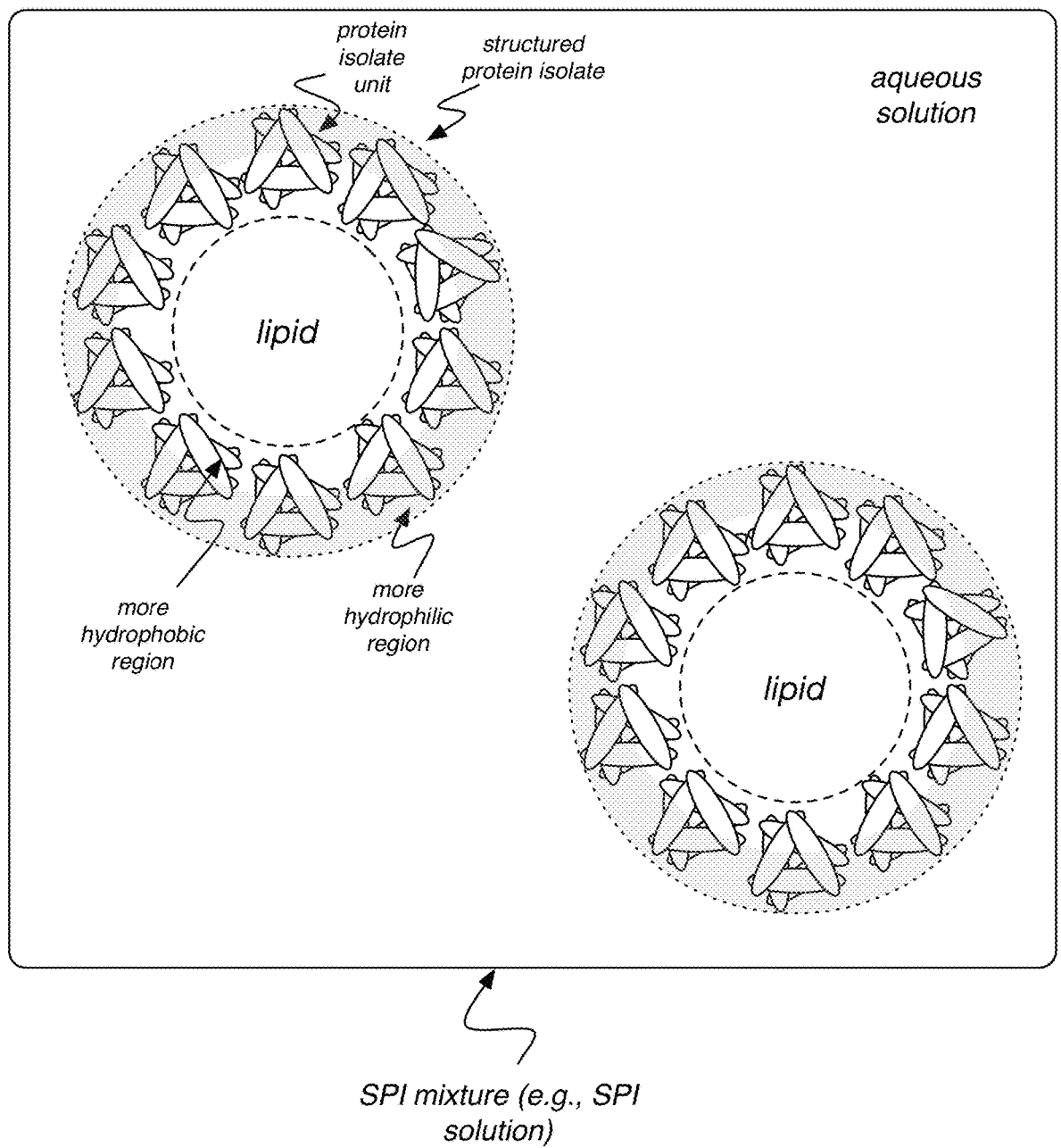
FIG. 6A depicts a first schematic example of a cross-section of an SPI mixture including SPIs encapsulating a lipid component, with an outer region more hydrophilic than an inner region.
Figure 6B:
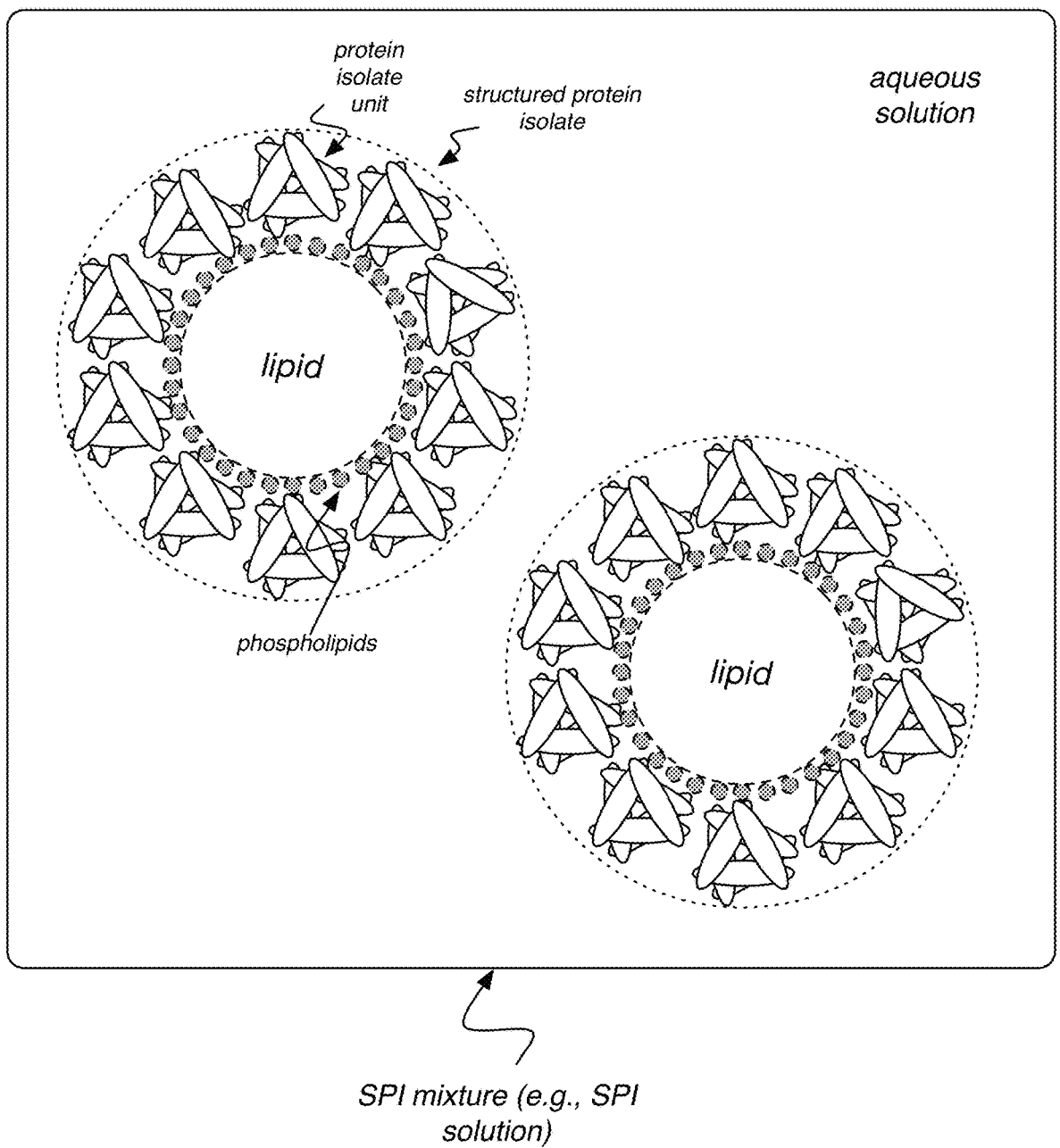
FIG. 6B depicts a second schematic example of a cross-section of an SPI mixture including SPIs and phospholipids encapsulating a lipid component.
Figure 6C:
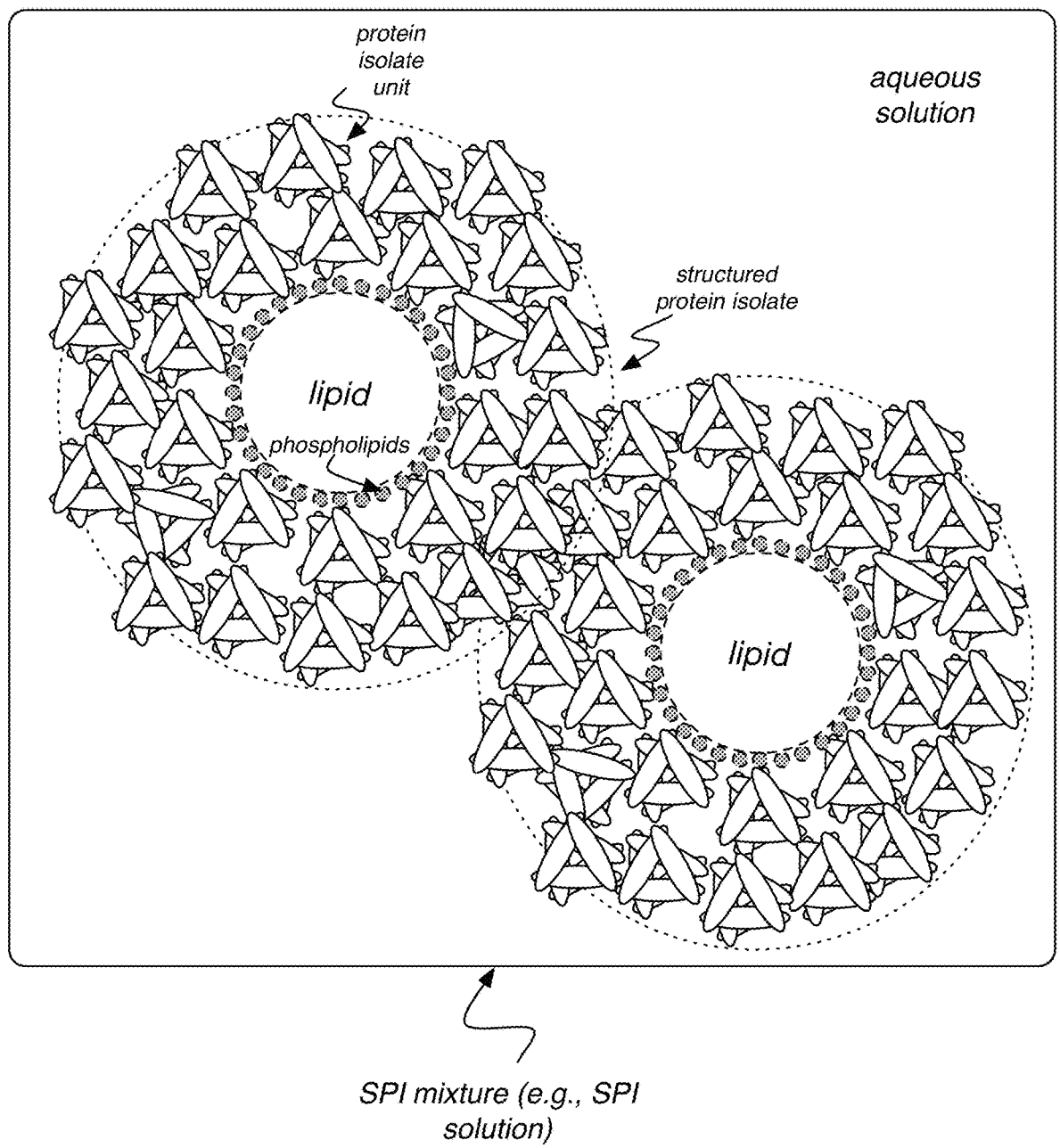
FIG. 6C depicts a third schematic example of a cross-section of an SPI mixture including SPIs and phospholipids encapsulating a lipid component.
Figure 6D:
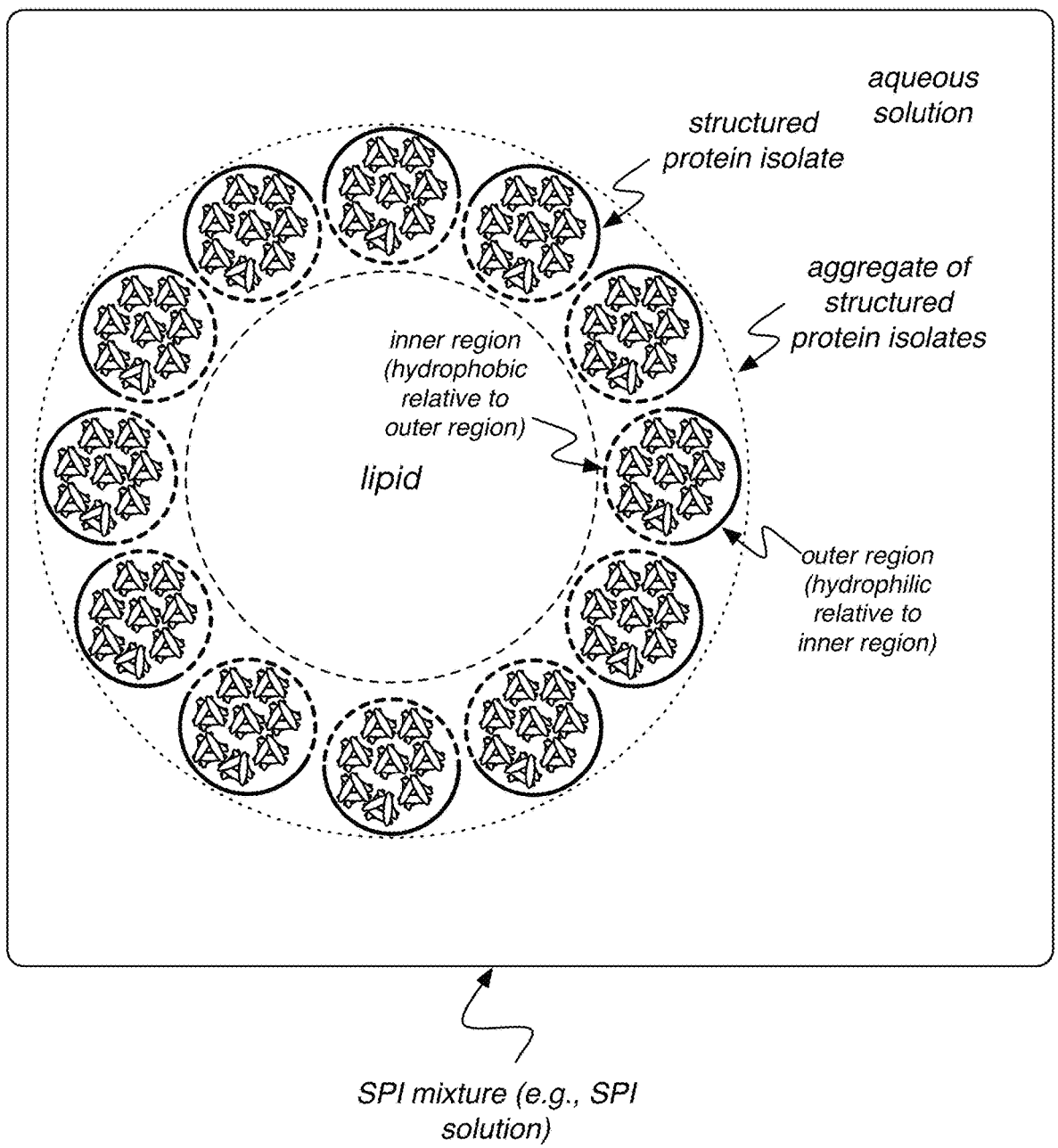
FIG. 6D depicts a fourth schematic example of a cross-section of an SPI mixture including an aggregate of SPIs encapsulating a lipid component, with an outer region more hydrophilic than an inner region.
Figure 6E:
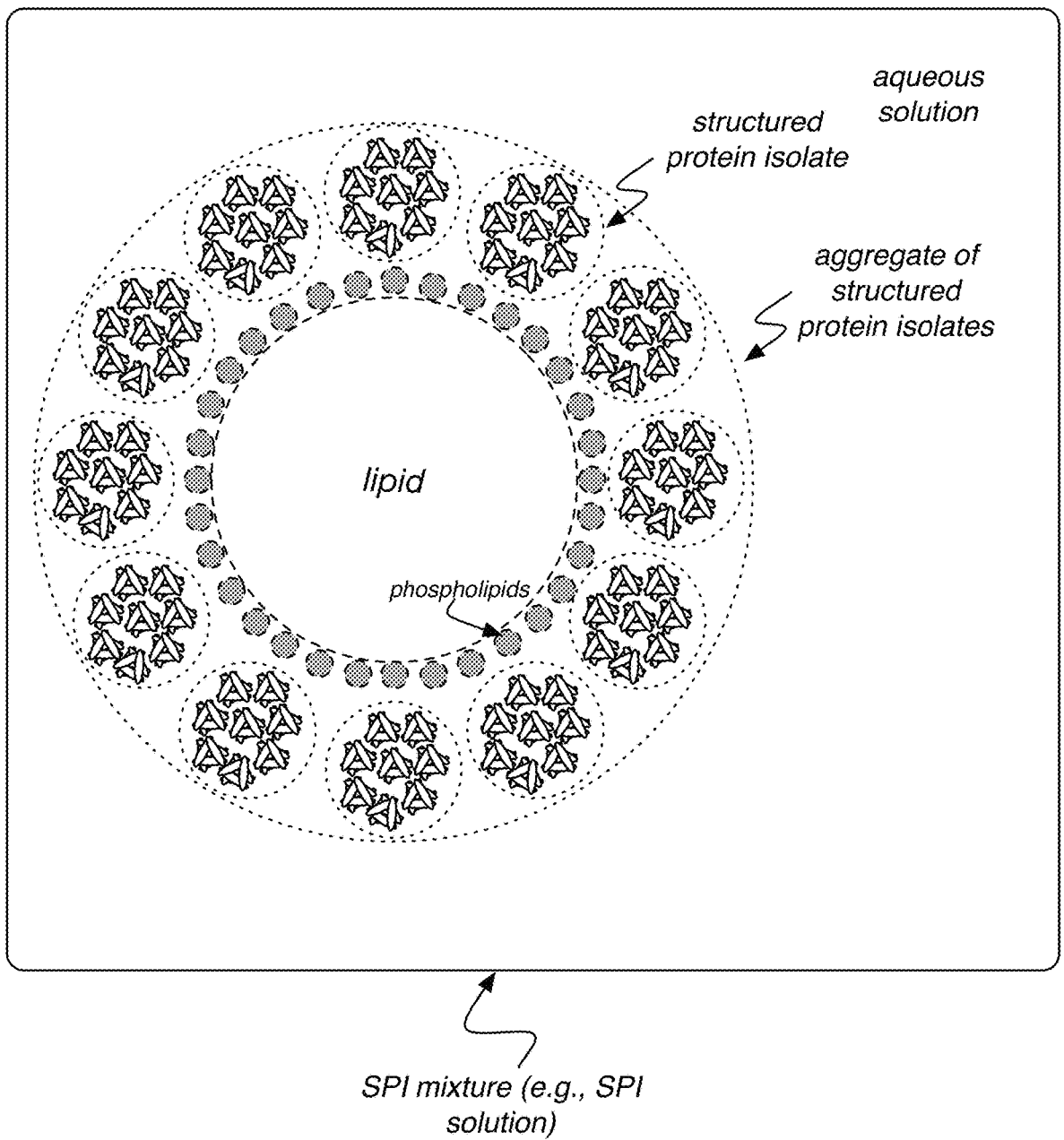
FIG. 6E depicts a fifth schematic example of a cross-section of an SPI mixture including an aggregate of SPIs and phospholipids encapsulating a lipid component.

The method can optionally be used with an SPI mixture (e.g., SPI solution). The SPI mixture can optionally include a protein component, an aqueous component, a lipid component, and/or other ingredients (e.g., impurities, any ingredient in S500, etc.). The protein component can include protein isolate units (e.g., unstructured protein isolate units, structured or otherwise aggregated protein isolate units, etc.), SPIs, aggregates of SPIs, a combination thereof, and/or any other proteins. Examples are shown in FIG. 6A, FIG. 6B, FIG. 6C, FIG. 6D, and FIG. 6E. In a specific example, greater than a threshold proportion of protein isolate units (e.g., aggregated and/or unaggregated protein isolate units) in the protein component of the SPI mixture are not denatured (e.g., at the time of SPI mixture formation, prior to processing the SPI mixture, after processing the SPI mixture, etc.), wherein the threshold proportion can be between 50%-99% or any range or value therebetween (e.g., 60%, 70%, 80%, 90%, 95%, etc.), but can alternatively be less than 50% or greater than 99%. In another specific example, greater than a threshold proportion of protein isolate units in the protein component of the SPI mixture are arranged into SPIs, wherein the threshold proportion can be between 5%-90% or any range or value therebetween (e.g., 10%, 15%, 20%, 30%, 40%, 50%, 60%, 70%, 80%, etc.), but can alternatively be less than 5% or greater than 90%. In a first example, the SPI structure includes a more hydrophobic region within the SPI interior (e.g., interfacing with the lipid component and/or phospholipids) relative to a more hydrophilic region on the SPI exterior (e.g., interfacing with the aqueous component). An example is shown in FIG. 6A. In a second example, aggregates of SPIs include a more hydrophobic region within the aggregate interior relative to a more hydrophilic region on the aggregate exterior (e.g., interfacing with the aqueous component). An example is shown in FIG. 6D. However, proteins in the protein component can be otherwise arranged.

Obtaining protein isolate units from a protein source S100 functions to extract proteins from the protein source (e.g., a protein source component) and/or otherwise obtain a high-protein concentration solution. In variants, S100 can include: comminuting the protein source S120, diluting the protein source to form a protein source solution S140, optionally adjusting a pH level of the protein source solution S160, optionally adjusting a salt content of the protein source solution S165, and optionally forming a protein isolate solution S180. However, the protein isolate units can be obtained from the protein source using: precipitation (e.g., salting in, salting out, inducing isoelectric precipitation, etc.), centrifugation, size exclusion, and/or any other protein extraction and/or purification method.

All or part of S100 (e.g., one or more of S120, S140, S160, S165, or S180) can be performed at one or more target temperatures. The target temperature can be between 15° C.-85° C. (e.g., 15° C.-30° C., 20° C.-25° C., room temperature, 20° C., etc.), less than greater than 85° C., any target temperature in S500, and/or any other target temperature. The target temperature can remain constant over the course of S100, vary over time (e.g., according to a predetermined cycle, etc.), and/or otherwise vary.

The protein isolate units are preferably obtained from the protein source such that less than a threshold percentage of the obtained protein isolate units are denatured, but can be otherwise performed. The threshold percentage (e.g., maximum percentage) of the obtained protein isolate units that are denatured can be between 0.01%-50% or any range or value therebetween (e.g., 0.05%, 1%, 2%, 5%, 10%, 15%, 20%, 25%, etc.), but can alternatively be less than 0.01% or greater than 50%. The threshold percentage of protein isolate units that can be obtained from the protein source (e.g., the protein yield in the protein isolate solution) can be more than 40%, 50%, 60%, 70%, 80%, 90%, between 50-60%, between 60-70% (e.g., 67%), less than 40%, more than 60%, more than 70%, more than 80%, more than 90%, and/or any other suitable proportion (e.g., by weight, by volume, etc.) of the original protein source; alternatively, S100 can have any other suitable yield.

S100 can optionally include comminuting the protein source S120. S120 can be performed before S140, concurrently with S140, after S140 (e.g., blending the protein source solution), after protein source processing (e.g., lipid-removal), and/or at any other time. Additionally or alternatively, the protein source can be obtained in a comminuted state (e.g., a pre-processed protein source). Examples of comminution methods include: pulverizing, blending, crushing, tumbling, crumbling, atomizing, shaving, grinding, milling, cryo-milling, chopping, homogenizing (e.g., using S500 methods), air classifying, and/or any other method. In specific examples, S120 can include producing a protein source powder, a ground protein source, a protein source flour, and/or any other comminuted protein source. In an illustrative example, an air classifier system can be used to mill the protein source (e.g., a defatted protein source) into a flour, and then separate the flour to extract a protein source powder. However, the protein source can be otherwise comminuted.

S100 can optionally include diluting the protein source to form a protein source solution S140. S140 can be performed after S120 and/or at any other time. The diluent can include an aqueous solution (e.g., water, deionized water, a mixture of water and other ingredients such as any ingredient in S500, etc.), a mixture (e.g., emulsion) of an aqueous solution and a lipid component, a polar solvent, any organic and/or inorganic solvent, and/or any other diluent. In a specific example, the diluent is a salt solution. The salt solution preferably includes NaCl, but can alternatively use any other salt (e.g., calcium salts, any salt listed in S500, etc.) or combination of salts. The concentration of salt (e.g., NaCl, CaCl2, etc.) can be between 0.1M-2M or any range or value therebetween (e.g., 0.7, 0.8, 0.9, etc.), but can alternatively be less than 0.1M or greater than 2M. The protein source can optionally be diluted to achieve a target protein concentration in the protein source solution. The target protein concentration (by weight) can be between 1%-50% or any range or value therebetween (e.g., 5%-40%, 10%-15%, 15%-25%, etc.), but can alternatively be less than 1% or greater than 50%. S140 can optionally include mixing, blending, homogenizing (e.g., using S500 methods), and/or any other combination method. However, the protein source can be otherwise diluted.

S100 can optionally include adjusting a pH level of the protein source solution S160, which can function to increase solubility of proteins in the protein source solution (e.g., by increasing the pH above the isoelectric point). S160 can be performed after S140 and/or at any other time. S160 can include adding one or more acids and/or bases to bring the pH of the protein source solution (and/or components therein) to a target pH. Examples of acids and bases include: HCl, NaOH, citric acid, lactic acid, gluconic acid, and/or any food-safe (e.g., at relevant quantities) acid and/or base. The target pH is preferably basic (e.g., greater than 7, greater than 8, greater than 9, etc.), but can alternatively be acidic and/or neutral. For example, the target pH can be between 4-11.5 or any range or value therebetween (e.g., 7-10, 8-10, etc.), but can alternatively be less than 4 or greater than 11.5. However, the pH level of the protein source solution can be otherwise adjusted.

S100 can optionally include adjusting salt content of the protein source solution S165, which can function to increase the solubility of protein isolate units in the protein source solution, increase interactions between proteins and phospholipids, improve characteristics (e.g., stretch behavior, melt behavior, etc.) and/or nutritional profile (e.g., concentration of calcium) of a product produced using the protein source solution, and/or perform other functionalities. S165 can be performed after S140, concurrently with S140, and/or at any other time. S165 can include increasing or decreasing the concentration of salt in the protein source solution and/or components therein (e.g., the protein source) to achieve a target salt concentration. S165 can be performed using methods described in S500. The target salt concentration can be between 0.05M-5M or any range or value therebetween (e.g., 0.1M-1M, 0.5M-2M, 0.8M-0.9M, less than 4M, less than 2M, less than 1 M, etc.), but can alternatively be less than 0.05M or greater than 5M. The target salt concentration can result in a conductivity between 0.5-10,000 millisiemens or any range or value therebetween (e.g., 1-10 millisiemens, 2-8 millisiemens, 10-100 millisiemens, 100-10,000 millisiemens, etc.), but can alternatively be less than 0.5 millisiemens or greater than 10,000 millisiemens. The target salt concentration can optionally be determined based on the protein type being used (e.g., based on the solubility of the protein type), a target characteristic, and/or otherwise determined. However, the salt content of the protein source solution can be otherwise adjusted.

S100 can optionally include forming a protein isolate solution S180, which can function to form (e.g., extract) protein isolate units from the protein source solution. The protein isolate solution can include protein isolate units, protein isolate unit precursors, and/or any other suitable form of protein isolate. S180 can be performed after S140, after S160, and/or at any other time. S180 can include separating the protein source solution into insoluble material and a protein isolate solution (containing protein isolate units). Separating the protein source solution can include decanting, filtering, drying, centrifuging, allowing sedimentation to occur, and/or any other separation method. For example, S180 can include centrifuging the protein source solution, wherein the supernatant is the protein isolate solution that includes solubilized protein isolate units. Centrifuges can include or use: decanters, separator centrifuges (e.g., disc stack centrifuge), tubular centrifuges, membrane separators, and/or any other centrifuges and/or components thereof. The centrifuge can be a continuous flow centrifuge, a batch centrifuge, and/or any other type of centrifuge. The protein source solution can be centrifuged at an RCF between 500 g-100,000 g or any range or value therebetween (e.g., 1,000 g-30,000 g; 4,000 g-10,000 g; 5,000 g; etc.), but can alternatively be centrifuged at an RCF less than 500 g or greater than 100,000 g. The protein source solution can be centrifuged at an RPM between 100-10,000 or any range or value therebetween (e.g., 2,000-10,000; 4,000-6,000; 5000-5,500; less than 10,000; etc.), but can alternatively be centrifuged at an RPM less than 100 or greater than 10,000. The concentration of protein in the protein isolate solution can be between 1%-50% or any range or value therebetween (e.g., 2%-10%, 2.7%, 7.5%, 5%-40%, 6.5%, 10%-15%, 15%-25%, etc.), but can alternatively be less than 1% or greater than 50%. However, the protein isolate solution can be otherwise formed.

S100 can additionally or alternatively include processing the protein source (e.g., the protein source solution) and/or protein isolate units (e.g., the protein isolate solution) using any processing methods in S500 (e.g., adjusting pH, adjusting salt content, adjusting temperature, high pressure assisted extraction, enzyme assisted extraction, ultrasound assisted extraction, other extraction assistance methods, etc.).

However, protein isolate units can be otherwise obtained.

The method can optionally include combining protein isolates (e.g., combining protein isolate solutions) to form a mixture of protein isolates (e.g., a mixture of protein isolate solutions), wherein the protein isolates can be (separately) derived from different protein sources. This can function to form SPIs with a mixed protein composition. In variants, this can increase the range of possible nutritional profiles and/or other characteristics in products formed from the SPIs. The protein isolates can be combined during S100, after S100 (e.g., wherein two or more protein isolate solutions formed using S100 methods are combined), during S300 (e.g., concurrently with dilution), after S300 (e.g., combining diluted protein isolate solutions), and/or at any other time. In all or parts of the method, protein isolates and/or the protein isolate solution can refer to a mixture of protein isolates and/or a mixture of protein isolate solutions, respectively. However, protein isolates can be otherwise combined.

Alternatively, the protein isolates can be derived from a single protein source (e.g., hemp, sesame, any other plant source, etc.). For example, all or parts of the method can use protein isolate units derived from (e.g., obtained from) a single protein source.

The method can optionally include modifying proteins (e.g., modifying: protein isolate units, SPIs, and/or any other proteins), which can function to improve one or more characteristics of the proteins and/or a product therefrom. The proteins can be modified before, during, and/or after: S100, S200, S300, S400, S500, S600, and/or at any other suitable time. Protein modifications can include transglutaminase modifications, proteolytic modifications, other enzymatic modifications, glycosylation, glycation (e.g., catalyzed via food-safe acids and/or any other acids, performed at a temperature at or below the protein denaturation point, etc.), phosphorylation (e.g., using sodium trimetaphosphate), acylation, hydrolysis, cross-linking (e.g., using proteases, laccase, etc.), other methods in S500 (e.g., heating, shearing, microparticulation, etc.), and/or any other protein treatments.

The method can optionally include combining the protein isolate units with a lipid component S200, which functions to mix (e.g., emulsify) lipids in the protein isolate solution such that SPIs can be formed (e.g., via S300 and/or S400) in the presence of lipids. S200 can be performed after S100, before S300, before S400, and/or at any other time.

Figure 2:
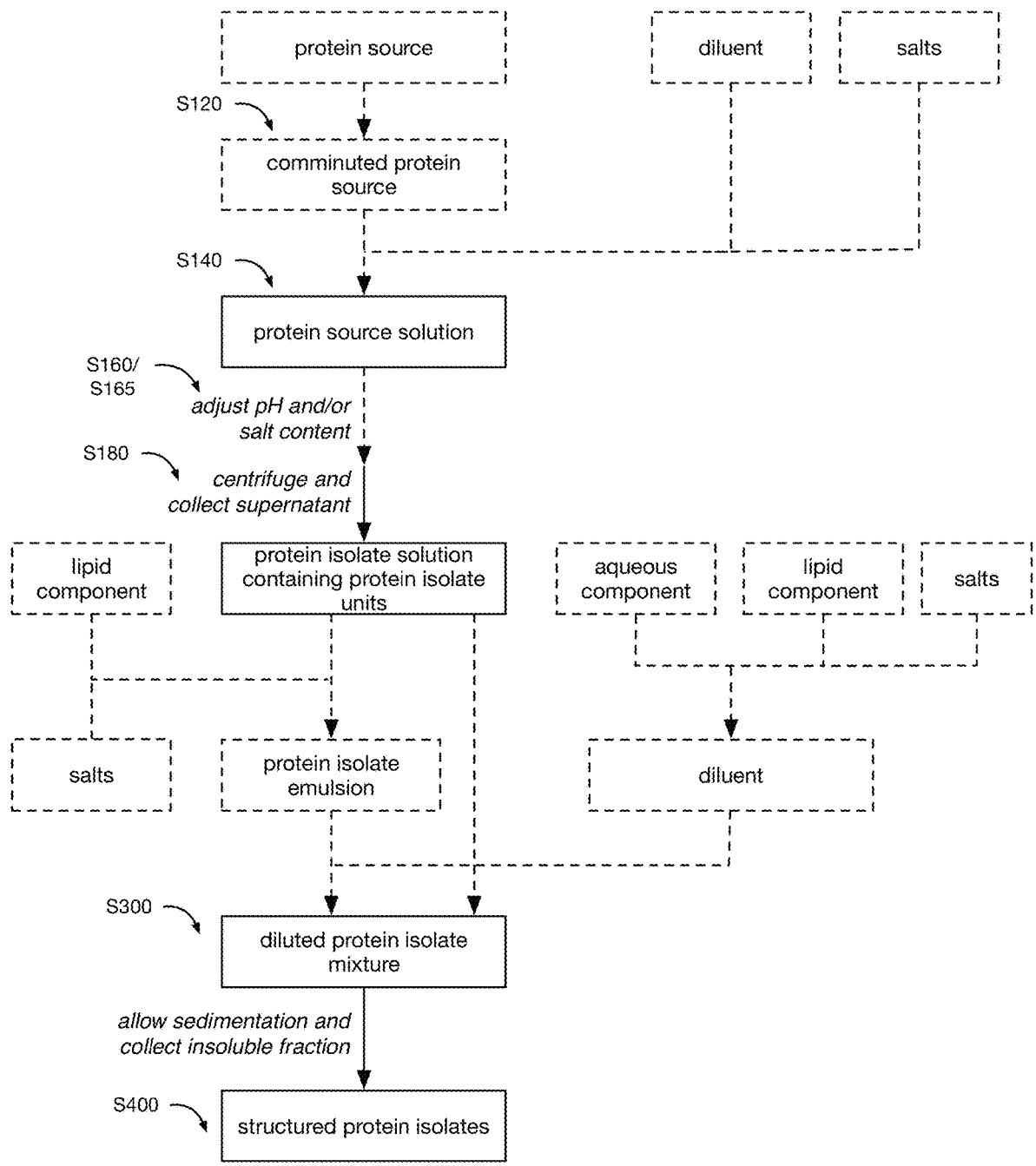
FIG. 2 depicts a first example of the method.

S200 can include forming a mixture by combining the protein isolate units (e.g., the protein isolate solution) and a lipid component; an example is shown in FIG. 2. The percent (by weight) of the lipid component in the mixture can be between 0.5%-50% or any range or value therebetween (e.g., 1%-20%, 5%-10%, 1.67%, 5%, 15%, greater than 5%, etc.), but can alternatively be less than 0.5% or greater than 50%. Additionally or alternatively, the ratio of lipid component to the protein isolate solution can be 1:10-10:1 (e.g., by weight, by volume, etc.), any range or ratio value therebetween (e.g., 1:1, 1:2, 2:3, 4:5, etc.), lower than 1:10, higher than 10:1, and/or be any other suitable ratio. Combining the protein isolate units (e.g., the protein isolate solution) and the lipid component can include emulsifying, mixing, blending, homogenizing (e.g., using S500 methods), and/or any other combination method. The mixture (e.g., a protein isolate mixture) can be an emulsion (e.g., a stable emulsion, an unstable emulsion, etc.), a suspension, a colloid, and/or any other mixture.

Figure 19:
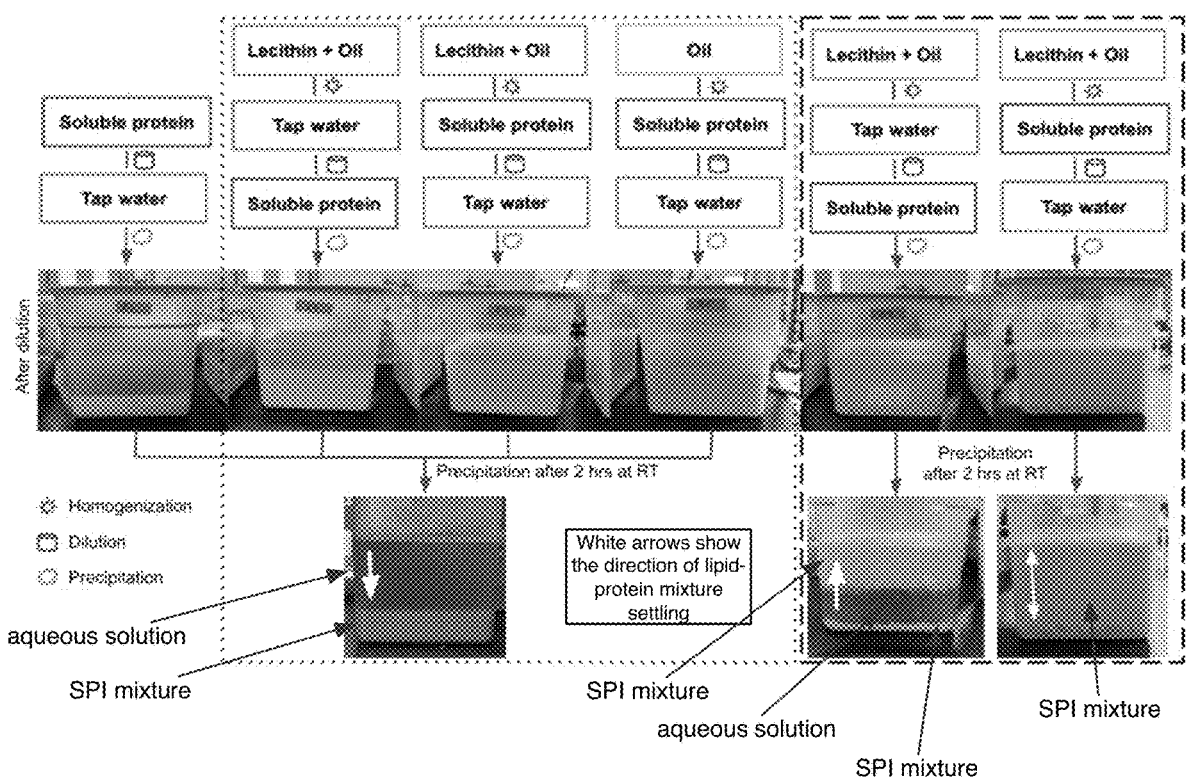
FIG. 19 depicts illustrative examples of forming SPIs.

S200 can optionally include combining the protein isolate units with phospholipids. An example is shown in FIG. 19. For example, phospholipids can be combined with the lipid component to form a lipid-phospholipid mixture, wherein the protein isolate units (e.g., protein isolate solution) are then combined with the lipid-phospholipid mixture to form a protein isolate mixture. However, the phospholipids can be mixed into the lipid component during or after lipid component combination with the aqueous component or the protein isolate mixture, mixed into the protein isolate mixture prior to combination with the lipid component, mixed into the diluted protein mixture (e.g., wherein the lipid component can be mixed into the diluted protein mixture before, during and/or after phospholipid mixing), and/or mixed into the solutions at any other time. However, the protein isolate units, phospholipids, and lipid component can be combined in any order to form a protein isolate mixture. The percent (by weight or volume) of phospholipids in a lipid-phospholipid mixture can be between 0%-40% or any range or value therebetween (e.g., 0%-5%, 1%, 5%-15%, etc.), but can alternatively be greater than 40%. The percent (by weight or volume) of phospholipids in the protein isolate mixture can be between 0%-5% or any range or value therebetween (e.g., 0.05%-0.15%, 0.2%-0.6%, etc.), but can alternatively be greater than 5%.

However, the protein isolate units and lipid component can be otherwise combined.

The method can optionally include diluting the protein isolate units S300, which functions to facilitate and/or induce formation of SPIs. For example, a diluent (e.g., diluting agent, coagulant, precipitant, etc.) can be added to a protein isolate mixture (e.g., protein isolate solution or other protein isolate mixture) such that the protein isolate units are insoluble in the diluted protein isolate mixture. S300 can be performed after S100, after S200, and/or at any other time. S300 can form a diluted protein isolate mixture (e.g., a diluted protein isolate solution) and/or another product. The protein isolate units that are diluted can be within: a protein isolate mixture (e.g., the protein isolate solution; a mixture including protein isolate units and a lipid component; a mixture including protein isolate units and/or any other ingredient, etc.), a protein isolate mixture after protein modification, and/or be any other suitable mixture or component including protein isolate units. In a first specific example, the protein isolate mixture that is diluted can be a protein isolate solution (e.g., from S180). In a second specific example, the protein isolate mixture that is diluted can be a protein isolate unit-lipid component mixture (e.g., from S200).

S300 can include diluting the protein isolate units (e.g., the protein isolate mixture) to achieve a target protein concentration. The target protein concentration (by weight) of the diluted protein isolate mixture can be between 0.5%-90% or any range or value therebetween (e.g., 1%-5%, 1.6%, 1.9%, 5%-40%, 10%-15%, 15%-25%, 25%-50%, etc.), but can alternatively be less than 0.5% or greater than 90%. Additionally or alternatively, the ratio of the protein isolate mixture (e.g., with or without lipids) to the diluent (e.g., diluent mixture) can be 1:10-10:1 (e.g., by weight, by volume, etc.), any range or ratio value therebetween (e.g., 1:1, 1:2, 1:3, 2:3, 4:5, etc.), lower than 1:10, higher than 10:1, and/or be any other suitable ratio. Additionally or alternatively, a ratio between a salt concentration in the protein isolate mixture and a salt concentration in the diluted protein isolate mixture can be greater than a dilution threshold. The dilution threshold can be between 1-10 or any range or value therebetween (e.g., 2, 3, 4, 5, etc.), but can alternatively be less than 1 or greater than 10.

The diluent can include water (e.g., deionized water, substantially pure water, etc.); an aqueous solution (e.g., water; tap water; a mixture of water and other ingredients such as salts, soluble and/or insoluble proteins, emulsifiers, phospholipids, and/or any ingredient in S500; etc.); a non-aqueous solution; a mixture (e.g., emulsion) of an aqueous solution, a lipid component, and optionally phospholipids; an organic polar solvent (e.g., ethanol, methanol, propanol, acetone, any other alcohol, any other antisolvent); a nonpolar solvent (e.g., co-solvent); any organic and/or inorganic solvent; coagulant; precipitant; and/or any other liquid. The diluent can optionally be a filtered liquid from a previous iteration of all or parts of the method.

For example, the diluent can be a diluent mixture (e.g., an emulsion) including a lipid component, an aqueous solution, and optionally other ingredients (e.g., phospholipids), wherein the percent (by weight) of the lipid component in the diluent can be between 0.5%-50% or any range or value therebetween (e.g., 1%-20%, 10%-20%, 5%, 1.67%, 15%, 20%, etc.), but can alternatively be less than 0.5% or greater than 50%. Additionally or alternatively, the ratio of lipid component to the diluent can be 1:10-10:1 (e.g., by weight, by volume, etc.), any range or ratio value therebetween (e.g., 1:1, 1:2, 2:3, 4:5, etc.), lower than 1:10, higher than 10:1, and/or be any other suitable ratio. The percent (by weight or volume) of phospholipids in the diluent can be between 0%-10% or any range or value therebetween (e.g., 0.05%-0.2%), but can alternatively be greater than 10%. The percent (by weight or volume) of phospholipids in the diluted protein isolate mixture can be between 0%-10% or any range or value therebetween (e.g., 0.05%-0.15%), but can alternatively be greater than 10%.

The temperature of the diluent can be between 0° C.-35° C. or any range or value therebetween (e.g., 5° C.-20° C., 20° C.-25° C., etc.), but can alternatively be less than 0° C. or greater than 35° C. The temperature of the diluent is preferably room temperature, but can alternatively be less than or greater than room temperature.

However, the protein isolate units can be otherwise diluted, and/or the SPIs can be otherwise formed.

Collecting structured protein isolates S400 functions to arrange protein isolate units into a structure (e.g., an agglomerate, cluster, any form of aggregate, etc.). S400 can optionally function to arrange the SPIs into one or more aggregates of SPIs. S400 can be performed after S300, during and/or in conjunction with S300 (e.g., wherein diluting the protein isolate units partially or fully arranges the protein isolate units into SPIs, wherein diluting the protein isolate units induces precipitation, etc.), without S300, and/or at any other time.

S400 can include separating a protein isolate mixture (e.g., the diluted protein isolate mixture from S300) to collect SPIs (e.g., an SPI mixture) from the protein isolate mixture. Separating the protein isolate mixture can use methods including: decanting, filtering, drying, centrifuging, allowing sedimentation to occur, isoelectric precipitation, antisolvent precipitation (e.g., using an antisolvent diluent in S300, and separating the diluted protein isolate mixture), precipitation via any solvent exchange process, adjusting ionic strength (e.g., adding and/or removing salts from the protein isolate mixture), adjusting a ratio and/or concentration of any solvent or solute in the protein isolate mixture, hydrolysis, aggregation, gelation, one or more treatments (e.g., adjusting temperature, electrical treatment, pulses, light treatment, radiation, free radicals, sound treatment, etc.), dialysis, any fractionation method, a combination thereof, and/or any other separation method. One or more separation methods can optionally use: an enzyme, protein, polysaccharide, fat, mineral, salt, acid, base, gelation agent, aqueous component, lipid component, polar solvent (e.g., antisolvent), non-polar solvent, any diluent, and/or any other ingredient or chemical. In a specific example, a product containing antisolvent precipitates (ASPs) (e.g., a protein component collected using antisolvent precipitation) can result in a product with decreased water/fat binding relative to a product containing SPIs collected using aqueous dilution; this decreased water/fat binding can result in protein dispersed in excess liquid (after product gelation, after product heating, etc.).

In a first variant, S400 can include allowing sedimentation to occur in the protein isolate mixture (e.g., the diluted protein isolate mixture) and extracting the insoluble fraction (e.g., removing all or part of the supernatant), wherein all or part of the insoluble fraction (e.g., the sediment and/or precipitate) can contain SPIs. For example, the SPIs can sediment out of a diluted protein isolate mixture including protein isolate units, an aqueous component, and optionally a lipid component. In another example, the SPIs can be extracted out of the supernatant (e.g., sedimented, precipitated, etc.). In a specific example, the SPIs sediment when the percent (by weight) of the lipid component within the diluted protein isolate mixture (e.g., produced using a protein isolate solution with a protein concentration of 6.5% and/or any other concentration) is between 0%-15% or any range or value therebetween (e.g., 5%), but can alternatively be greater than 15%. The lipid component can include or exclude phospholipids. Sedimentation can optionally be facilitated and/or accelerated using one or more mechanical processing methods. In specific examples, sedimentation can be facilitated using agitation (e.g., via an agitated double jacket tank), centrifugation, and/or any other mechanical processing methods. In all or parts of the method, 'SPIs' can refer to the collected insoluble fraction (e.g., the sediment and/or precipitate).

In a second variant, S400 can include using mechanical processing methods including shear, pressurization, spinning (e.g., centrifugation, rotation, oscillation, etc.), other mechanical processing methods in S500, and/or any other mechanical method of isolating structured protein isolates from the protein isolate mixture. For example, S400 can include centrifuging the protein isolate mixture (e.g., the diluted protein isolate mixture, an undiluted protein isolate mixture, etc.) and extracting the insoluble fraction (e.g., removing all or part of the supernatant), wherein all or part of the insoluble fraction (e.g., the precipitate) can contain SPIs. Any type of centrifuge can be used (e.g., types listed in S180). The protein isolate mixture can be centrifuged at an RCF between 500 g-100,000 g or any range or value therebetween (e.g., 1,000 g-30,000 g; 4,000 g-6,000 g; 5,000 g; etc.), but can alternatively be centrifuged at an RCF less than 500 g or greater than 100,000 g. In a specific example, the RCF can be below a centrifugation threshold (e.g., to reduce denaturation of the protein isolate units), wherein the centrifugation threshold can be between 1,000 g-15,000 g or any range or value therebetween (e.g., 5,000 g; 6,000 g; 10,000 g; 50,000 g; etc.), but can alternatively be less than 1,000 g or greater than 15,000 g. In another specific example, the RCF can be above a high-speed centrifugation threshold, wherein the high-speed centrifugation threshold can be between 10,000 g-20,000 g or any range or value therebetween (e.g., 14,000 g, 15,000 g, 16,000 g, 16,900 g, etc.), but can alternatively be less than 10,000 g or greater than 20,000 g. The protein isolate mixture can be centrifuged at an RPM between 100-10,000 or any range or value therebetween (e.g., 2,000-10,000; 4,000-6,000; 5000-5,500; etc.), but can alternatively be centrifuged at an RPM less than 100 or greater than 10,000. In a specific example, the RPM can be below a centrifugation threshold, wherein the centrifugation threshold can be between 1,000-15,000 or any range or value therebetween (e.g., 6,000; 10,000; etc.), but can alternatively be less than 1,000 or greater than 15,000. In another specific example, the RPM can be above a high-speed centrifugation threshold (e.g., which can help isolating smaller molecular weight or soluble proteins), wherein the high-speed centrifugation threshold can be between 5,000-100,000 or any range or value therebetween (e.g., 10,000; 15,000; 20,000; 25,000; 30,000; etc.), but can alternatively be less than 5,000 or greater than 100,000.

In a third variant, S400 includes inducing isoelectric precipitation in the protein isolate mixture (e.g., lowering the pH of the protein isolate mixture close to or at the isoelectric point of the protein) to collect isoelectric protein isolates. For example, the pH of the protein isolate mixture can be adjusted to a pH between 3-6 or any range or value therebetween (e.g., 4-5.5), but can alternatively be less than 3 or greater than 6. In a first example, SPIs can include isoelectric protein isolates. In a second example, isoelectric protein isolates (IPIs) can be used as SPIs in all or parts of the method.

The collected SPIs can be an SPI mixture. For example, the SPI mixture can be or include: the insoluble fraction (e.g., sediment, precipitate, solid fraction, etc.) containing the SPIs; a mixture including the insoluble fraction; a solution including SPIs, an aqueous component, and/or impurities; a mixture including SPIs, an aqueous component, a lipid component (e.g., from S200, from the lipid component mixed into the diluent in S300, etc.), and/or impurities; and/or any other mixture containing SPIs. The overall protein concentration (by weight) in the SPI mixture (e.g., in the insoluble fraction) can be between 5%-100% or any range or value therebetween (e.g., 10%-20%, 30%-50%, 50%-70%, 44%, 40%, etc.), but can alternatively be less than 5%. The remainder of the weight can include lipid components, diluent, impurities (e.g., carbohydrates, salts minerals, etc.), and/or any other suitable component. The carbohydrate concentration (by weight) in the SPI mixture can be between 0.005%-2% or any range or value therebetween (e.g., 0.01%-0.1%, 0.1%-0.2%, 0.2%-1%, 1%-2%, greater than 0.02%, etc.), but can alternatively be less than 0.005% or greater than 2%. The collected SPIs can optionally include SPI aggregates. The threshold percentage of protein from the original protein source that is collected in the SPI mixture (e.g., cumulated protein yield) can be between 40%-90%, between 50%-70% (e.g., 50%, 60%, 62%, 65%, 70%, etc.), above 60%, above 90%, below 40%, and/or be any other suitable yield (e.g., by weight, by volume, etc.). The threshold percentage of protein from the protein isolate mixture that is collected in the SPI mixture can be between 50%-99%, between 80%-90%, between 90%-95% (e.g., 92%), above 70%, above 80%, above 90%, below 50%, and/or be any other suitable yield (e.g., by weight, by volume, etc.). Alternatively, S400 can have any other suitable yield.

The insoluble fraction (e.g., sediment, precipitate, etc.) can include a solid component (e.g., which can be dried to form dry matter) and/or a liquid component. For example, the solid component can be between 5%-80% of the SPI mixture (by weight), or any range or value therebetween (e.g., 10%-50%, 20%-40%, 33%, greater than 10%, greater than 15%, greater than 20%, greater than 25%, greater than 30%, etc.), but can alternatively be less than 5% or greater than 80% of the SPI mixture. All or a portion of the remaining liquid component of the SPI mixture can include an aqueous component (e.g., water), a lipid component, and/or any other ingredient. The protein concentration (by weight) in the solid component (e.g., the purity of the solid component) can be between 70%-99% or any range or value therebetween (e.g., 80%-99%, 90%-99%, 85%, 90%, 96%, 97%, 97.5%, 98%, greater than 70%, greater than 80%, greater than 90%, greater than 95%, etc.), but can alternatively be less than 70% or greater than 99%. Other components of the solid component (e.g., impurities) can include salts, minerals, carbohydrates, lipids, and/or any other chemical or ingredient. The concentration (by weight) of the other components in the solid component can be between 0.1%-10% or any range or value therebetween (e.g., 0.2%-5%, 0.5%-2%, 0.5%, 1%, 1.2%, 1.5%, 2%, greater than 0.5%, greater than 1%, etc.), but can alternatively be less than 0.1% or greater than 10%. The carbohydrate concentration (by weight) in the solid component can be between 0.05%-5% or any range or value therebetween (e.g., 0.1%-5%, 0.5%-2%, 0.5%, 1%, 1.2%, 1.5%, 2%, greater than 0.5%, greater than 1%, etc.), but can alternatively be less than 0.05% or greater than 5%.

However, structured protein isolates can be otherwise collected.

The method can optionally include processing the structured protein isolates S500, which functions to prepare the SPIs for use in manufacturing a product. S500 can be performed after S400, during and/or after S600, and/or at any other time. Additionally or alternatively, processing steps in S500 can be used at any suitable time (e.g., before, during, and/or after: S100, S200, S300, S400, and/or S600) to process the protein source, protein isolate units, ingredients, and/or a product (e.g., containing SPIs).

Processing the SPIs (e.g., the SPI mixture) can include: adding ingredients (e.g., diluting, adding a lipid component, etc.), removing ingredients (e.g., defatting, removing salts, removing alcohols, filtering, pressing, draining, etc.), adjusting pH level (e.g., increasing or decreasing the acidity; as described in S160), adjusting salt content, mechanical processing (e.g., homogenizing, centrifuging, shredding, pressurizing, comminuting, shearing, agitating, mixing, etc.), separating the SPI mixture (e.g., SPI solution), adjusting temperature, aging (e.g., at a target temperature; wherein aging can facilitate ripening, fermentation, affinage, maturation, etc.), fermenting, humidifying/dehumidifying, agitating, resting, adjusting oxygen level, gelation (e.g., curdling) methods, any curd processing methods (e.g., cutting, stretching, pressing, brining, molding, etc.), modifying proteins, a combination thereof, and/or any other processing methods. In specific examples, gelation methods can include: adjusting pH, adjusting salt content, adding enzymes, adding hydrocolloids (e.g., carrageenans, gums, etc.), adding a lipid component (e.g., a lipid component with a melt point above room temperature), adjusting temperature, fermenting, aging, extraction and/or extraction assistance methods (e.g., high pressure assisted extraction, enzyme assisted extraction, ultrasound assisted extraction, etc.), microparticulation, and/or any other processing methods. In a specific example, molding an SPI mixture can include: transferring the SPI mixture into a mold while at a raised temperature, and allowing the SPI mixture to cool (e.g., setting to form a molded gel). Any processing method can be performed a single time, multiple times, concurrently, iteratively, asynchronously, sequentially (in any order), and/or at any other time.

In a first variant, processing the SPIs can include adding ingredients to the SPIs. Adding ingredients to the SPIs can include combining the SPIs with one or more ingredients, wherein combining can include emulsifying, mixing, blending, homogenizing, and/or any other combination method. Examples of ingredients can include: plant matter, proteins (e.g., protein source, protein source solution, protein isolate units, SPIs, etc.), a lipid component, an aqueous component (e.g., water, a sucrose solution, etc.), preservatives, acids and/or bases, macronutrients (e.g., protein, fat, starch, sugar, etc.), nutrients, micronutrients, carbohydrates (e.g., sugars, starches, fibers, polysaccharides, such as maltodextrin, gums, etc.), starches (e.g., native and/or modified starches; potato, tapioca, corn, sago, starch-based texturizers such as Advanta Gel S™, etc.), vitamins, enzymes (e.g., transglutaminase, chymosin, tyrosinase, bromelain, papain, ficain, other cysteine endopeptidases, rennet enzymes and/or rennet-type enzymes, etc.), emulsifiers (e.g., lecithin), particulates, hydrocolloids (e.g., thickening agents, gelling agents, emulsifying agents, stabilizers, etc.; such as starch, gelatin, pectin, and gums, such as: agar, alginic acid, sodium alginate, guar gum, Ticaloid® gum, locust bean gum, beta-glucan, xanthan gum, konjac gum, etc.), salts (e.g., NaCl, CaCl2, NaOH, KCl, NaI, MgCl2, etc.), minerals (e.g., calcium), chemical crosslinkers (e.g., transglutaminase) and/or non-crosslinkers (e.g., L-cysteine), coloring (e.g., natural coloring agent), flavoring compounds (e.g., natural flavoring agent), vinegar (e.g., white vinegar), mold powders, microbial cultures, carbon sources (e.g., to supplement fermentation), calcium citrate, any combination thereof, and/or any other ingredient. Microbial cultures can include cultures for cheeses such as blue, camembert, cheddar, alpine, parmesan, swiss, edam, and/or any other microbial culture and/or combination thereof. The ingredients can optionally exclude and/or include less than a threshold amount (e.g., 10%, 5%, 3%, 2%, 1.5%, 1.25%, 1%, 0.5%, 0.1%, etc.) of added: animal products, animal-derived ingredients, gums (e.g., polysaccharide thickeners), hydrocolloids, allergens, phospholipids, soy derivatives, starches, a combination thereof, and/or any other suitable ingredient. The ingredients are preferably food-safe, but can alternatively be not food-safe.

Examples of microbial cultures that can be used include: cheese cultures (e.g., cheese starter cultures), yogurt cultures, wine cultures, beer cultures, and/or any other microbial culture and/or combination thereof. For example, microbial cultures can include cultures for cheeses such as blue, camembert, cheddar, alpine, parmesan, swiss, edam, and/or any other microbial culture and/or combination thereof. Examples of microbes in the cultures that can be used include: *Arthrobacter arilaitensis*, *Arthrobacter bergerei*, *Arthrobacter globiformis*, *Arthrobacter nicotianae*, *Arthrobacter variabilis*, *Bifidobacterium adolescentis*, *Bifidobacterium animalis*, *Bifidobacterium bifidum*, *Bifidobacterium breve*, *Bifidobacterium infantis*, *Bifidobacterium lactis*, *Bifidobacterium longum*, *Bifidobacterium pseudolongum*, *Bifidobacterium thermophilum*, *Brachybacterium alimentarium*, *Brachybacterium tyrofermentans*, *Brevibacterium aurantiacum*, *Brevibacterium casei*, *Brevibacterium linens*, *Candida colliculosa*, *Candida kefyr*, *Candida jefer*, *Candida krusei*, *Candida mycoderma*, *Candida utilis*, *Candida vini*, *Candida zeylanoides*, *Carnobacterium divergens*, *Carnobactrium maltaromaticum*, *Corynebacterium ammoniagenes*, *Corynebacterium casei*, *Corynebacterium flavescens*, *Corynebacterium mooreparkense*, *Corynebacterium variabile*, *Cystofilobasidium infirmominiatum*, *Debaryomyces hansenii*, *Debaryomyces kloeckeri*, *Enterococcus faecalis*, *Fusarium domesticum*, *Geotrichum candidum*, *Hafnia alvei*, *Halomonas*, *Issatchenkia orientalis*, *Kazachstania exigua*, *Kazachstania unispora*, *Kluyveromyces lactis*, *Kluyveromyces marxianus*, *Kocuria rhizophila*, *Kocuria varians*, *Lactobacillus acidipiscis*, *Lactobacillus acidophilus*, *Lactobacillus brevis*, *Lactobacillus bulgaricus*, *Lactobacillus casei*, *Lactobacillus coryniformis*, *Lactobacillus curvatus*, *Lactobacillus delbrueckii* (e.g., *Lactobacillus delbrueckii bulgaricus*), *Lactobacilus fermentum*, *Lactobacillus gasseri*, *Lactobacillus helveticus*, *Lactobacillus johnsonii*, *Lactobacillus kefiranofaciens*, *Lactobacillus kefiri*, *Lactobacillus nodensis*, *Lactobacillus parabrevis*, *Lactobacillus paracasei*, *Lactobacillus parakefiri*, *Lactobacillus paraplantarum*, *Lactobacillus pentosus*, *Lactobacillus perolents*, *Lactobacillus plantarum*, *Lactobacillus rhamnosus*, *Lactobacillus salivarius*, *Lactobacillus tucceti*, *Lactococcus*

*lactis* (e.g., *Lactococcus lactis lactis*, *Lactococcus lactis cremoris*, *Lactococcus lactis* subsp. *lactis* biovar. *Diacetylactis*, etc.), *Lactococcus raffinolactis*, *Lecanicillium lecanii*, *Leuconostoc citreum*, *Leuconostoc citovorum*, *Leuconostoc dextranicum*, *Leuconostoc pseudomesenteroides*, *Leuconostoc kimchi*, *Leuconostoc mesenteroides*, *Macrococcus caseolyticus*, *Microbacterium foliorum*, *Microbacterium gubbeenense*, *Micrococcus luteus*, *Pediococcus*, *Penicillium album*, *Penicillium camemberti*, *Penicillium caseifulvum*, *Penicillium chrysogenum*, *Penicillium commune*, *Penicillium nalgiovense*, *Penicillium roqueforti*, *Pichia fermentans*, *Propionibacterium acidipropionici*, *Propionibacterium freudenreichii*, *Propionibacterium jensenii*, *Proteus vulgaris*, *Psychrobacter celer*, *Rhodosporidium infirmominiatum*, *Rhodotorula minuta*, *Saccharomyces cerevisiae*, *Staphylococcus carnosus*, *Staphylococcus equorum*, *Staphylococcus fieurettii*, *Staphylococcus saphrophyticus*, *Staphylococcus sciuri carnaticus*, *Staphylococcus succinus*, *Staphylococcus vitulinus*, *Staphylococcus xylosus*, *Streptococcus cremoris*, *Streptococcus lactis*, *Streptococcus lactis* subspecies *diacetylactis*, *Streptococcus thermophilus*, *Streptococcus gallolyticus*, *Streptococcus salivarius*, *Thrichosporon beigelii*, *Verticillium lecanii*, *Yarrowia lipolytica*, *Zygotorulaspora florentina*, the genuses thereof, the families thereof, the phyla thereof, and/or any other suitable microbe and/or combination thereof. In specific examples the cultures can be: RA21 (e.g., including *Lactococcus lactis lactis*, *Lactococcus lactis cremoris*, and *Streptococcus thermophilus*), CASU (e.g., including *Lactococcus lactis lactis*, *Lactobacillus helveticus*, and *Streptococcus thermophilus*), V022 (e.g., including *Bifidobacterium lactis*, *Lactobacillus acidophilus*, *Lactobacillus delbrueckii bulgaricus*, *Lactobacillus plantarum*, and *Streptococcus thermophilus*), V061 (e.g., including *Bifidobacterium lactis*, *Lactobacillus acidophilus*, *Lactobacillus delbrueckii bulgaricus*, *Streptococcus thermophilus*, and *Lactobacillus paracasei*), V011, V053, BT02, LM57, FLAV54, and/or any other microbial culture.

In a first embodiment, adding ingredients can include diluting the SPIs (e.g., using water and/or other ingredients) to achieve a target protein concentration. The target protein concentration (by weight) (e.g., in the SPI mixture, in a product, in a product intermediate, etc.) can be between 0.5%-90% or any range or value therebetween (e.g., 1%-5%, 1.6%, 1.9%, 5%-40%, 1%-25%, 5%-20%, 10%-15%, 15%-25%, 18%-22%, 25-50%, at least 15%, etc.), but can alternatively be less than 0.5% or greater than 90%. Diluting the SPIs can optionally function to form a diluted SPI mixture (e.g., a diluted SPI solution), wherein the diluted SPI mixture can be used as an ingredient and processed via other S500 methods and/or used to produce a product via S600 methods.

In a second embodiment, adding ingredients can include combining (e.g., emulsifying) the SPIs (e.g., the SPI mixture) with a lipid component. The target lipid concentration (by weight) (e.g., in the combined SPI mixture, in a product, in a product intermediate, etc.) can be between 0.5%-90% or any range or value therebetween (e.g., 1%-5%, 1.6%, 1.9%, 5%-40%, 5%-30%, 5%-25%, 10%-15%, w %-20%, 12%-22%, at least 10%, etc.), but can alternatively be less than 0.5% or greater than 90%. The resulting mixture can be a stable emulsion, an unstable emulsion (e.g., coalesce, cream, flocculate, break, etc.), a suspension, a colloid, and/or any other mixture. Optionally, the lipid component and/or the SPIs can be heated prior to and/or during addition. Heating the lipid component can optionally transition the lipid component from a solid to a liquid (e.g., a melted lipid component), which can facilitate homogenization of the mixture. The lipid component is preferably heated below a threshold temperature (e.g., 85° C.) and/or allowed to cool to a temperature below the threshold temperature before combining with the SPIs, such that proteins in the SPIs do not denature, but can alternatively be otherwise heated. The resultant mixture can be used as an end product (e.g., a food product) and/or be used as an ingredient for a downstream process (e.g., S600).

Figure 3:
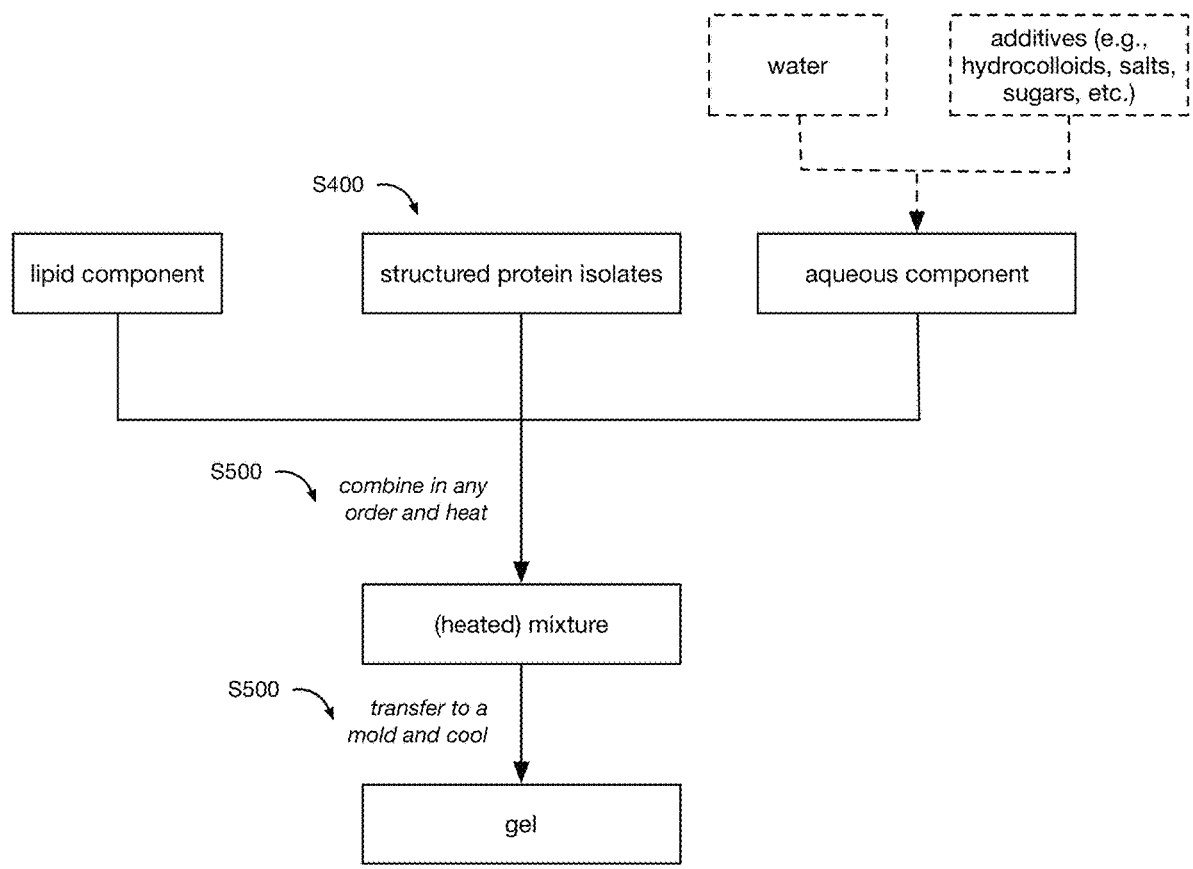
FIG. 3 depicts a second example of the method.

In a specific example, adding ingredients includes: forming an aqueous solution (e.g., with the ingredients), optionally heating the aqueous solution, combining the SPI mixture with the aqueous solution and optionally a lipid component (e.g., a melted lipid component), and optionally heating the resultant mixture. The resultant mixture can optionally be molded. An example is shown in FIG. 3. Forming the aqueous solution can include hydrating one or more additives in water. The additives can function to facilitate gelation, to enhance gel firmness at room temperature (e.g., to enable a shreddable product), to adjust the nutritional profile of the product, and/or provide other functionalities. Additives can include hydrocolloids (e.g., carrageenans, gums, other gelling agents, etc.), sugars (e.g., glucose), fibers, salts, and/or any other additives. The concentration of hydrocolloids in the aqueous solution can be between 0%-15% or any range or value therebetween (e.g., 0%-2%, 0.15%-0.8%, 0.3%-2%, 0.3%, 0.5%, 0.6%, 1%, 2%, 5%, less than 5%, less than 2%, less than 1%, etc.), but can alternatively be greater than 15%. In a specific example, the concentration of carrageenans in the aqueous solution can be between 0-10% or any range or value therebetween (e.g., 0%-2%, 0.15%-0.5%, 0.1%-0.4%, 0.3%, 0.5%, 0.6%, 1%, 2%, 5%, less than 5%, less than 2%, less than 1%, etc.), but can alternatively be greater than 10%. In a specific example, the concentration of gums in the aqueous solution can be between 0-10% or any range or value therebetween (e.g., 0%-2%, 0.15%-0.5%, 0.1%-0.4%, 0.3%, 0.5%, 0.6%, 1%, 2%, 5%, less than 5%, less than 2%, less than 1%, etc.), but can alternatively be greater than 10%. The concentration of sugars in the aqueous solution can be between 0%-15% or any range or value therebetween (e.g., 0%-2%, 0.3%-1%, 0.5%, 1%, 2%, 5%, less than 5%, less than 2%, less than 1%, at least 0.2%, at least 0.3%, at least 0.5%, etc.), but can alternatively be greater than 15%. The aqueous solution can be heated to a temperature between 20° C.-100° C. or any range or value therebetween (e.g., heated to a boil), but can alternatively be heated or cooled to a temperature below 20° C. or above 100° C., or not heated or cooled. The SPI mixture, the aqueous solution, and the lipid component can be combined in any order (e.g., combining the SPI mixture and the aqueous solution, then adding the lipid component; concurrently combining the SPI mixture, the aqueous solution, and the lipid component; etc.). The SPI mixture, the aqueous solution, and the lipid component can optionally be combined before, after, or concurrently with adjusting the temperature to a target temperature (e.g., 70° C., 85° C., 90° C., 95° C., 100° C., etc.) for a target time (e.g., 1 min, 5 min, 10 min, 15 min, 30 min, etc.).

In a first example, the SPI-lipid component mixture includes SPIs in a water droplet, surrounded by the lipid component. In a second example, the mixture includes SPIs in a lipid component droplet, surrounded by water. In a third example, the mixture includes SPIs distributed throughout the lipid and aqueous components of the mixture. The droplets can have a diameter (e.g., volume-weighted mean diameter or area-weighted mean diameter) between 500 nm-1 mm or any range or value therebetween (e.g., 500 nm-10,000 nm, 10,000 nm-0.1 mm, 0.1 mm-1 mm, etc.), but can alternatively be less than 500 nm or greater than 1 mm. Droplets can be generated using emulsification methods, droplet encapsulation techniques (e.g., microfluidic droplet encapsulation techniques), sonication, suspension techniques, other colloid-formation techniques, and/or any other technique. SPIs inside or outside of droplets can optionally form aggregates of SPIs. However, the mixture can be otherwise structured.

In a specific example, adding the lipid component includes mixing (e.g., emulsifying) the SPI mixture in the lipid component. The lipid component preferably forms the continuous phase of the emulsion while the SPI mixture is in a dispersed phase (e.g., water in oil emulsion or an oleogel). For example, the ratio between lipid component and SPI mixture can be between 10:1-1:1 (e.g., by weight, by volume, etc.) or any range or ratio value therebetween (e.g., 2:1, 3:2, 5:4, etc.). An emulsion with the lipid component as the continuous phase can result in an arrangement of proteins (e.g., an arrangement of the SPIs) within the emulsion that increases stretch and/or melt characteristics of the product formed from the emulsion. Alternatively, the SPI mixture can be in the continuous phase while the lipid component is in the dispersed phase (e.g., oil in water emulsion). For example, the ratio between lipid component and SPI mixture can be 1:10-1:1 (e.g., by weight, by volume, etc.) or any range or ratio value therebetween (e.g., 1:1, 1:2, 2:3, 4:5, etc.). Additionally, SPIs distributed throughout the lipid and aqueous components can optionally be mixed/homogenized together, resulting in one or other as a dispersed or continuous medium (e.g., oil droplets containing SPIs dispersed in water containing SPIs or vice versa).

In a third embodiment, ingredients are added such that a nutritional profile of a product produced from the SPIs substantially matches a target nutritional profile (e.g., for a target product).

However, ingredients can be otherwise added.

In a second variant, processing the SPIs can include adjusting salt content of the SPIs and/or changing the ionic strength of the SPIs can include increasing or decreasing the concentration of salt in the SPIs to achieve a target salt concentration. The target salt concentration can be between 0.05M-5M or any range or value therebetween (e.g., 0.1M-1M, 0.5M-2M, 0.8M-0.9M, less than 4M, less than 2M, less than 1M, etc.), but can alternatively be less than 0.05M or greater than 5M. The target salt concentration can result in a conductively between 0.5-10,000 millisiemens or any range or value therebetween (e.g., 1-10 millisiemens, 2-8 millisiemens, 10-100 millisiemens, 100-10,000 millisiemens, etc.), but can alternatively be less than 0.5 millisiemens or greater than 10,000 millisiemens. The target salt concentration as a percent (by weight) (e.g., in the SPI mixture, in a product, in a product intermediate, etc.) can be between 0%-10% or any range or value therebetween (e.g., 0.1%-5%, 0.5%-2%, at least 1%, at least 2%, less than 5%, etc.), but can alternatively be greater than 10%. In a specific example, the target concentration of calcium citrate can be between 0%-5% or any range or value therebetween (e.g., 0.1%-1%, 0.5%-1%, 0.3%-2.5%, 0.5%-2%, 1%-2%, 1.2%-2%, at least 0.25%, at least 0.5%, at least 1%, at least 2%, etc.), but can alternatively be greater than 5%. In a first variant, increasing the concentration of salt includes adding salts to the SPIs. Examples of salts include: NaCl, calcium citrate (CaCit), CaCl2, sodium citrate, MgCl2, disodium phosphate, dipotassium phosphate, salts with cations (e.g., divalent cations, such as calcium), and/or any other salt. Increasing the concentration of salt can optionally function to improve the flavor and/or nutritional profile of a product produced using the SPIs. In a second variant, decreasing the concentration of salt includes rinsing SPIs, dialysis, washing (e.g., washing followed by centrifugation, filtration, etc.), and/or any other method of decreasing the concentration of salt. For example, SPIs can be resuspended in deionized water and sedimentation can be allowed to occur again to form a structured protein isolate solution with a lower salt concentration. Decreasing the concentration of salt can optionally function to improve a texture profile (e.g., stretch and/or melt characteristics) of a product produced using the SPIs.

In a third variant, processing the SPIs can include applying shear to the SPIs (e.g., homogenizing the SPI mixture, homogenizing the SPIs with added ingredients, etc.). Applying shear can include mixing, blending, vortexing, homogenizing, applying pressure, and/or any other shear processing. Applying shear to the SPIs can include using a rotor stator system, any other homogenizer device, and/or any other shear application device. The shear application device preferably imparts a shear force below a threshold (e.g., to not break up protein structures in the protein solution), but can alternatively impart any shear force. The rotor stator system can be used between 500 rpm-20,000 rpm or any range or value therebetween (e.g., 5000-10,000, 5500, 10,000, etc.), but can alternatively be used below 500 rpm or above 20,000 rpm. The rotor stator system can be used for a time period between 10 seconds-12 hours or any range or value therebetween (e.g., 1 min, 40 min, 1 hour, etc.), but can alternatively be used for less than 10 seconds or greater than 12 hours. Alternatively, a rotor station system can be used at any other rpm and for any amount of time.

Figure 20A:
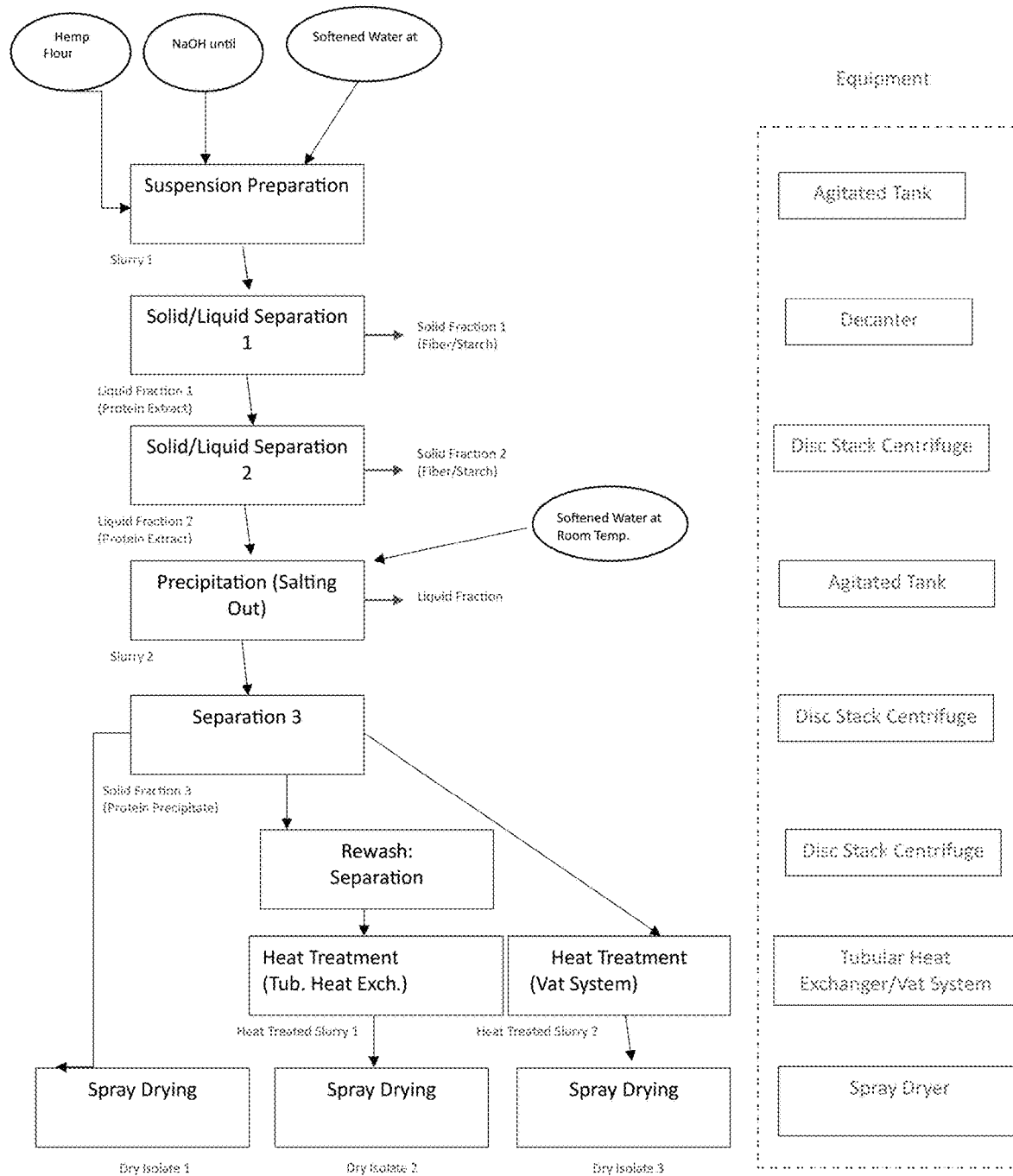
FIGS. 20A and 20B depict specific examples of the method.
Figure 20B:
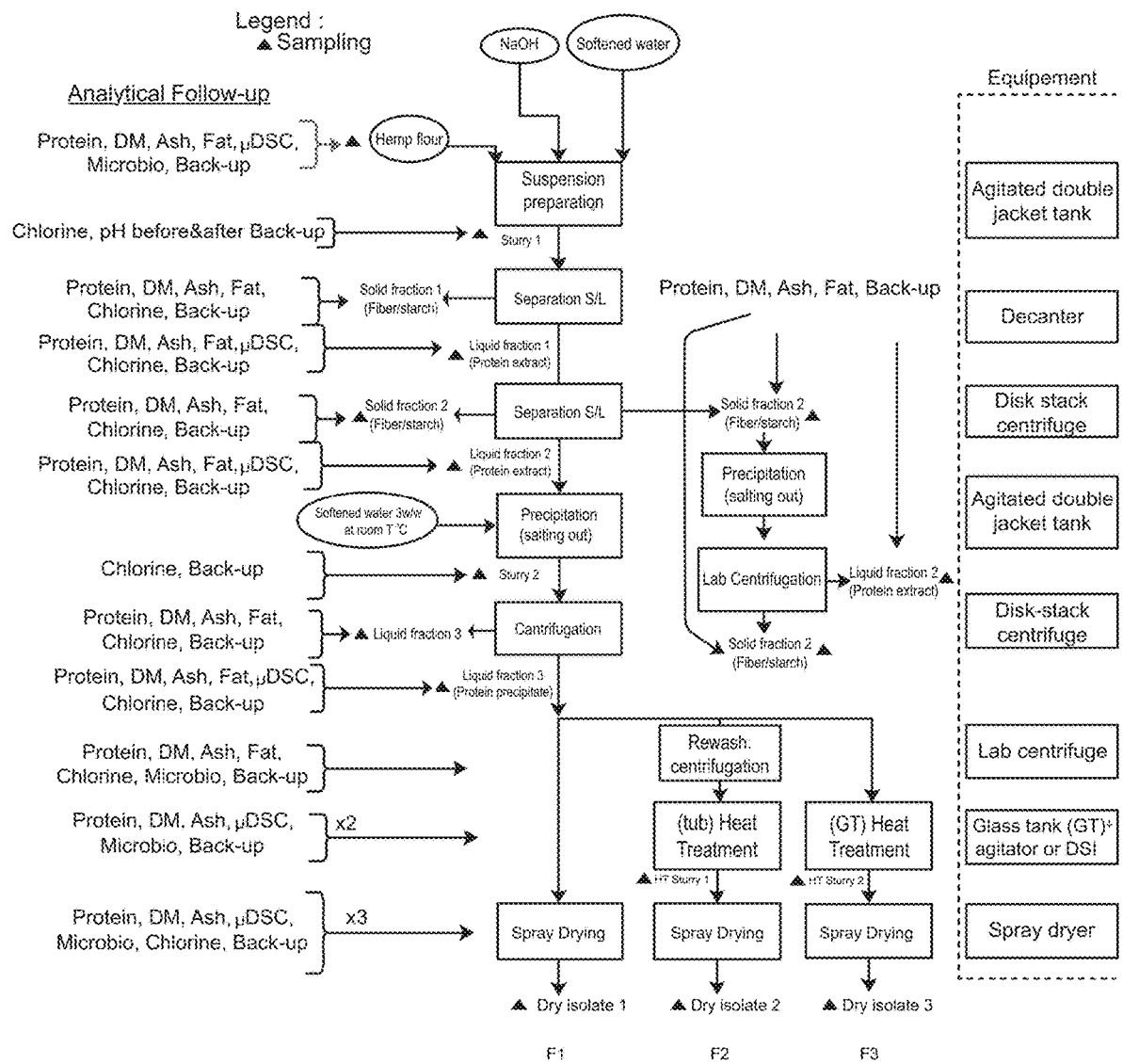
Figure 21:
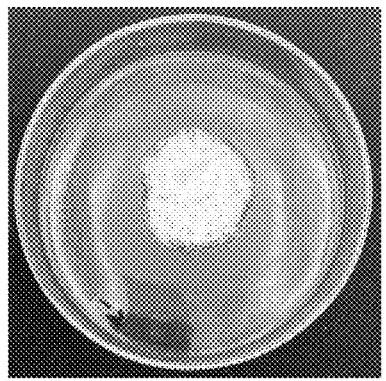
FIG. 21 depicts images post-heating in a Schreiber test (with a target heating temperature of 230° C.) for: Product A (15% total protein by weight; 35% lipid by weight) including SPIs (insoluble fraction collected using dilution with water) and a lipid component; Product B (15% total protein by weight) including SPIs without a lipid component; Product C (15% total protein by weight; 35% lipid by weight) including isoelectric precipitation isolates (IPIs) (insoluble fraction collected using isoelectric precipitation) and a lipid component; Product D (15% total protein by weight) including IPIs without a lipid component; Product E (15% total protein by weight; 35% lipid by weight) including antisolvent precipitates (ASPs) (e.g., insoluble fraction collected using antisolvent precipitation) and a lipid component; Product F (15% total protein by weight) including ASPs without a lipid component; Product G (15% total protein by weight; 35% lipid by weight) including hemp powder and a lipid component; a commercial plant-based cheese; and a dairy cheese (e.g., mozzarella).
Figure 21:
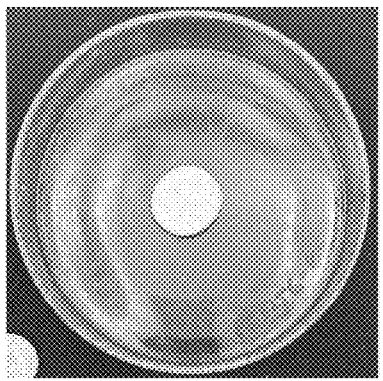
Figure 21:
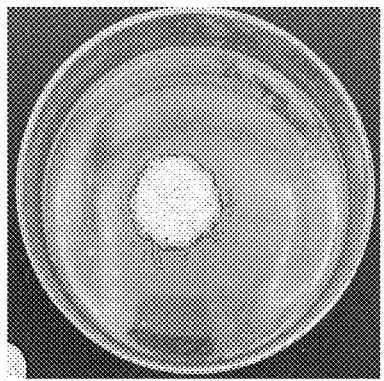
Figure 21:
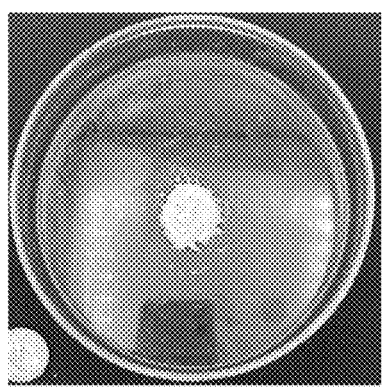
Figure 21:
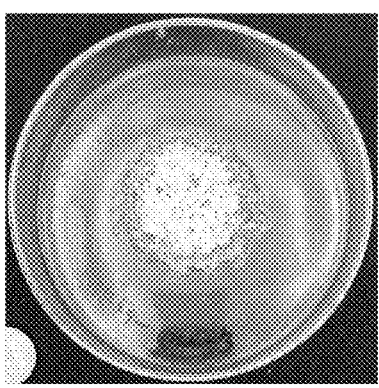
Figure 21:
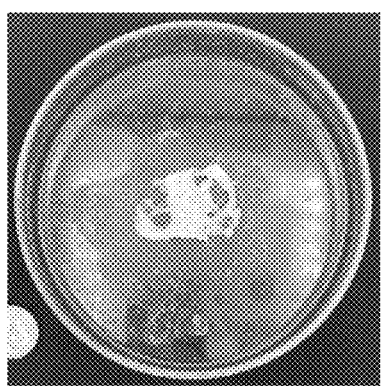
Figure 21:
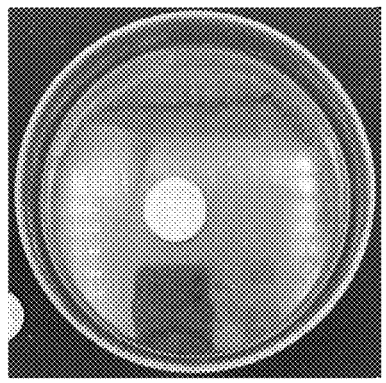
Figure 21:
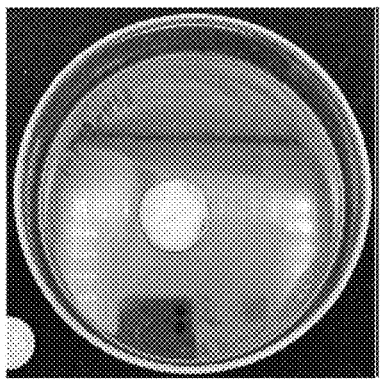
Figure 21:
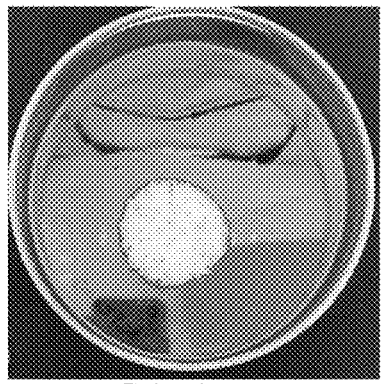
Figure 22:
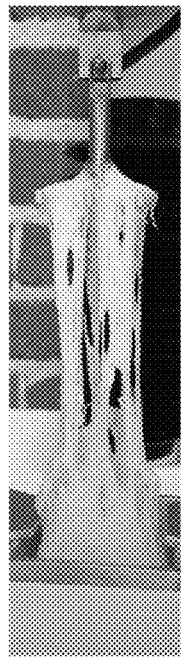
FIG. 22 depicts images acquired at or near distance to failure in an extensibility assay (with a target heating temperature of 250° C.; extension rate of 5 mm/s) for the products depicted in FIG. 21, namely: Product A; Product B; Product C; Product D; Product; Product F; and Product G; a commercial plant-based cheese; and a dairy cheese, respectively.
Figure 22:
Figure 22:
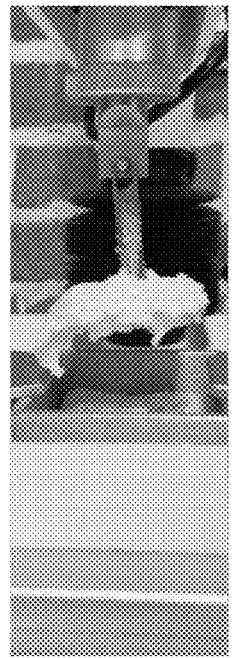
Figure 22:
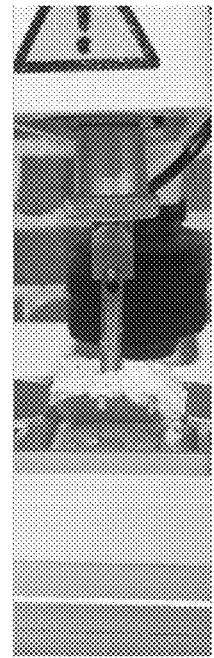
Figure 22:
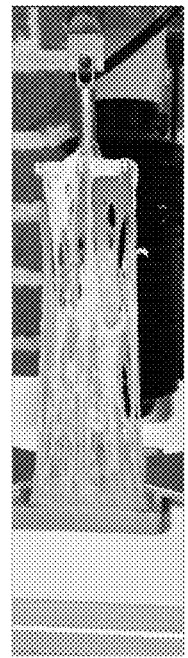
Figure 22:
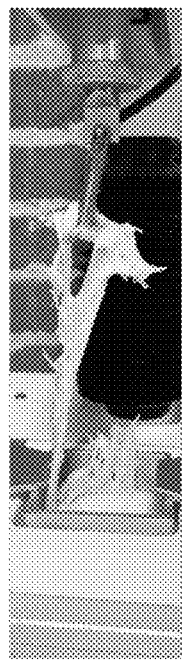
Figure 22:
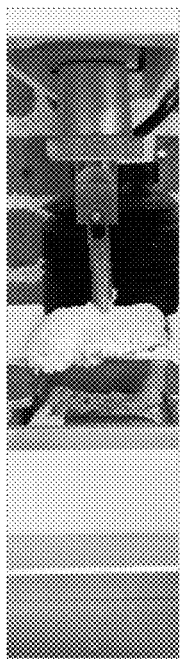
Figure 22:
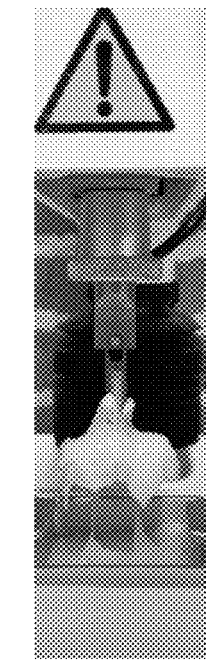
Figure 22:
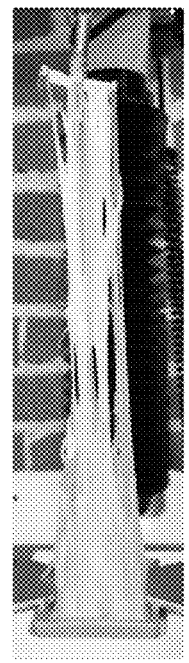
Figure 23A:
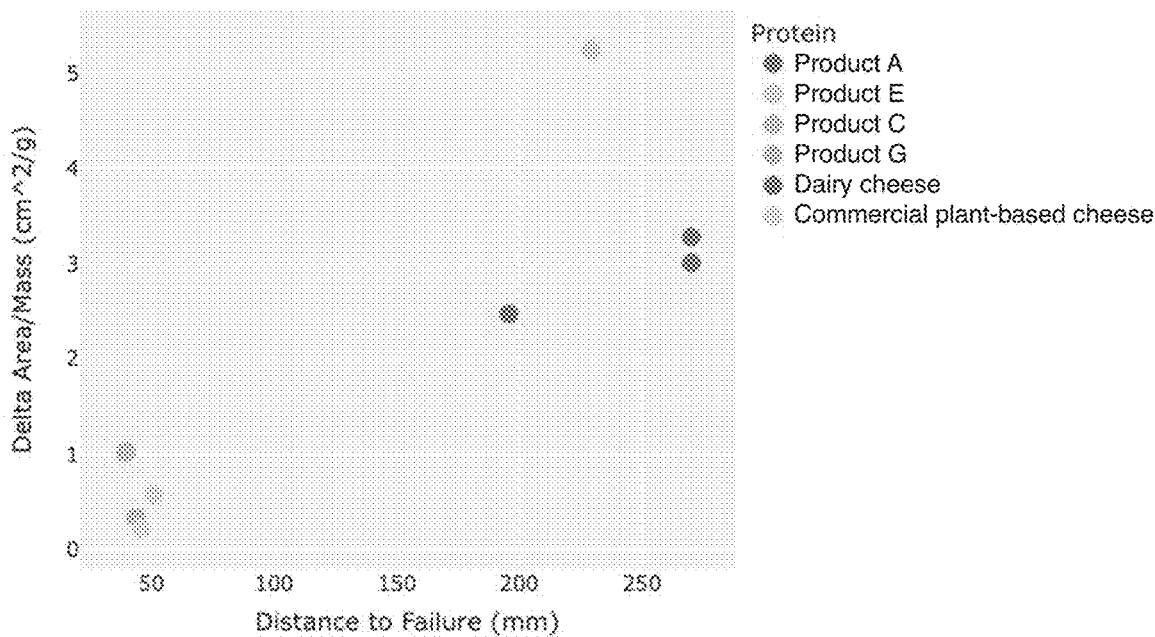
FIG. 23A depicts an example of data for a melt metric (final surface area determined using a Schreiber test with a target heating temperature of 230° C.) versus a stretch metric (distance to failure determined using an extensibility assay with a target heating temperature of 250° C. and extension rate of 5 mm/s) for products depicted in FIG. 21, namely: Product A, Product E, Product C, Product G, a dairy cheese, and a commercial plant-based cheese.
Figure 23B:
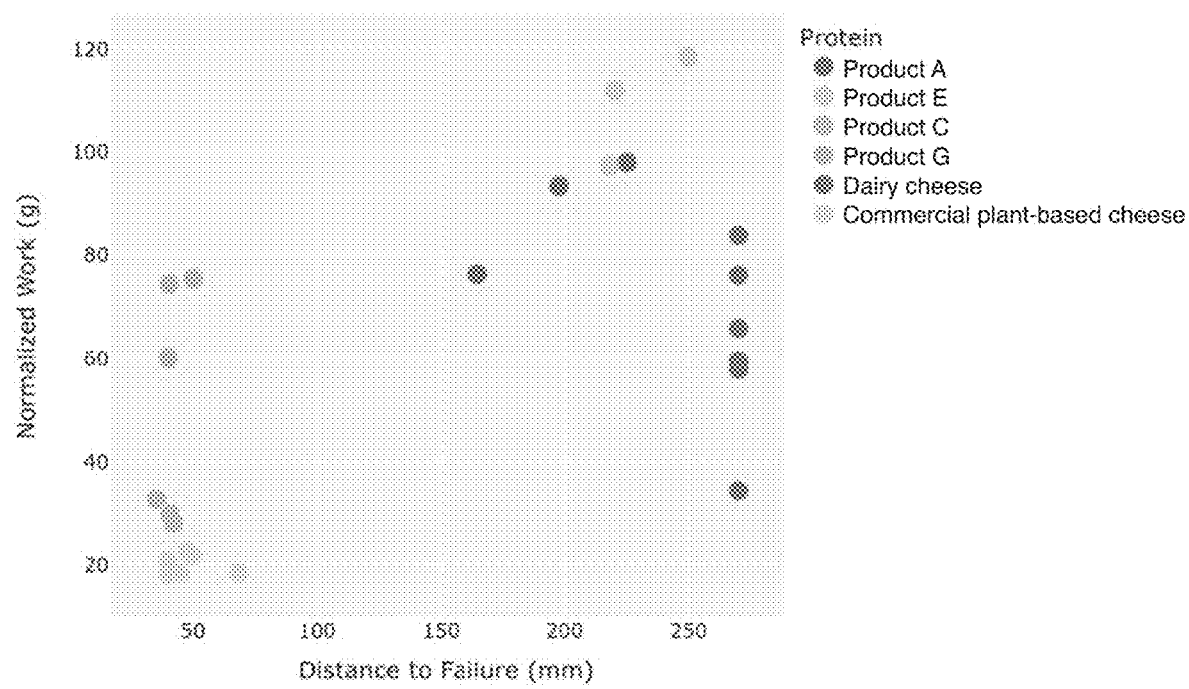
FIG. 23B depicts an example of data (determined using an extensibility assay with a target heating temperature of 250° C. and extension rate of 5 mm/s) for normalized work versus distance to failure for products depicted in FIG. 21, namely: Product A, Product E, Product C, Product G, a dairy cheese, and a commercial plant-based cheese.
Figure 23C:
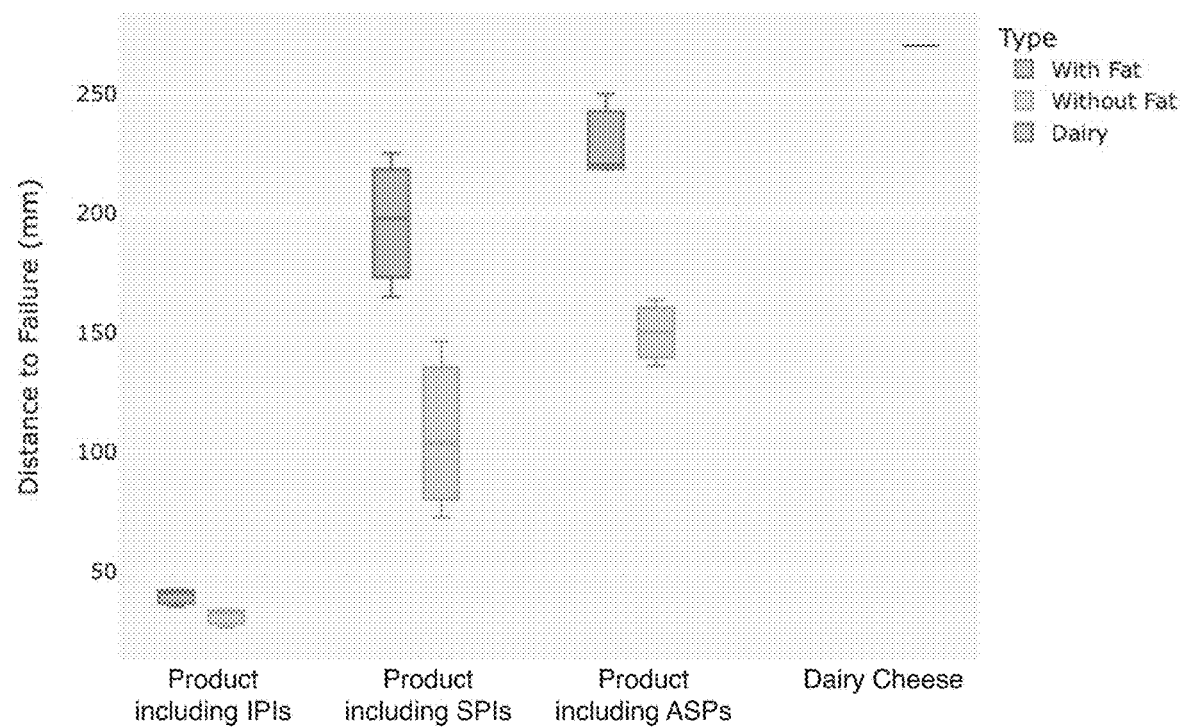
FIG. 23C depicts an example of data comparing distance to failure (determined using an extensibility assay with a target heating temperature of 250° C. and extension rate of 5 mm/s) for products with a lipid component (Product C, Product A, and Product E from FIG. 21) and without a lipid component (Product D, Product B, and Product F from FIG. 21).
Figure 23D:
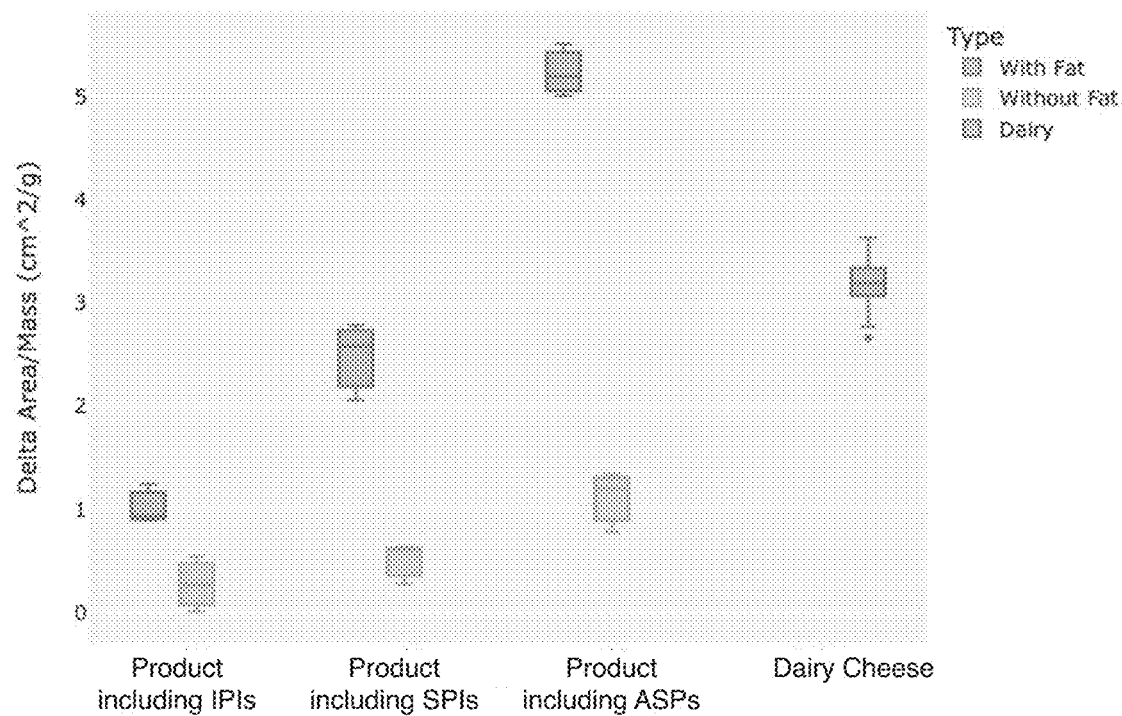
FIG. 23D depicts an example of data comparing final surface area (determined using a Schreiber test with a target heating temperature of 230° C.) for products with a lipid component (Product C, Product A, and Product E from FIG. 21) and without a lipid component (Product D, Product B, and Product F from FIG. 21).
Figure 24:
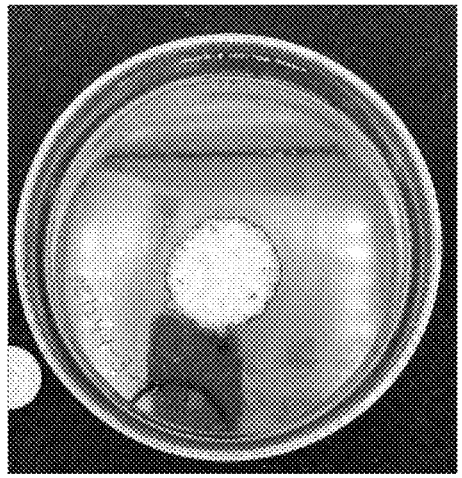
FIG. 24 depicts images post-heating in a Schreiber test (with a target heating temperature of 230° C.) for: Product H (i8% total protein by weight; 35% lipid by weight) including SPIs and a lipid component; Product I (i8% total protein by weight) including SPIs without a lipid component; Product J (i8% total protein by weight; 35% lipid by weight) including IPIs and a lipid component; and Product K (15% total protein by weight) including IPIs without a lipid component.
Figure 24:
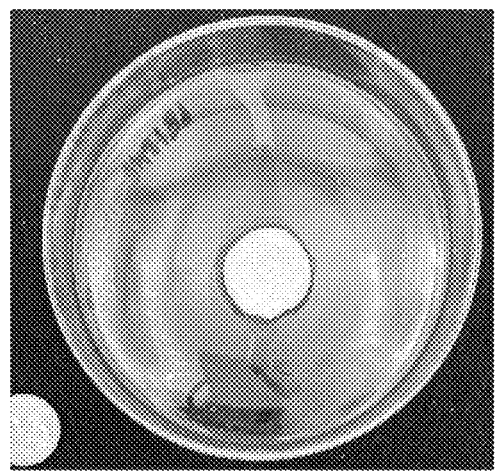
Figure 24:
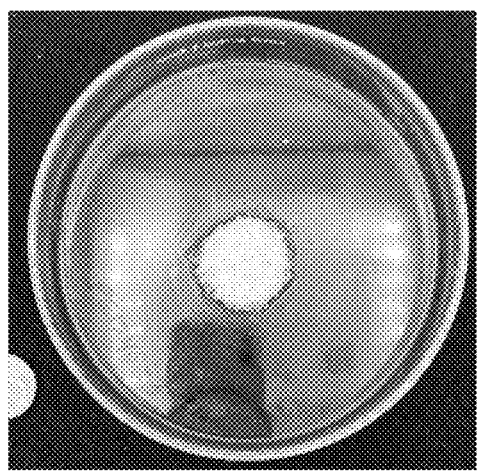
Figure 24:
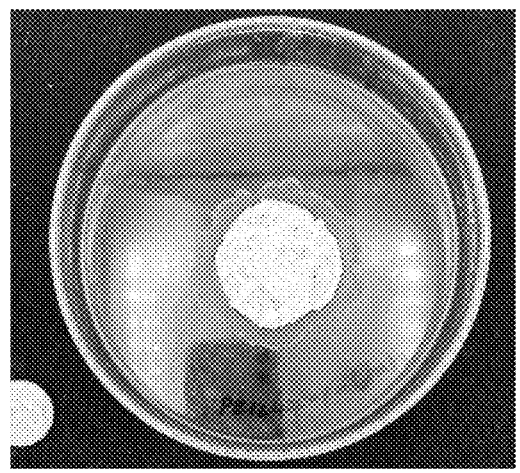
Figure 25A:
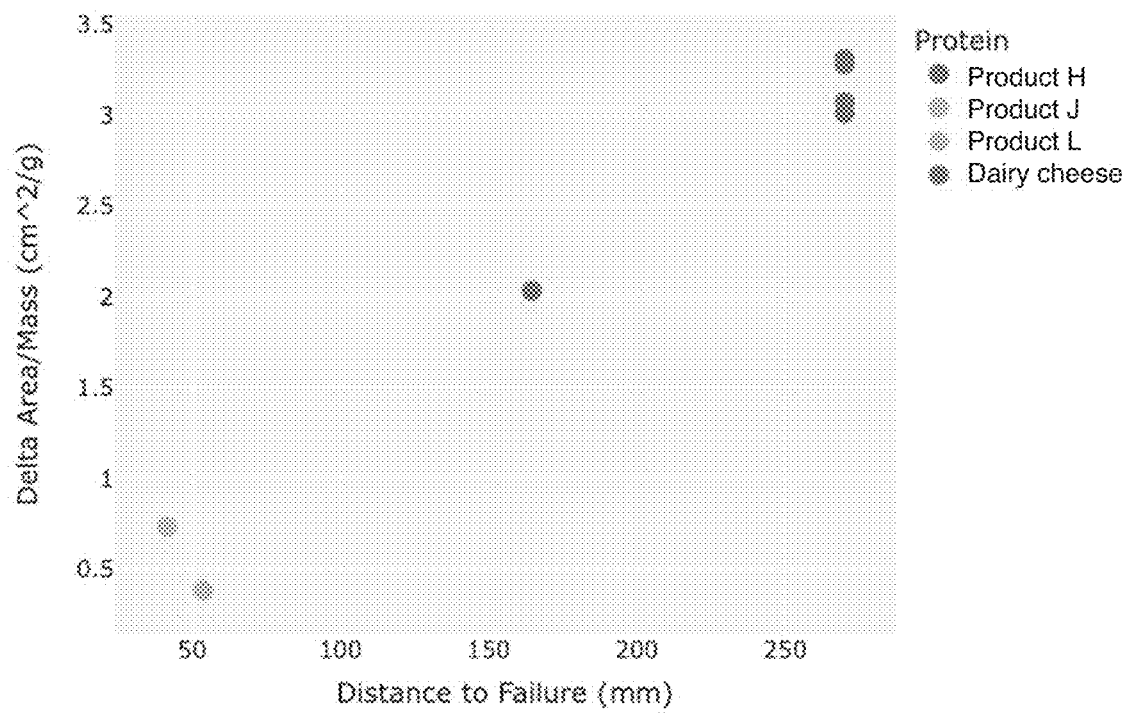
FIG. 25A depicts an example of data for a melt metric (final surface area determined using a Schreiber test with a target heating temperature of 230° C.) versus a stretch metric (distance to failure determined using an extensibility assay with a target heating temperature of 200° C. and extension rate of 5 mm/s) for: Product H from FIG. 24, Product J from FIG. 24, and Product L (i8% total protein by weight; 35% lipid by weight) including hemp powder and a lipid component, and a dairy cheese.
Figure 25B:
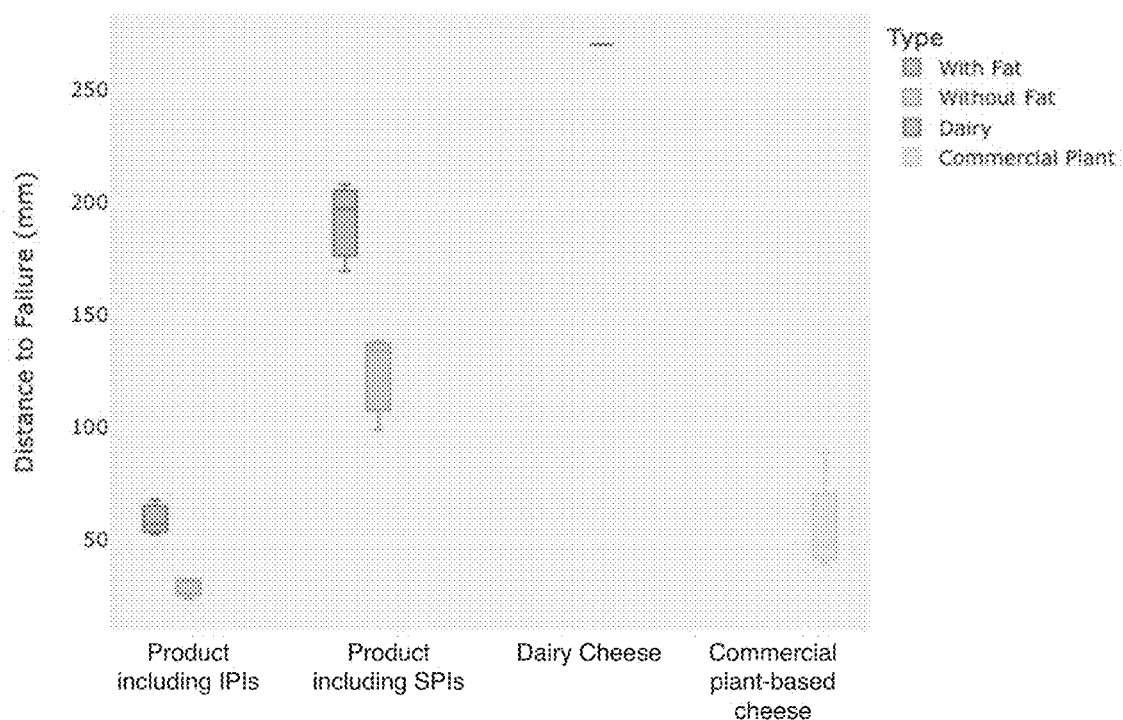
FIG. 25B depicts an example of data comparing distance to failure (determined using an extensibility assay with a target heating temperature of 200° C. and extension rate of 5 mm/s) for products with a lipid component (Product H and Product J from FIG. 24) and without a lipid component (Product I and Product K from FIG. 24).
Figure 25C:
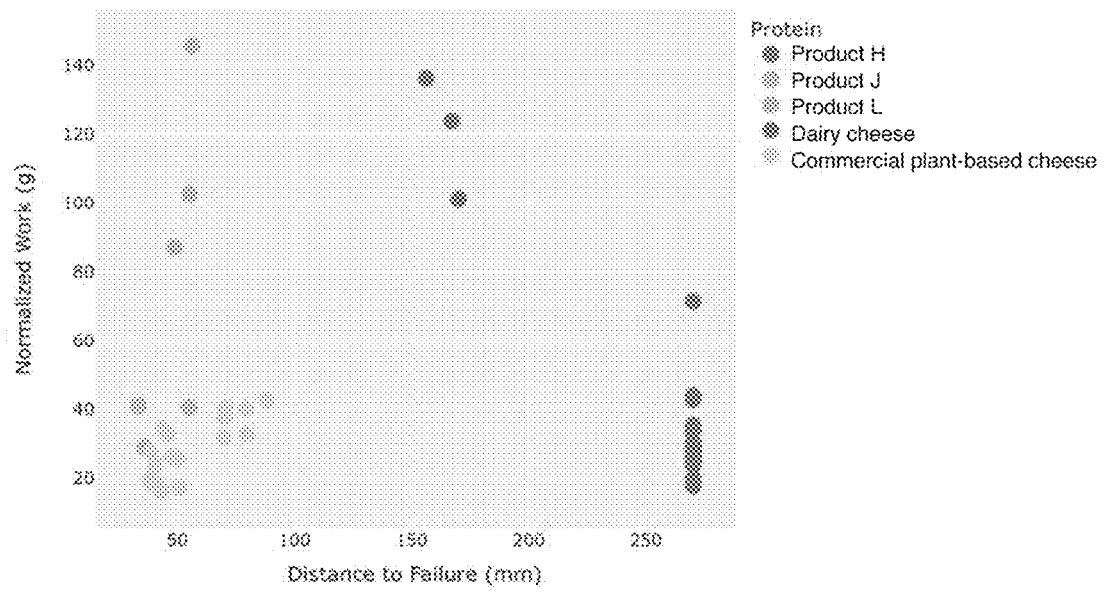
FIG. 25C depicts an example of data (determined using an extensibility assay with a target heating temperature of 200° C. and extension rate of 5 mm/s) for normalized work versus distance to failure for: products from FIG. 25A (Product H, Product J, and Product L); a dairy cheese; and a commercial plant-based cheese.
Figure 25D:
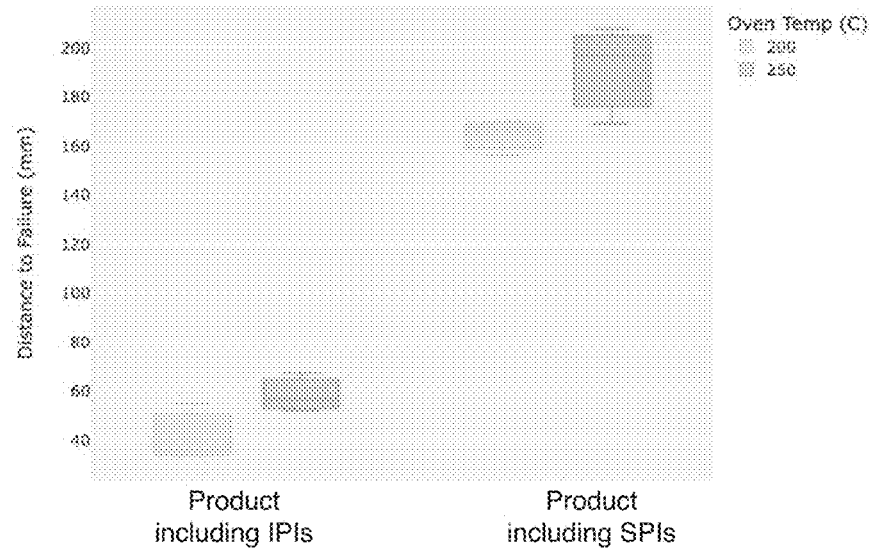
FIG. 25D depicts an example of data comparing distance to failure for products with an extensibility assay target heating temperature of 200° C. versus 250° C.
Figure 25E:
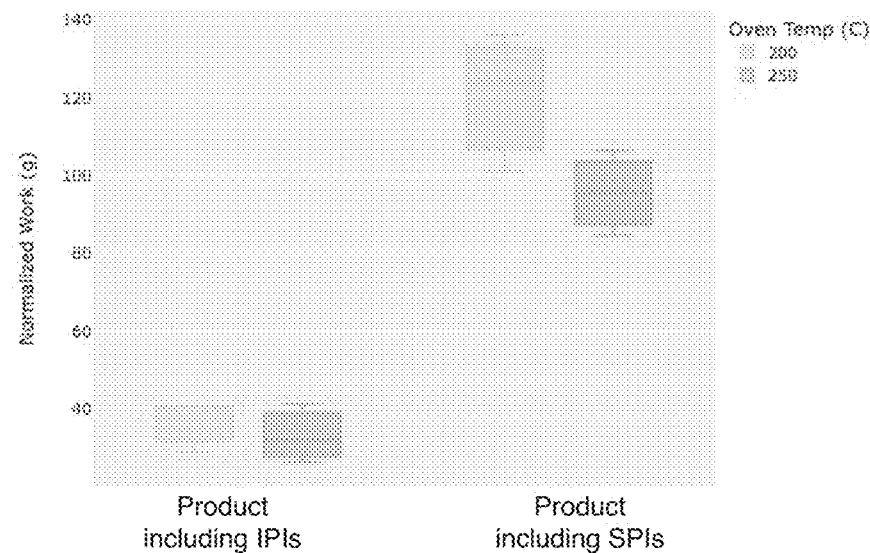
FIG. 25E depicts an example of data comparing normalized work for products with an extensibility assay target heating temperature of 200° C. versus 250° C.
Figures 26A, 26B:
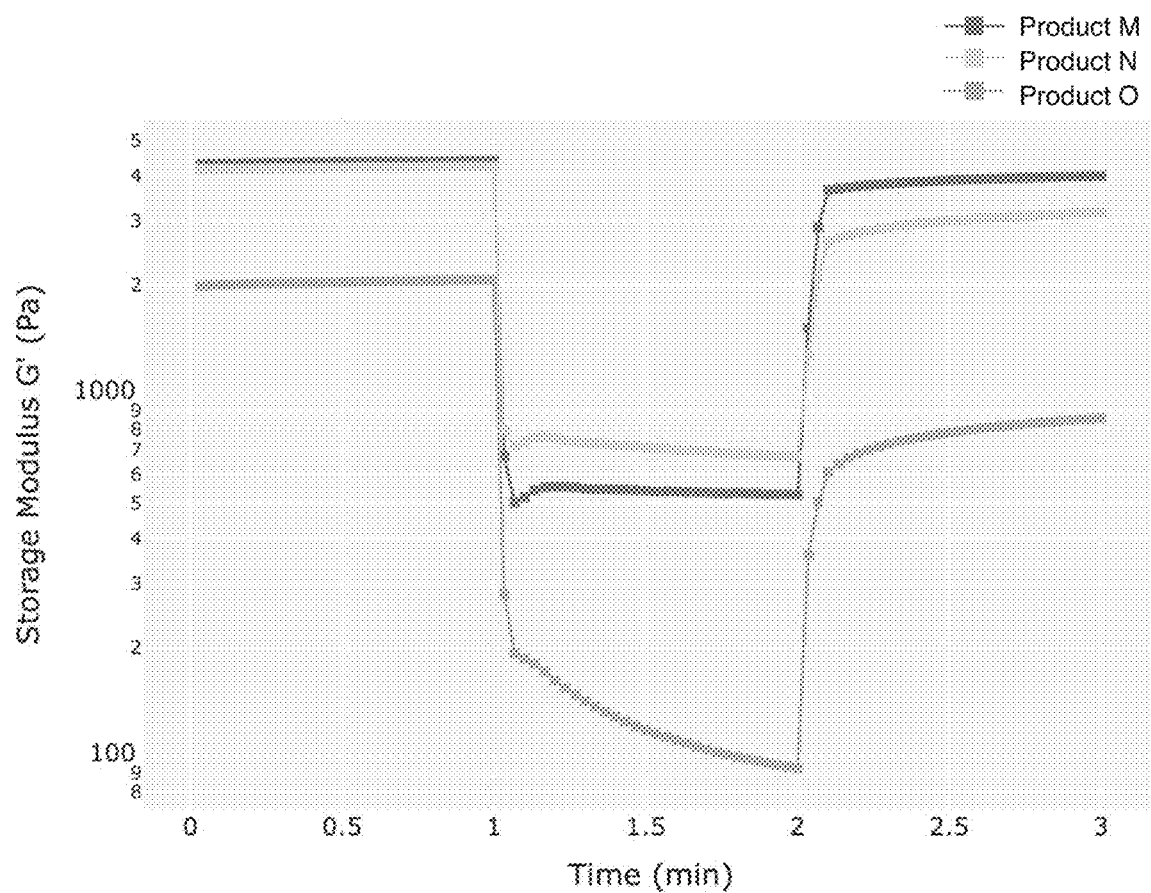
FIGS. 26A-26F depicts examples of data (determined using a creep test with constant strain: 50% strain at 1 Hz frequency) for Product M including SPIs (mixture with 8% SPIs by weight; SPI containing 33% protein by weight), Product N including ASPs (mixture with 8% ASPs by weight; ASP containing 50% protein by weight), and Product O including IPIs (mixture with 8% IPIs by weight; IPI containing 43% protein by weight). The data shows Product M and Product N behaving like connected gels (e.g., strongly connected gel), and shows Product 0 behaving like a weakly connected gel. The data shows Product M and Product N becoming stiffer over time (e.g., indicating a strain hardening behavior), and shows Product O behaving like a viscous material (e.g., disconnected or weakly connected gel).
Figure 26C:
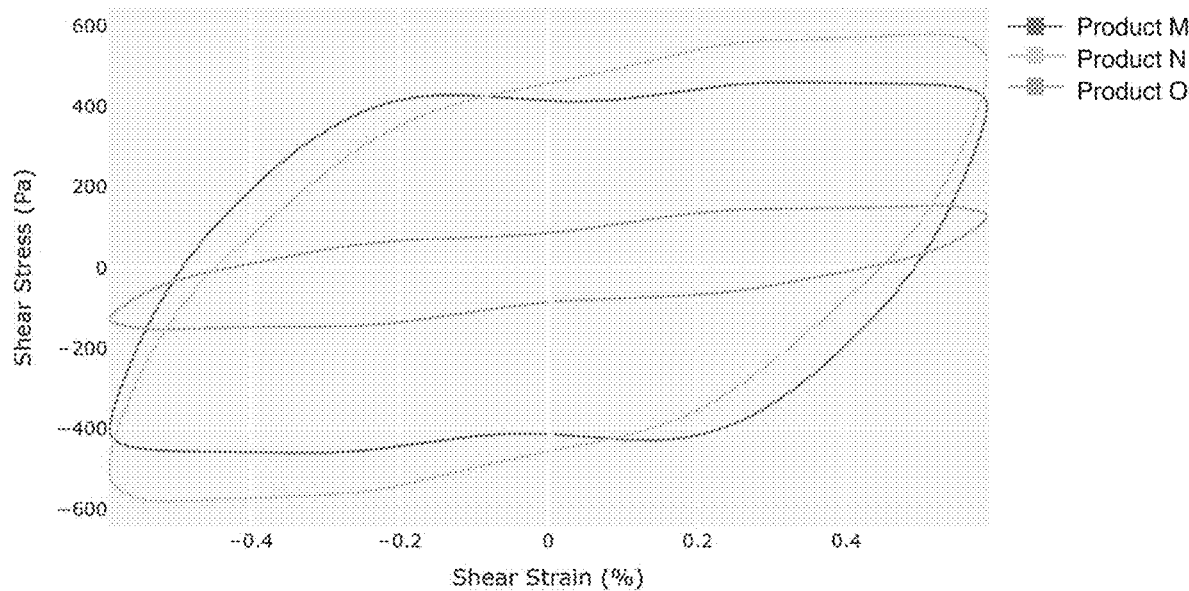
Figure 26D:
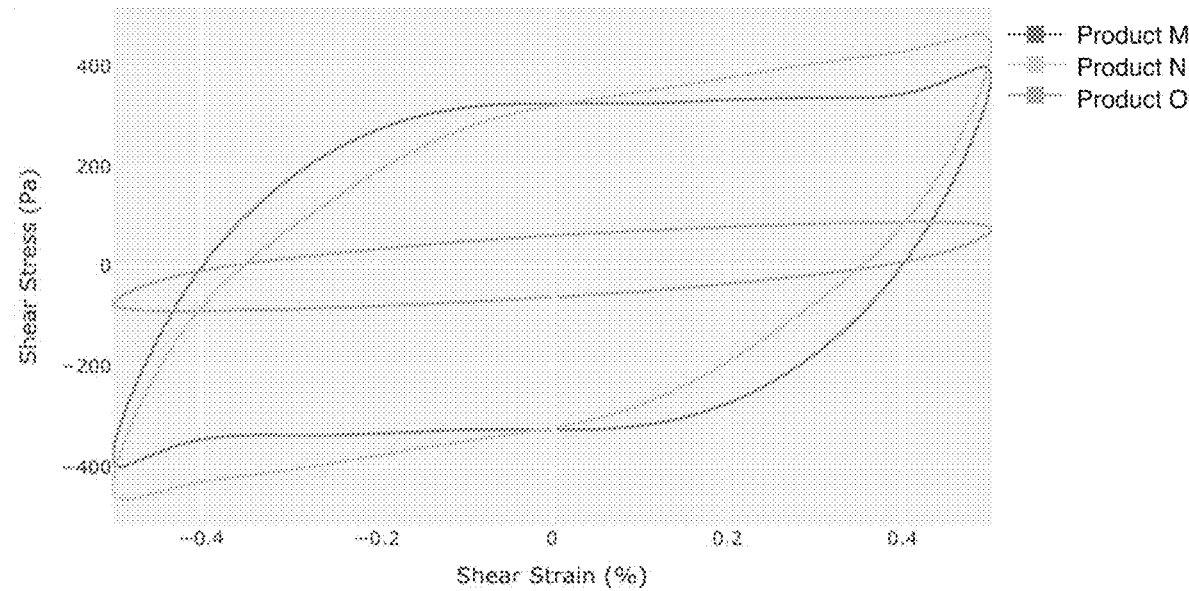
Figure 26E:
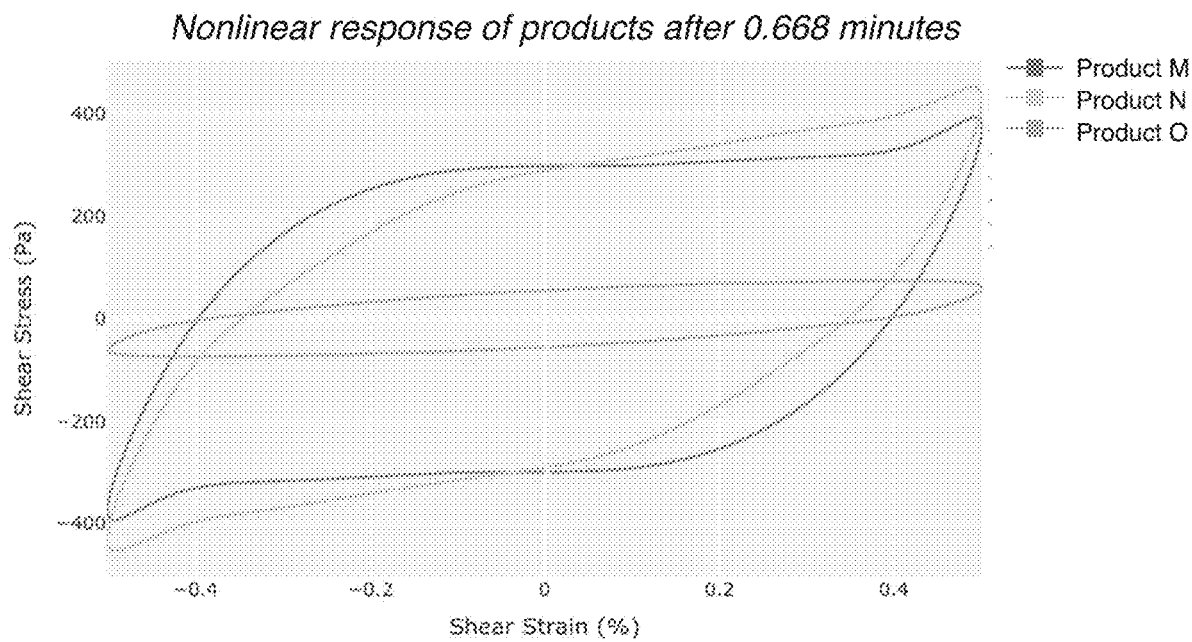
Figure 26F:
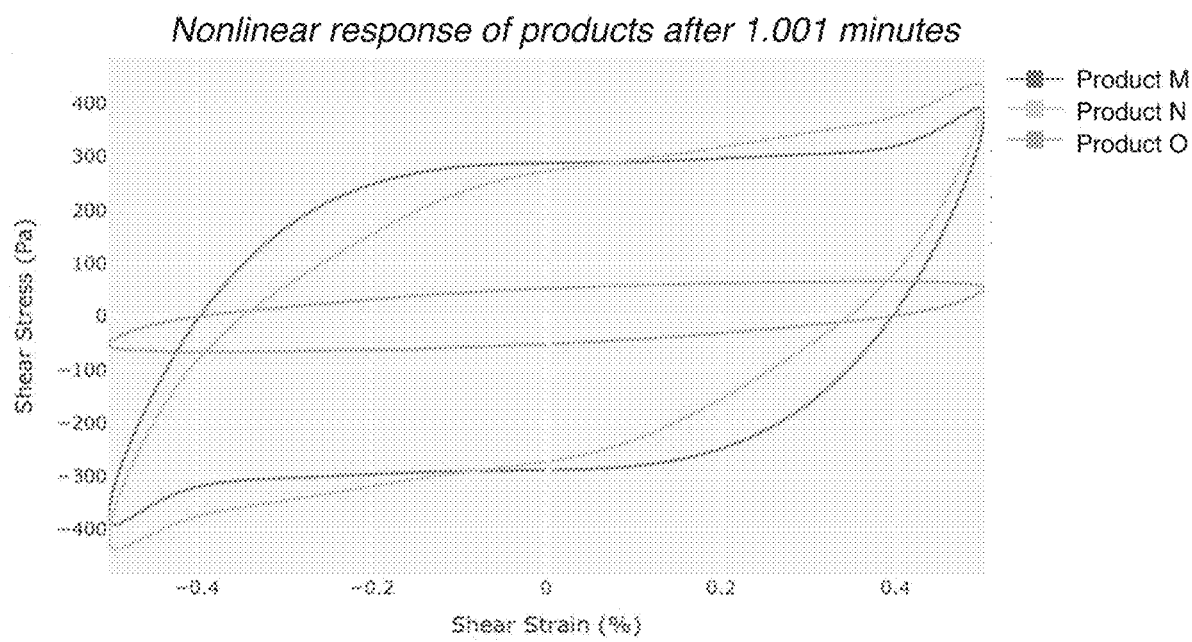

In a fourth variant, processing the SPIs can include separating the SPIs (e.g., separating SPIs from the SPI mixture). Separating the SPIs can include decanting, filtering (e.g., crude oil filtration methods, microfiltration, ultrafiltration, etc.), drying (e.g., spray drying; examples shown in FIG. 20A and FIG. 20B), centrifuging, allowing sedimentation to occur, and/or any other separation method. In variants, drying can function to stabilize and/or preserve the SPIs (e.g., for downstream use). In a specific example, processing an SPI mixture (e.g., the insoluble fraction collected in S400) includes: optionally performing one or more initial processing steps on SPI mixture (e.g., diluting the SPI mixture, pasteurizing the SPI mixture, etc.), spray-drying the (processed) SPI mixture to form dry SPIs, rehydrating the dry SPIs, optionally processing the rehydrated SPIs (e.g., combining the rehydrated SPIs with a lipid component), and producing a product using the (processed) rehydrated SPIs. The threshold percentage of protein from the original protein source that is in the separated SPIs (e.g., cumulated protein yield after separating the SPIs) can be between 5%-50%, between 10%-20% (e.g., 10%, 14%, 15%, 20%, etc.), above 50%, below 5%, and/or be any other suitable yield (e.g., by weight, by volume, etc.).

In a fifth variant, processing the SPIs can include adjusting temperature of the SPIs preferably includes heating the SPIs, but can additionally or alternatively include cooling the SPIs (e.g., heating followed by cooling, blanching, etc.) and/or otherwise adjusting the temperature. Adjusting the temperature can function to gel, pasteurize, ferment, age, cook, polymerize, and/or otherwise process the SPIs and/or a product containing the SPIs. Adjusting the temperature can be performed using a water bath, oven, refrigerator, freezer, mixer with a heating element, tubular heat exchanger, direct steam injection system, vat system (e.g., glass tank), ultra-high temperature system, plate heat exchanger, microwave, fryer, and/or any other system. Adjusting the temperature preferably includes adjusting the temperature of the SPIs to a target temperature for a target time and/or heating and/or cooling the SPIs at a target heating temperature, but can additionally or alternatively include exposing the SPIs to a target temperature (e.g., heating the SPIs at target heating temperature, cooling the SPIs at a target cooling temperature, etc.) and/or adjusting the temperature based on any other parameters. The target temperature is preferably below a denaturation temperature of proteins in the protein component, but can alternatively be at or above the denaturation temperature. The target temperature can be between 0° C.-200° C. or any range or value therebetween (e.g., 60° C.-100° C., 80° C.-85° C., 80° C.-90° C., 72° C., 75° C., 80° C., 85° C., less than 85° C., less than 90° C., less than 100° C., 25° C.-200° C.; 50° C.-85° C., etc.), but can alternatively be less than 0° or greater than 200° C. The target time can be between 10 seconds-48 hours or any range or value therebetween (e.g., 1 min-1 hour, 5 min-30 min, 10 min-15 min, 1 min, 5 min, 10 min, 15 min, 30 min, 60 min, 80 min, less than 15 min, less than 30 min, less than 60 min, etc.), but can alternatively be less than 10 seconds or greater than 48 hours (e.g., aging for greater than 48 hours). The rate of heating can be between 0.25° C./min-50° C./min or any range or value therebetween (e.g., 0.5° C./min-2° C./min, 2° C./min-20° C./min, 20° C./min-50° C./min, 2° C./min-10° C./min, 1° C./min-5° C./min, 5° C./min-10° C./min, 10° C./min-20° C./min, 10° C./min-15° C./min, 15° C./min-20° C./min, less than 10° C./min, less than 5° C./min, less than 2° C./min, at least 2° C./min, at least 5° C./min, at least 10° C./min, etc.), but can alternatively be less than 0.25° C./min, or greater than 50° C./min. Any heating and/or cooling stage can include returning the SPIs to a second target temperature (e.g., room temperature) after the heating and/or cooling stage. However, the temperature of the SPIs can be otherwise adjusted.

However, the SPIs can be otherwise processed.

The method can optionally include producing a product with the structured protein isolates S600, which functions to form a food product with target characteristics (e.g., target stretch and/or melt characteristics). S600 can be performed after S400, after S500 (e.g., after any processing step in S500), during S500, and/or at any other time.

The product can optionally be a food product and/or be used to manufacture a food product. For example, the product can be: a replacement (e.g., analog, replicate, etc.) for a target food product (e.g., the product can be a plant-based analog for an animal food product), used to manufacture a target food product, a food product with target characteristics, and/or any other food product. The product can be a vegan product, a food product without animal products and/or with less animal products (e.g., relative to a target animal product), a plant-based food product (e.g., a plant-based cheese), a microbial-based food product, a non-mammalian-based food product, and/or any other food product. Examples of target food products include: dairy lipids (e.g., ghee, other bovine milk fats, etc.), milk, curds, cheese (e.g., hard cheese, soft cheese, semi-hard cheese, semi-soft cheese, aged cheese, fermented cheese, fresh cheese, etc.), butter, yogurt, cream cheese, dried milk powder, cream, whipped cream, ice cream, coffee cream, other dairy products, egg products (e.g., scrambled eggs), additive ingredients, mammalian meat products (e.g., ground meat, steaks, chops, bones, deli meats, sausages, etc.), fish meat products (e.g., fish steaks, filets, etc.), any animal product, and/or any other suitable food product. In specific examples, the target food product includes mozzarella, burrata, feta, brie, ricotta, camembert, chevre, cottage cheese, cheddar, parmigiano, pecorino, gruyere, edam, gouda, jarlsberg, and/or any other cheese. In a specific example, the product includes a milk analog (e.g., a functional milk analog for cow milk, sheep milk, goat milk, camel milk, human milk, etc.).

The product is preferably entirely plant matter, but can additionally or alternatively be primarily plant matter (e.g., more than 50%, 60%, 70%, 80%, 90%, 95%, 98%, 99%, etc.), partially plant matter, and/or have any other suitable plant matter content. The product can optionally exclude and/or include less than a threshold amount of total and/or added: animal products (e.g., excludes animal proteins, such as caseins), gums (e.g., polysaccharide thickeners), allergenic ingredients (e.g., soy, peanut, wheat, derivatives thereof, etc.), and/or any other suitable ingredient. Added ingredients and/or compounds can include: materials that were not present in and/or are foreign to a plant substrate or other ingredients, materials added in as a separate ingredient, and/or otherwise defined. The threshold amount can be between 0.1%-10% or any range or value therebetween (e.g., 10%, 5%, 3%, 2%, 1%, 0.1%, etc.), but can alternatively be greater than 10% or less than 0.1%.

The product preferably has one or more characteristics similar (e.g., within a predetermined margin of error, such as 1%, 5%, 10%, 20%, 30%, etc.) to the target product and/or similar to any other set of target characteristics. Characteristics (e.g., functional properties) can include: nutritional profile (e.g., macronutrient profile, micronutrient profile, etc.), nutritional quality (e.g., PDCAAS score), texture (e.g., texture profile, firmness, toughness, puncture, stretch, compression response, mouthfeel, viscosity, graininess, relaxation, stickiness, chalkiness, flouriness, astringency, crumbliness, stickiness, stretchiness, tear resistance/strength, mouth melt, etc.), solubility, melt profile, smoke profile, gelation point, flavor, appearance (e.g., color), aroma, precipitation, stability (e.g., room temperature stability), emulsion stability, ion binding capacity, heat capacity, solid fat content, chemical properties (e.g., pH, affinity, surface charge, isoelectric point, hydrophobicity/hydrophilicity, free sulfhydryl group content, chain lengths, chemical composition, nitrogen levels, chirality, stereospecific position, etc.), physiochemical properties, compound concentration (e.g., in the solid sample fraction, vial headspace, olfactory bulb, post-gustation, etc.), denaturation point, denaturation behavior, aggregation point, aggregation behavior (e.g., micellization capability, micelle stability, etc.), particle size, structure (e.g., microstructure, macrostructure, fat crystalline structure, etc.), folding state, folding kinetics, interactions with other molecules (e.g., dextrinization, caramelization, coagulation, shortening, interactions between lipid and protein, interactions with water, aggregation, micellization, etc.), lipid leakage, water holding and/or binding capacity, lipid holding and/or binding capacity, fatty acid composition (e.g., percent saturated/unsaturated lipids), moisture level, turbidity, properties determined using an assay tool, and/or any other properties.

Examples of assays and/or assay tools that can be used include: a differential scanning calorimeter (e.g., to determine properties related to melt, gelation point, denaturation point, etc.), Schreiber Test, oven (e.g., for the Schreiber Test), water bath, texture analyzer, rheometer, spectrophotometer, centrifuge (e.g., to determine properties related to water binding capacity), moisture analyzer (e.g., to determine properties related to water availability), light microscope (e.g., to determine properties related to microstructure), atomic force microscope (e.g., to determine properties related to microstructure), confocal microscope (e.g., to determine protein association with lipid/water), laser diffraction particle size analyzer (e.g., to determine properties related to emulsion stability), polyacrylamide gel electrophoresis system, mass spectrometry, gas chromatography, liquid chromatography, thermal gravimetric analysis system, thermal shift (e.g., to determine protein denaturation and/or aggregation behavior), ion chromatography, dynamic light scattering system (e.g., to determine properties related to particle size, to determine protein aggregation, etc.), Zetasizer (e.g., to determine properties related to surface charge), protein concentration assays and/or assay systems, particle size analyzer, sensory panels (e.g., to determine properties related to texture, flavor, appearance, aroma, etc.), capillary electrophoresis SDS (e.g., to determine protein concentration), spectroscopy (e.g., fluorescence spectroscopy, circular dichroism, etc.; to determine folding state, folding kinetics, denaturation temperature, etc.), absorbance spectroscopy (e.g., to determine protein hydrophobicity), CE-IEF (e.g., to determine protein isoelectric point/charge), total protein quantification, high temperature gelation, microbial cloning, Turbiscan (e.g., to determine properties related to emulsion stability), stereospecific analysis, olfactometers, electrophysiological testing (e.g., of a human olfactometer), psychophysical testing (e.g., of a human olfactometer), and/or any other assay and/or assay tool.

The product can optionally have target stretch properties. The stretch properties of the product are preferably measured using an extensibility assay procedure, but can additionally or alternatively be measured using other tensile testing methods and/or otherwise measured. In an example, the extensibility assay procedure can include: placing a sample including a target mass (e.g., 15 g, 20 g, 25 g, 30 g, 50 g, 100 g, 500 g, 1000 g, any range or value therebetween, etc.) of the product into a well, heating the sample (e.g., using an oven, with the sample covered in foil), optionally measuring the sample temperature, stretching the sample at a constant extension rate (e.g., 2 mm/s, 5 mm/s, 10 mm/s, 15 mm/s, 20 mm/s, any range or value therebetween, etc.), and recording when total breakage of sample strands occurs. In an illustrative example, a sample of the product can be heated for 15 minutes (e.g., covered in foil), and the heated product can be analyzed using a texture analyzer (e.g., in tension mode, with a test speed of 5 mm/sec, a post-test speed of 40 mm/sec, and a target distance of 270 mm) with an ambient temperature of between 20-21° C. In a first specific example, the sample can be heated (e.g., in an oven and/or other heating device) for a target heating time (e.g., 1 min, 5 min, 10 min, 15 min, 20 min, 30 min, 1 hr, any range or value therebetween, etc.) at a target heating temperature (e.g., 50° C., 70° C.-85° C., 60° C.-75° C., 75° C., 80° C., 85° C., 100° C., 150° C., 200° C., 225° C., 230° C., 240° C., 250° C., 275° C., 300° C., any range or value therebetween, etc.). In a second specific example, the sample can be heated to achieve a target (internal) temperature (e.g., 50° C., 70° C.-85° C., 60° C.-75° C., 75° C., 80° C., 85° C., 90° C.-110° C., 100° C.-105° C., 100° C., 103° C., 150° C., 200° C., 225° C., 230° C., 240° C., 250° C., 275° C., 300° C., any range or value therebetween, any other target temperature, etc.) in the sample for a target time (e.g., 1 min-5 min, 1 min, 2 min, 3 min, 4 min, 5 min, 10 min, 30 min, any range or value therebetween, any other target time, etc.). In a third specific example, the sample can be heated according to a predetermined temperature cycle. The sample is preferably not shredded prior to heating, but can alternatively be shredded. Stretching the sample is preferably initiated within a threshold time after heating the sample, but can alternatively be performed at any other time. The threshold time can be between 5 s-5 min or any range or value therebetween (e.g., 10 s, 15 s, 20 s, 30 s, 1 min, etc.), but can alternatively be less than 5 s or greater than 5 min. The sample can optionally be exposed to an ambient temperature (e.g., 20° C.-22° C.) and/or a target temperature (e.g., 20° C.-300° C. or any range or value therebetween, any other target temperature) during stretching. The extensibility assay procedure can be performed using a cheese extensibility rig or any other tensile testing fixture. In a specific example, the cheese extensibility rig (e.g., Texture Technologies TA-426N™, used with a TA.XTPlus™ texture analyzer) can include a well to hold the sample of the product (e.g., melted product), a hooked lifting plate (with initial position submerged in the product, at or near the well), and a ring to retain a portion of the product at or near the well (e.g., at the edges of the sample) such that the product can stretch when the hooked lifting plate rises.

Stretch properties determined using the extensibility assay procedure can include distance to failure (e.g., extension at total breakage), peak force, stretch toughness (e.g., work to extend, normalized work, etc.), and/or any other stretch metric. In a specific example, the product can be characterized by a distance to failure (measured using the extensibility assay procedure) between 25 mm-500 mm or any range or value therebetween (e.g., 50 mm-400 mm, 100 mm-300 mm, greater than 50 mm, greater than 75 mm, greater than 100 mm, greater than 125 mm, greater than 150 mm, greater than 200 mm, greater than 250 mm, etc.), but can alternatively be characterized by a distance to failure less than 25 mm or greater than 500 mm. Examples of extensibility assay data are shown in FIG. 22, FIG. 23A, FIG. 23B, FIG. 23C, FIG. 25A, FIG. 25B, FIG. 25C, FIG. 25D, and FIG. 25E.

Figure 11A:
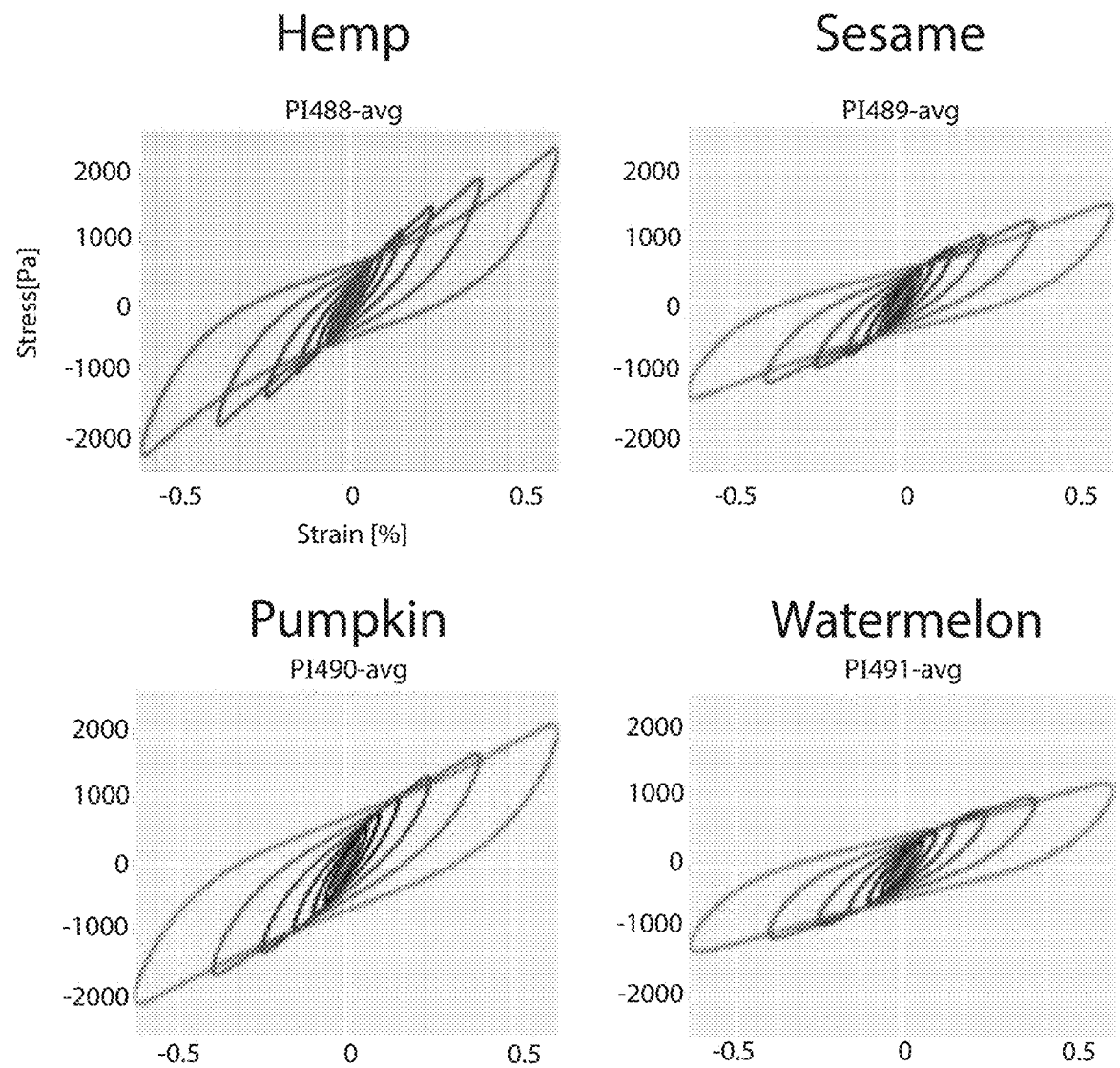
FIG. 11A depicts an example of low deformation Lissajous plots for products manufactured using SPIs derived from hemp, sesame, pumpkin, and watermelon protein sources.
Figure 11B:
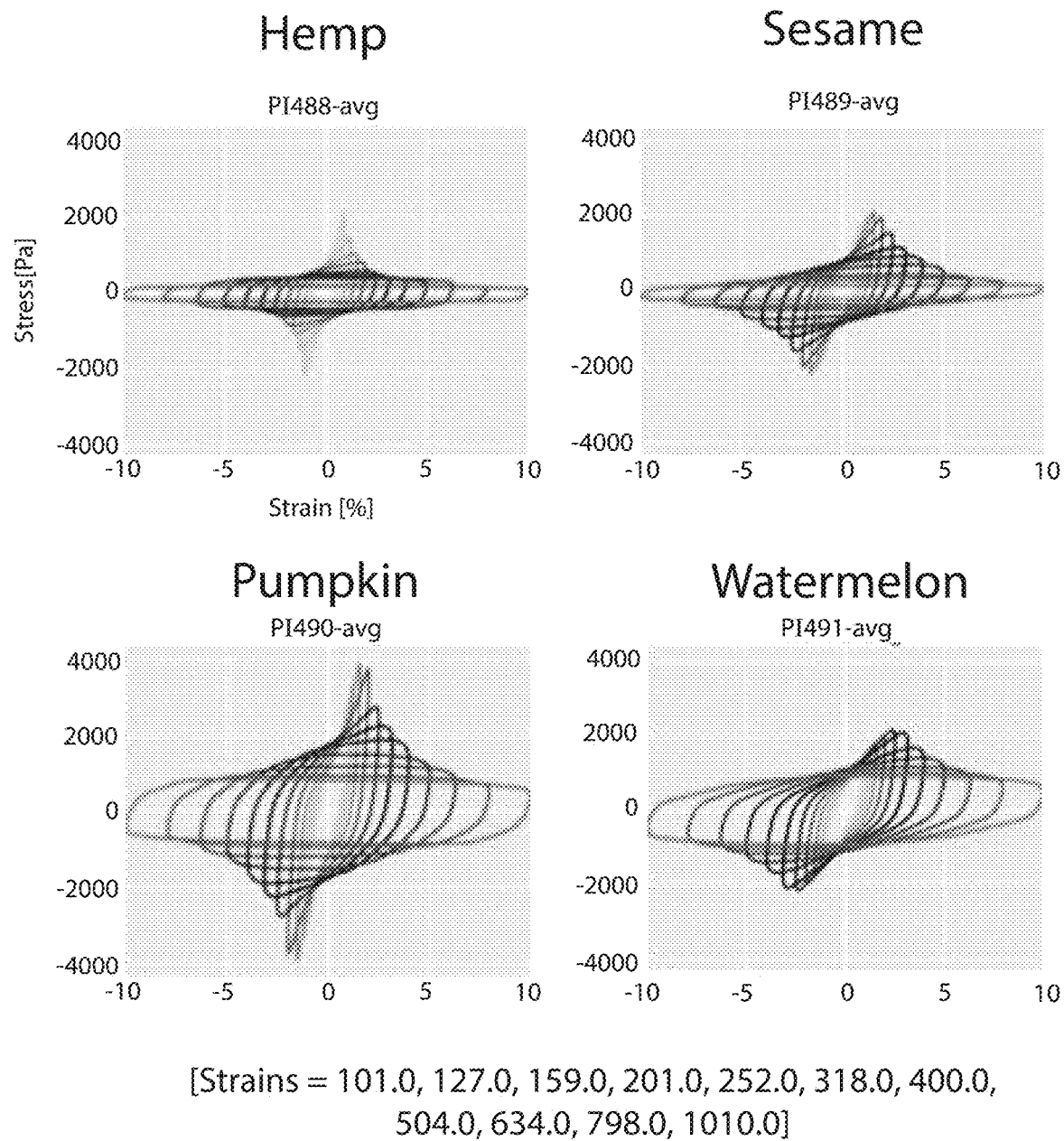
FIG. 11B depicts an example of high deformation Lissajous plots for products manufactured using SPIs derived from hemp, sesame, pumpkin, and watermelon protein sources; the hemp and sesame products exhibit similar nonlinear responses.

The product can optionally have target rheological properties (e.g., examples shown in FIG. 11A and FIG. 11B). The rheological properties of the product can be measured using a creep test (e.g., stress relaxation test), any test performed using a rheometer, and/or any other test. In an example, the creep test can include: preparing a sample of the product with a target initial thickness (e.g., 1 mm, 2 mm, 3 mm, 4 mm, 5 mm, 10 mm, any range or value therebetween, etc.), mass (e.g., 1 g, 2 g, 2.5 g, 3 g, 3.5 g 4 g, etc.), and/or a target initial diameter (e.g., 10 mm, 15 mm, 20 mm, 25 mm, 30 mm, 50 mm, 100 mm, any range or value therebetween, etc.); loading the gel onto a rheometer (e.g., MCR 702 MultiDrive™) at a target temperature (e.g., room temperature, any other target temperature, such as those mentioned above for the stretch test, etc.); straining the product at a constant initial strain (0.05%, 0.1%, 0.2%, 0.5%, 1%, 2%, 5%, any range or value therebetween, any strain within the linear viscoelastic region, etc.) at a target frequency (e.g., 0.25 Hz, 0.5 Hz, 1 Hz, 1.5 Hz, 2 Hz, 5 Hz, any range or value therebetween, etc.) for a target time (e.g., 30 sec, 1 min, 2 min, 5 min, any range or value therebetween, any other target time, etc.); straining the product at a constant creep strain (10%, 25%, 40%, 50%, 60%, 75%, any range or value therebetween, any strain within the nonlinear viscoelastic region, etc.) at a target frequency (e.g., the same or different frequency as the initial strain frequency; 0.25 Hz, 0.5 Hz, 1 Hz, 1.5 Hz, 2 Hz, 5 Hz, any range or value therebetween, etc.) for a target time; and straining the product at a constant recovery strain (0.05%, 0.1%, 0.2%, 0.5%, 1%, 2%, 5%, any range or value therebetween, any strain within the linear viscoelastic region, etc.) at a target frequency (e.g., the same or different frequency from the creep frequency, 0.25 Hz, 0.5 Hz, 1 Hz, 1.5 Hz, 2 Hz, 5 Hz, any range or value therebetween, etc.) for a target time. Rheological properties determined using the creep can include storage modulus recovery (e.g., G' recovery percentage=(final G'−initial G')/initial G'), shear stress versus shear strain profiles, and/or any other properties. In a specific example, the product can be characterized by a storage modulus recovery between 50%-99% or any range or value therebetween (e.g., 70%-99%, 90%-95%, greater than 60%, greater than 70%, greater than 75%, greater than 80%, greater than 90%, etc.), but can alternatively be characterized by a storage modulus recovery less than 50% or greater than 99%. Examples of creep test data are shown in FIG. 26A, FIG. 26B, FIG. 26C, FIG. 26D, FIG. 26E, and FIG. 26F.

The product can optionally have target melt properties. The melt properties of the product are preferably measured using a Schreiber Test, but can additionally or alternatively be measured using differential scanning calorimetry, other melt assays, and/or otherwise measured. In an example, the Schreiber Test can include: preparing a sample of the product with a target initial mass (e.g., 1 g, 2 g, 3 g, 3.5 g, 4 g, 5 g, log, tog, 50 g, any range or value therebetween, etc.) and a target initial diameter (e.g., 10 mm, 15 mm, 25 mm, 30 mm, 50 mm, 100 mm, any range or value therebetween, etc.), heating the sample (e.g., on a glass petri dish, optionally covered), and measuring the final surface area of the sample and/or any other melt metric. The final surface area (e.g., surface area of melt) can optionally be measured by analyzing an image of the sample. In a first specific example, the sample can be heated for a target heating time (e.g., 1 min, 5 min, 6 min, 10 min, 15 min, 20 min, 30 min, 1 hr, any range or value therebetween, any other target time, etc.) at a target heating temperature (e.g., 50° C., 70° C.-85° C., 60° C.-75° C., 75° C., 80° C., 100° C., 150° C., 200° C., 230° C., 250° C., 300° C., 400° C., any range or value therebetween, any other target temperature, etc.). In a second specific example, the sample can be heated to achieve a target temperature (e.g., 50° C., 70° C.-85° C., 60° C.-75° C., 75° C., 80° C., 85° C., 100° C., 150° C., 200° C., 230° C., 250° C., 300° C., 400° C., any range or value therebetween, any other target temperature, etc.) in the sample for a target time (e.g., 1 min-10 min, 1 min, 5 min, 6 min, 10 min, 15 min, 20 min, 30 min, 1 hr, any range or value therebetween, any other target time, etc.). Melt properties determined using the Schreiber Test can include change in area/mass and/or any other properties. In a specific example, the product can be characterized by a change in area/mass (measured using the Schreiber Test) between 0.5 $cm^2/g$-10 $cm^2/g$ or any range or value therebetween (e.g., 1 $cm^2/g$-6 $cm^2/g$, greater than 0.5 $cm^2/g$, greater than 1 $cm^2/g$, greater than 2 $cm^2/g$, greater than 3 $cm^2/g$, etc.), but can alternatively be characterized by a change in area/mass less than 0.5 $cm^2/g$ or greater than 10 $cm^2/g$. Examples of Schreiber Test data are shown in FIG. 21, FIG. 23A, FIG. 23D, FIG. 24, and FIG. 25A.

The product can optionally have target shredding and/or grating properties. For example, the product can be shredded when exposed to a load (e.g., using a food processor) between 0.5 kg-10 kg, but can alternatively be shredded when exposed to a load less than 0.5 kg or greater than 10 kg. Shredding can be evaluated quantitatively (e.g., shred size, shredding force, etc.) and/or qualitatively (e.g., qualitative metric from 0 to 1).

The product can optionally be thermoreversible (e.g., meltable when heated, stretchable when heated, etc.), thermoirreversible, non-thermoreversible, and/or have any heat response characteristic. For example, the product can be thermoreversible for at least one heating cycle, for one or more heating-cooling cycles (e.g., melting-solidification cycles), for a threshold number of heating-cooling cycles (e.g., 1, 2, 3, 5, 10, 50, etc.), and/or otherwise thermoreversible. Alternatively, the product can be non-thermoreversible, and form a gel, semi-solid, or solid upon heating. However, the product can have any other suitable set of thermal responses and/or characteristics.

The product can include: SPIs (e.g., in an aqueous solution, in a lipid component, in a mixture, dried SPIs, etc.), aggregates of SPIs, a mixture (e.g., a gel, a liquid, etc.) of SPIs and other ingredients (e.g., any ingredients in S500), and/or have any other formulation and/or structure. The product can optionally include contained or uncontained SPIs (e.g., wherein the lipid component and/or other ingredients can pool and separate from the SPIs). Producing the product can optionally include any S500 manufacturing methods and/or any food manufacturing methods.

Figure 13A:
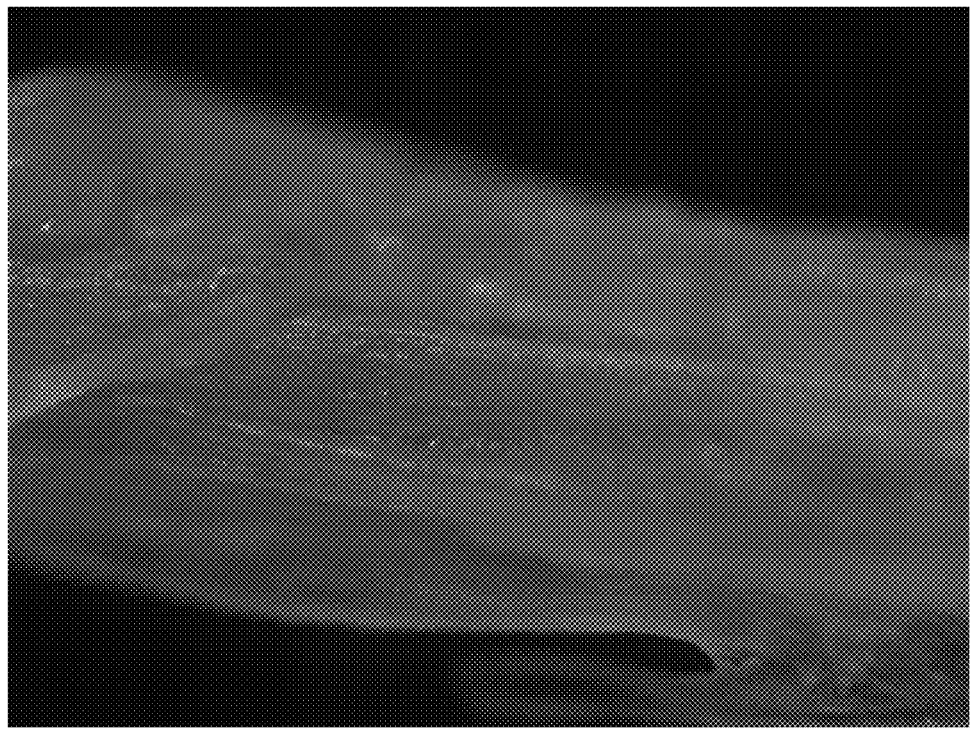
FIGS. 13A-13N depict example images of a product manufactured using hemp-derived SPIs. The images were captured using a 18 MP AmScope digital microscope camera (e.g., model—MU1803-HS) and an optical microscope (e.g., a Nikon Labophot-2 Microscope) with a 4× lens.
Figure 13B:
Figure 13C:
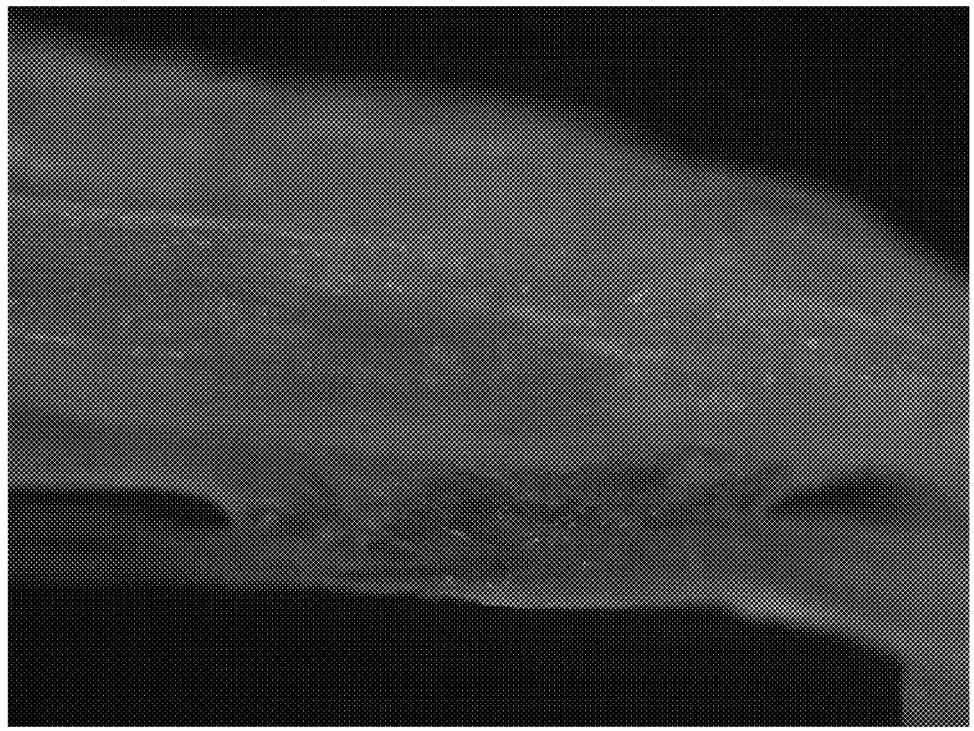
Figure 13D:
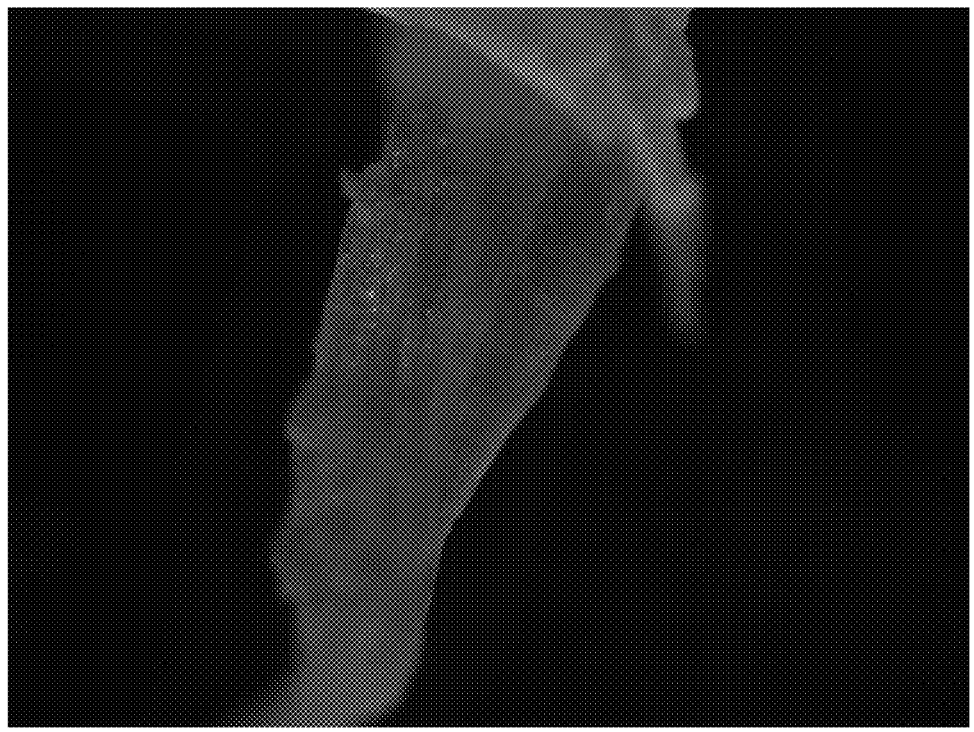
Figure 13E:
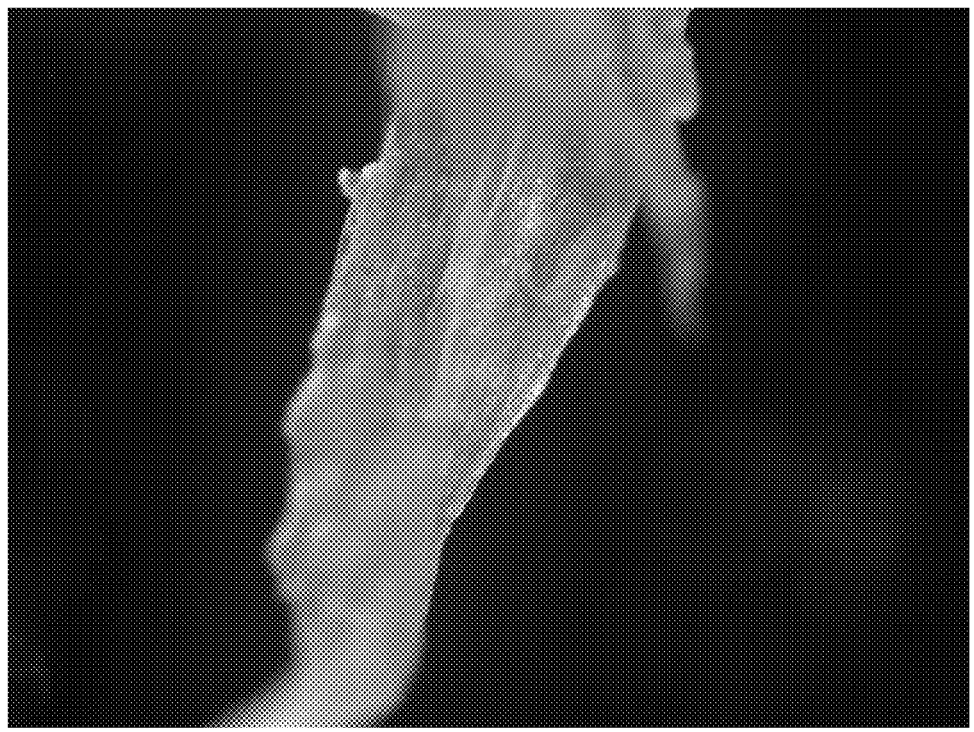
Figure 13F:
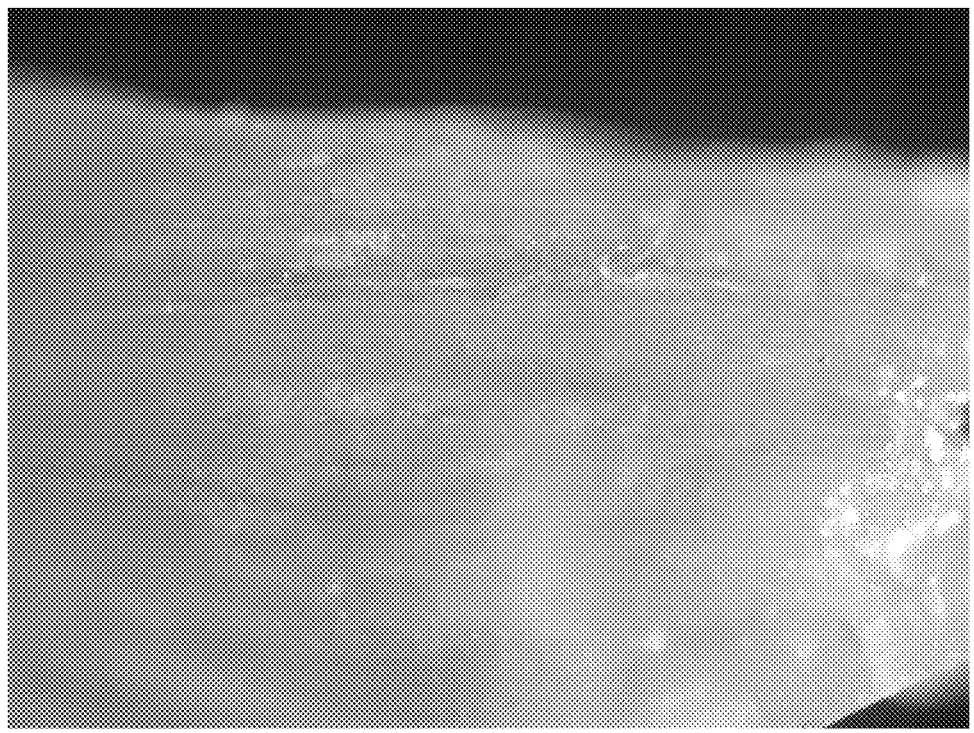
Figure 13G:
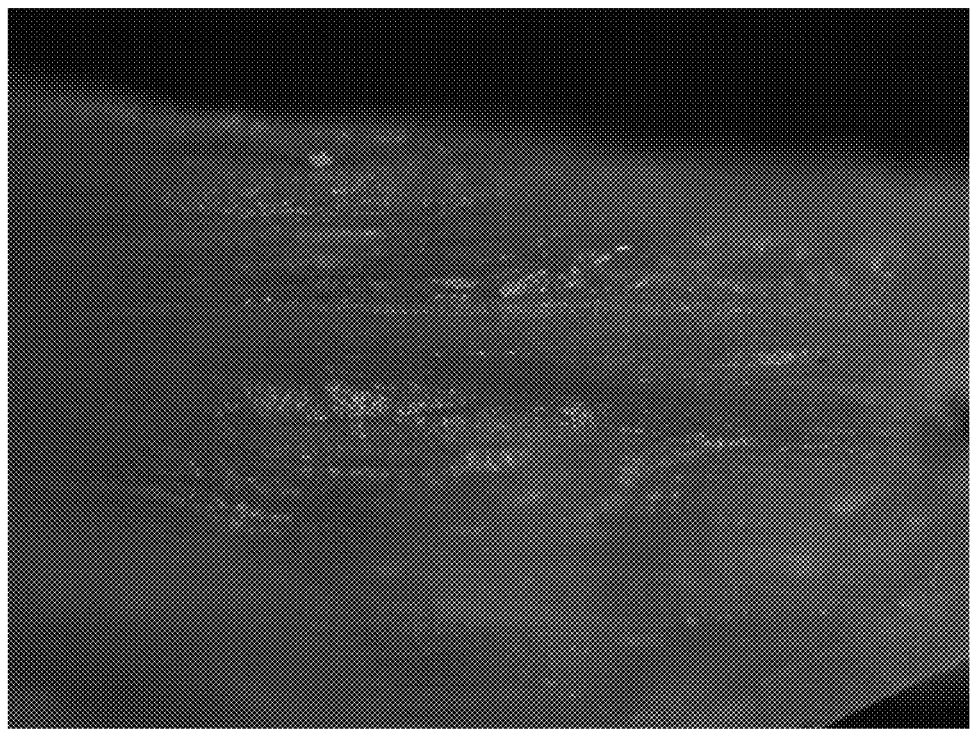
Figure 13H:
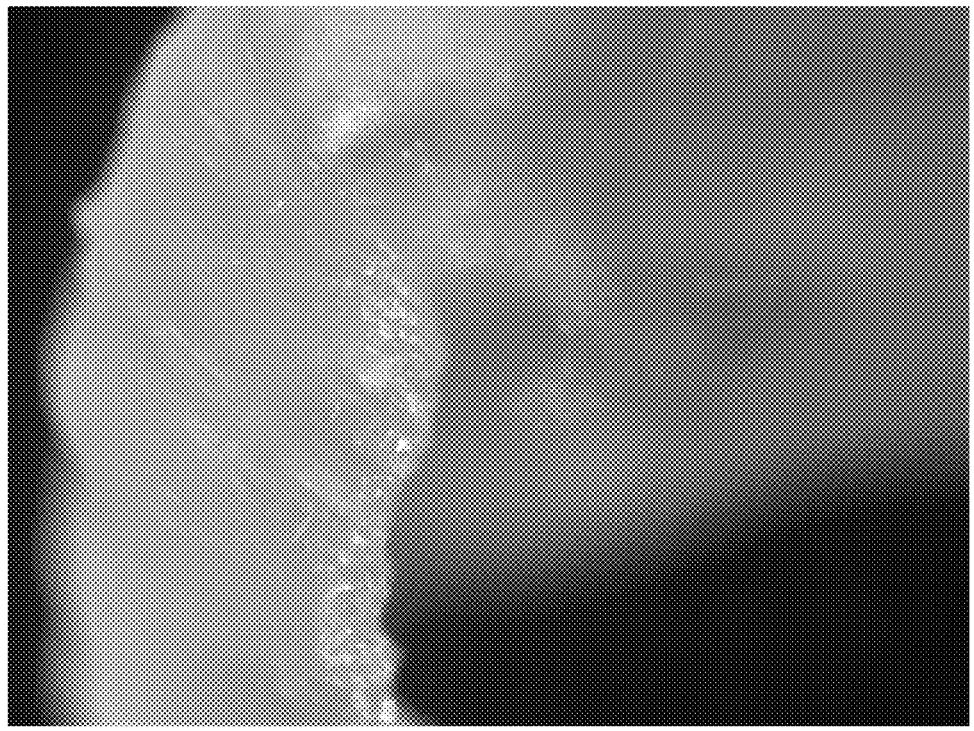
Figure 13I:
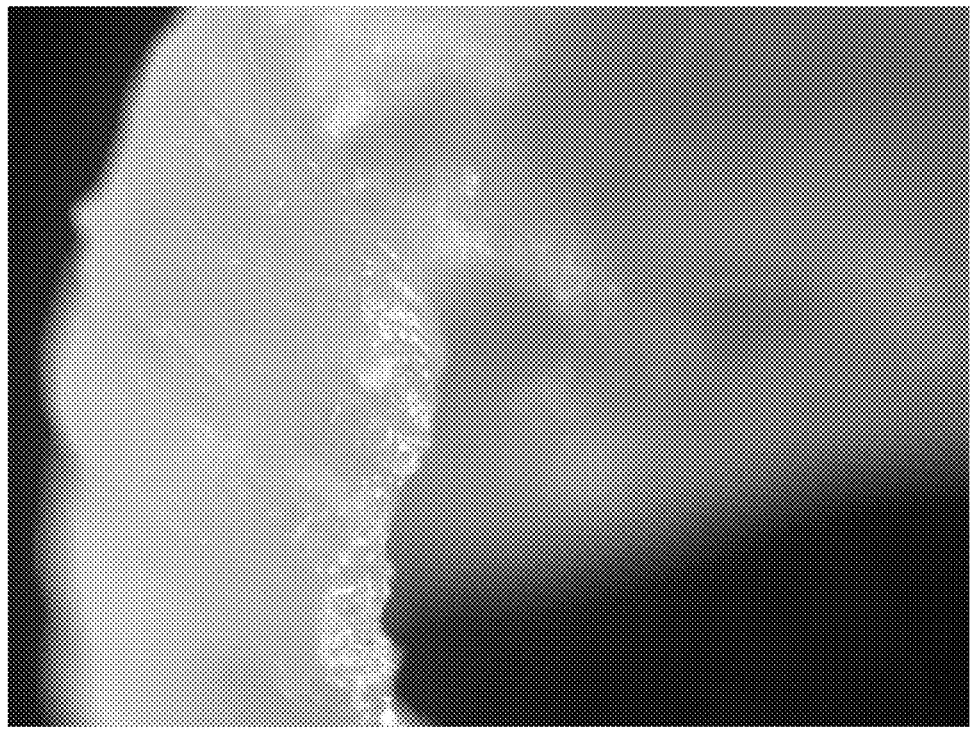
Figure 13J:
Figure 13K:
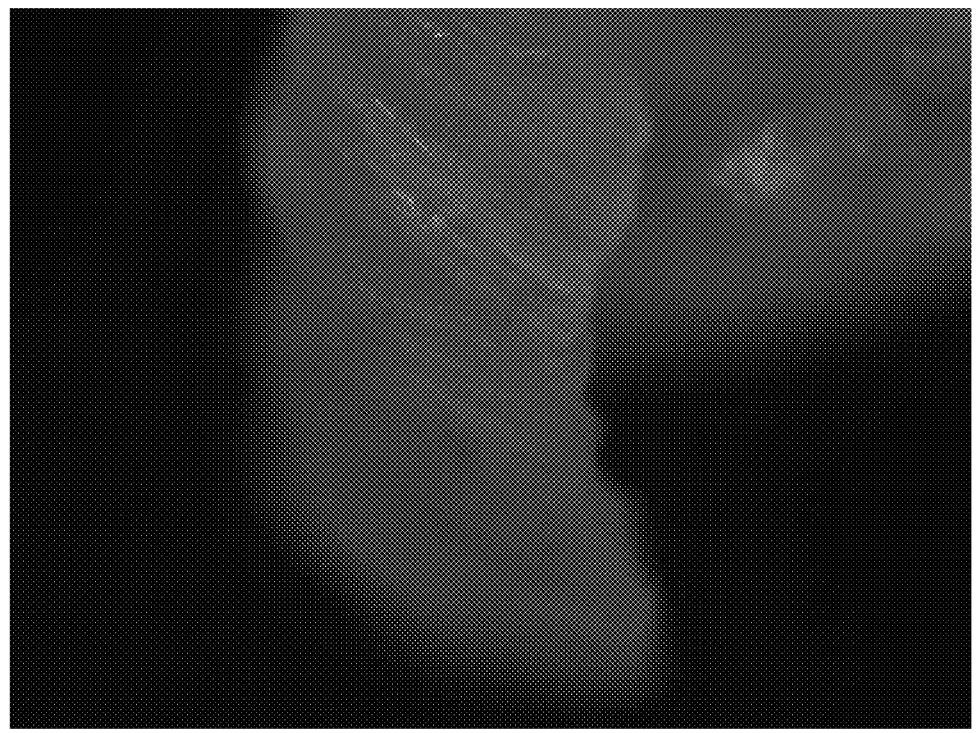
Figure 13L:
Figure 13M:
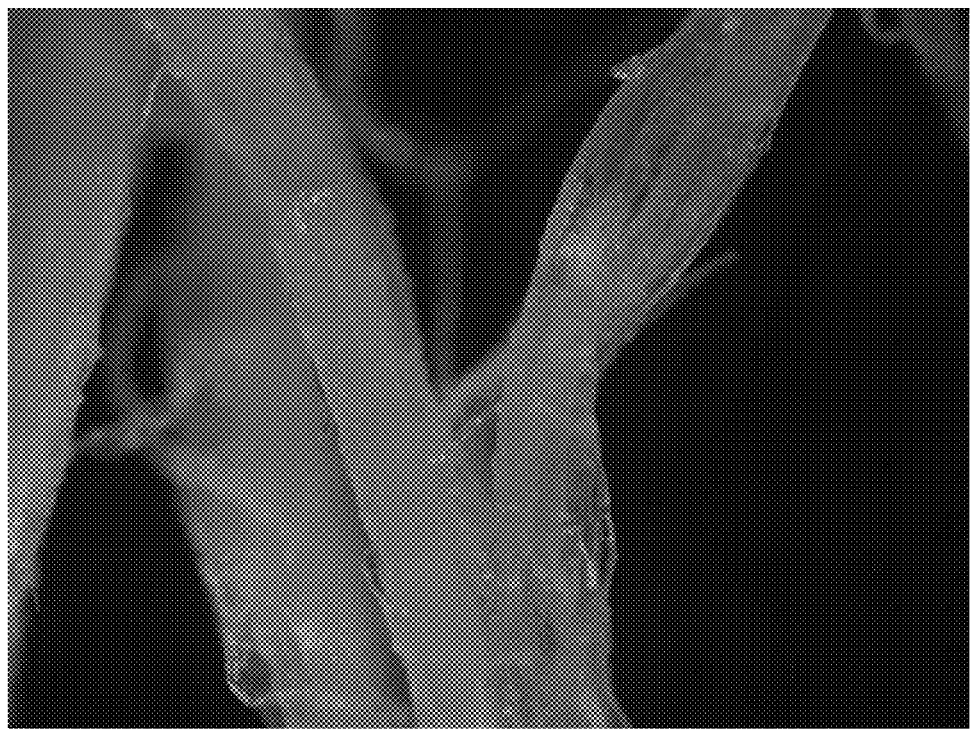
Figure 13N:
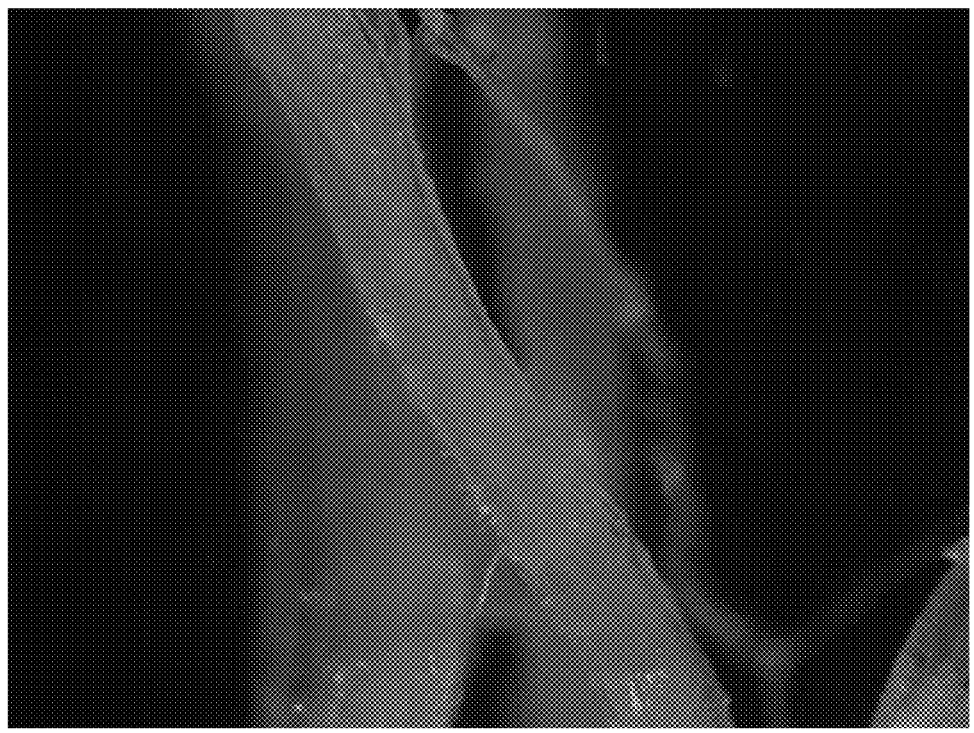
Figure 14A:
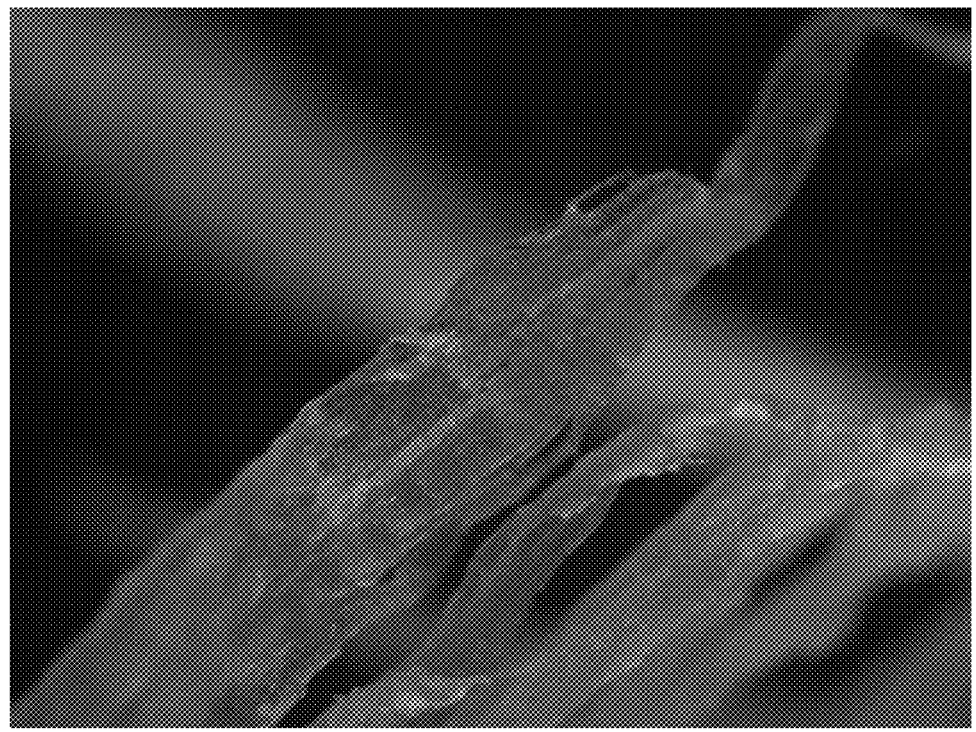
FIGS. 14A-14AA depict example images of a product manufactured using sesame-derived SPIs. The images were captured using a 18 MP AmScope digital microscope camera and an optical microscope with a 4× lens.
Figure 14B:
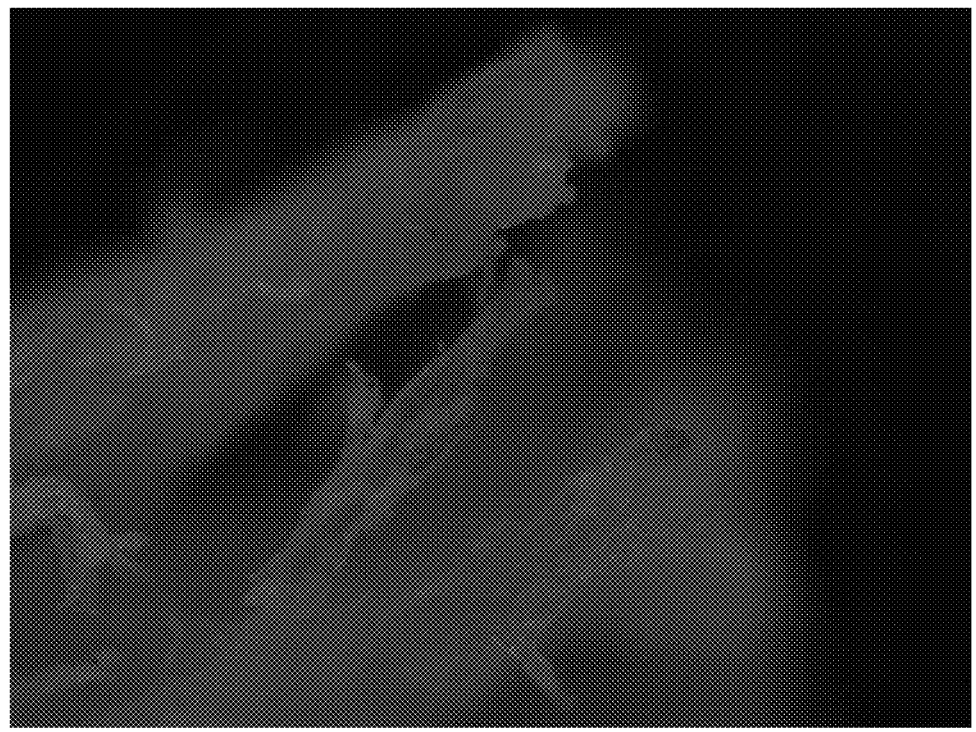
Figure 14C:
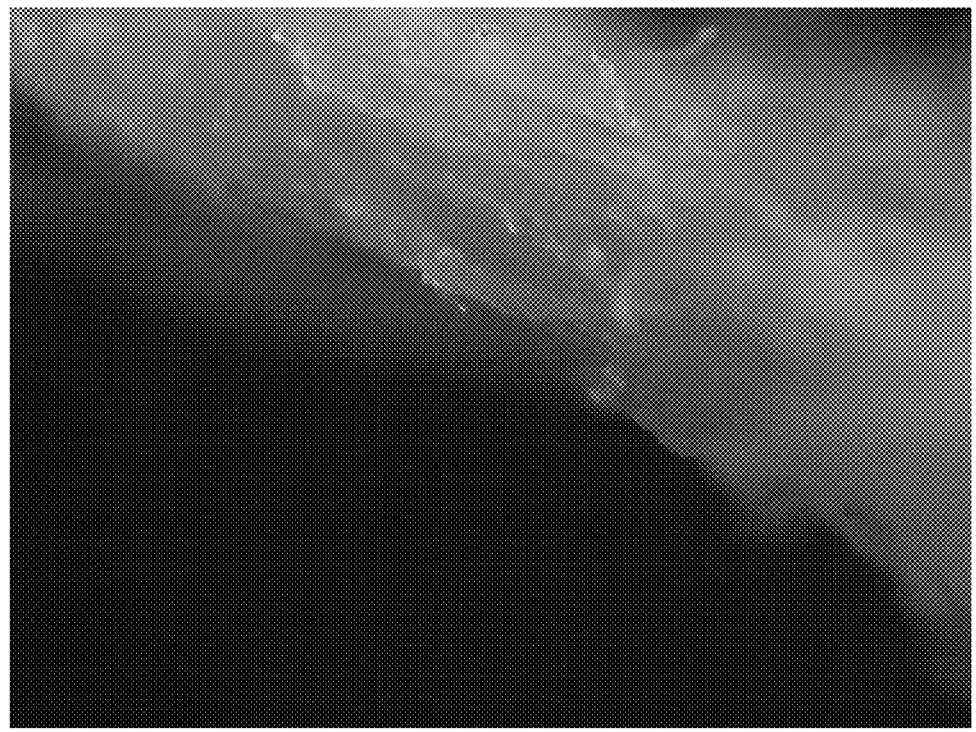
Figure 14D:
Figure 14E:
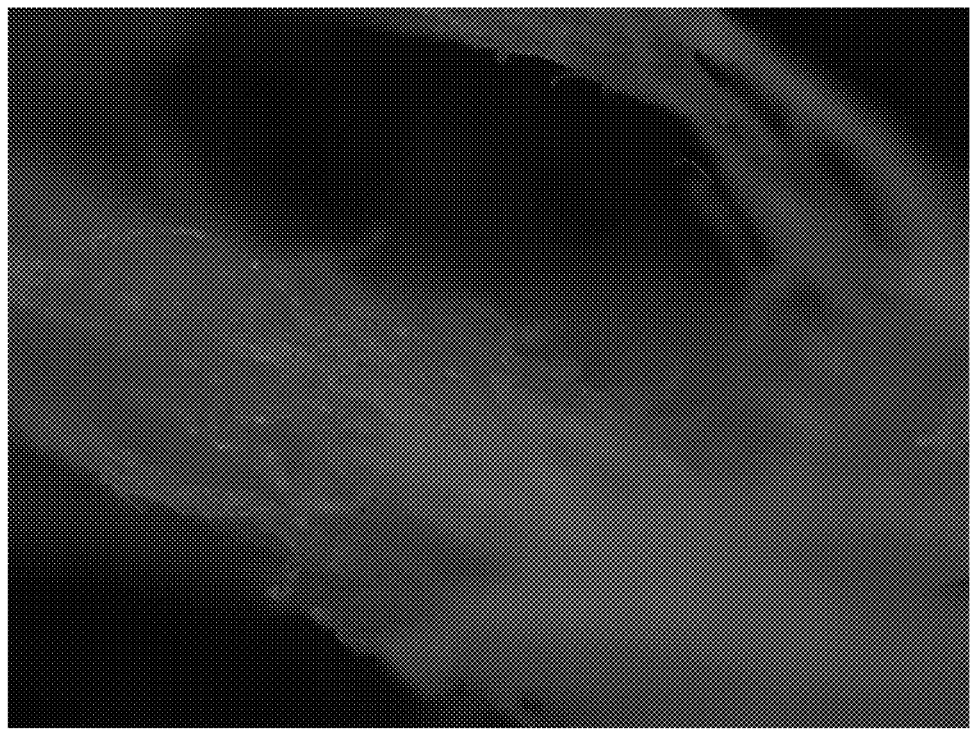
Figure 14F:
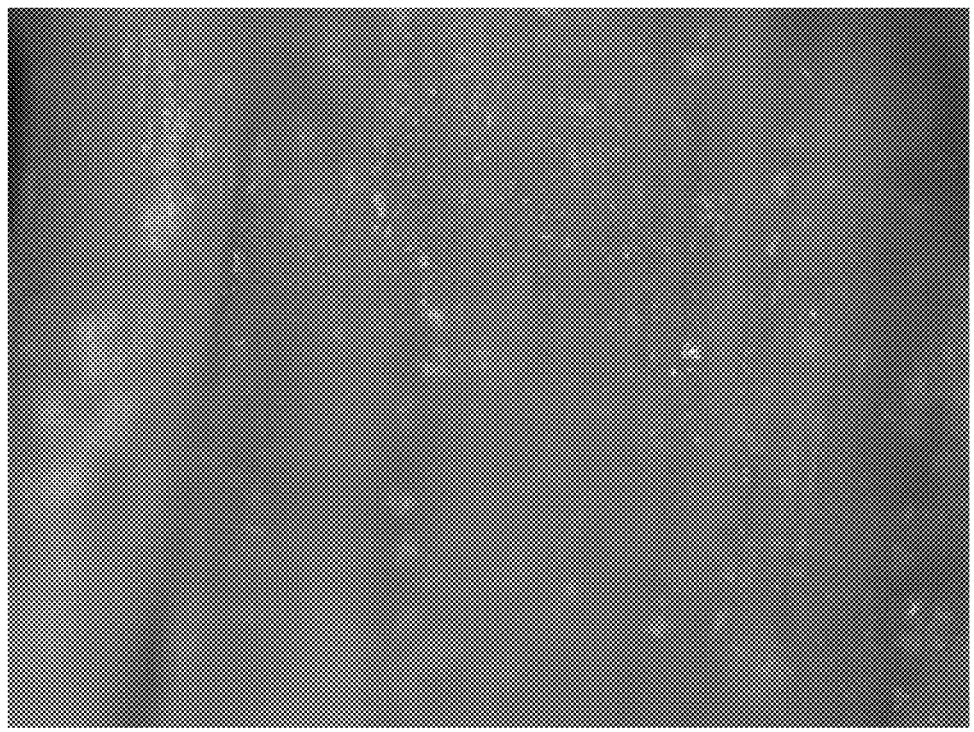
Figure 14G:
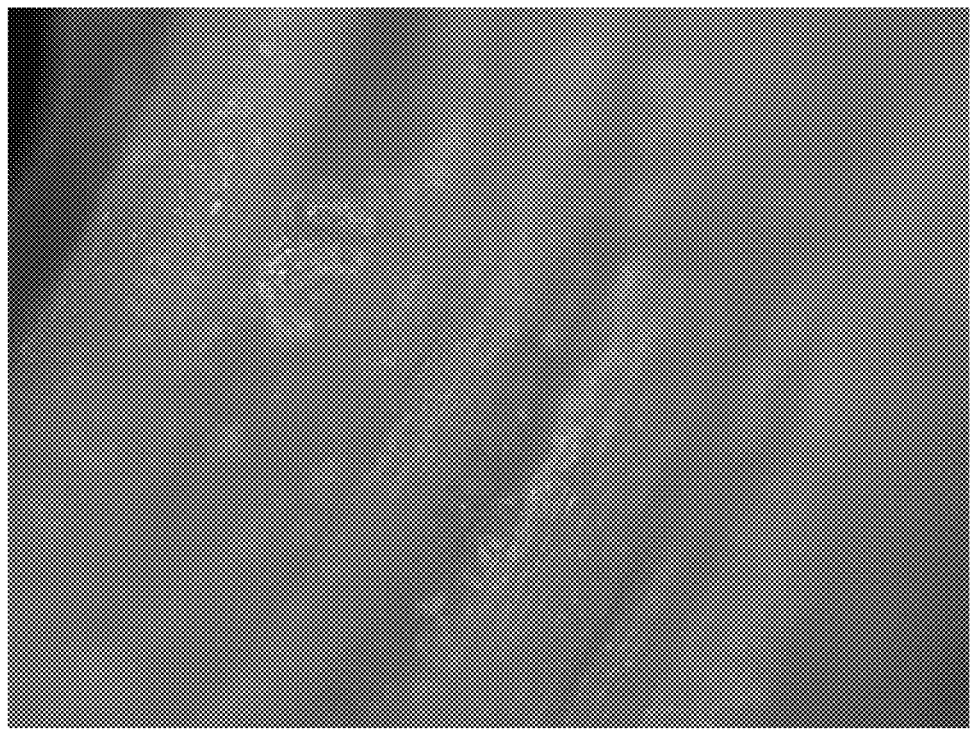
Figure 14H:
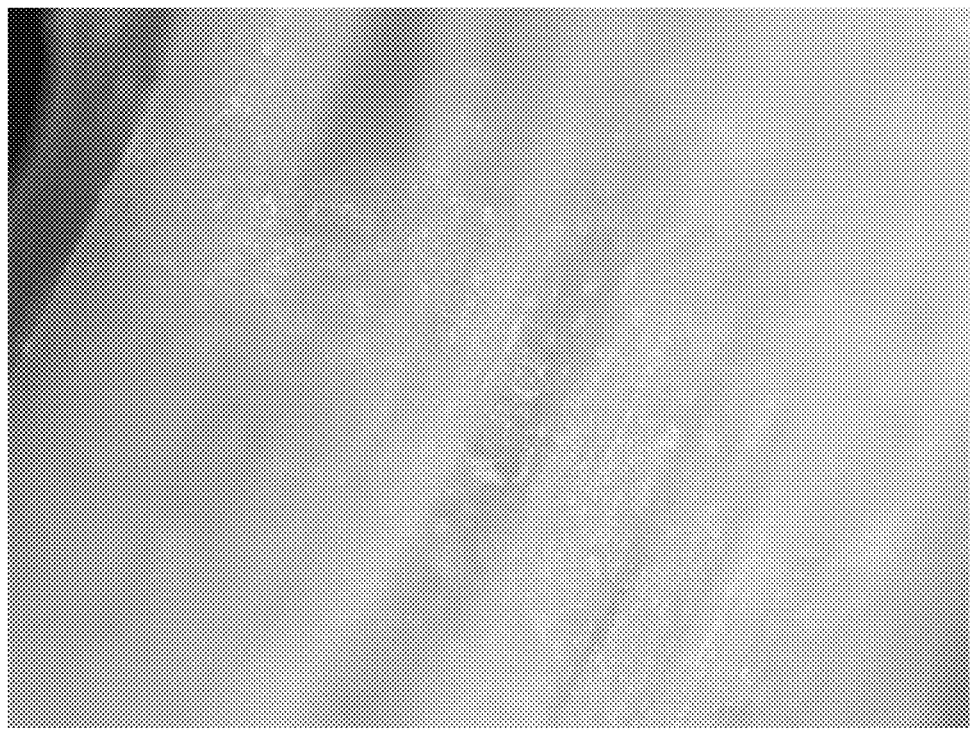
Figure 14I:
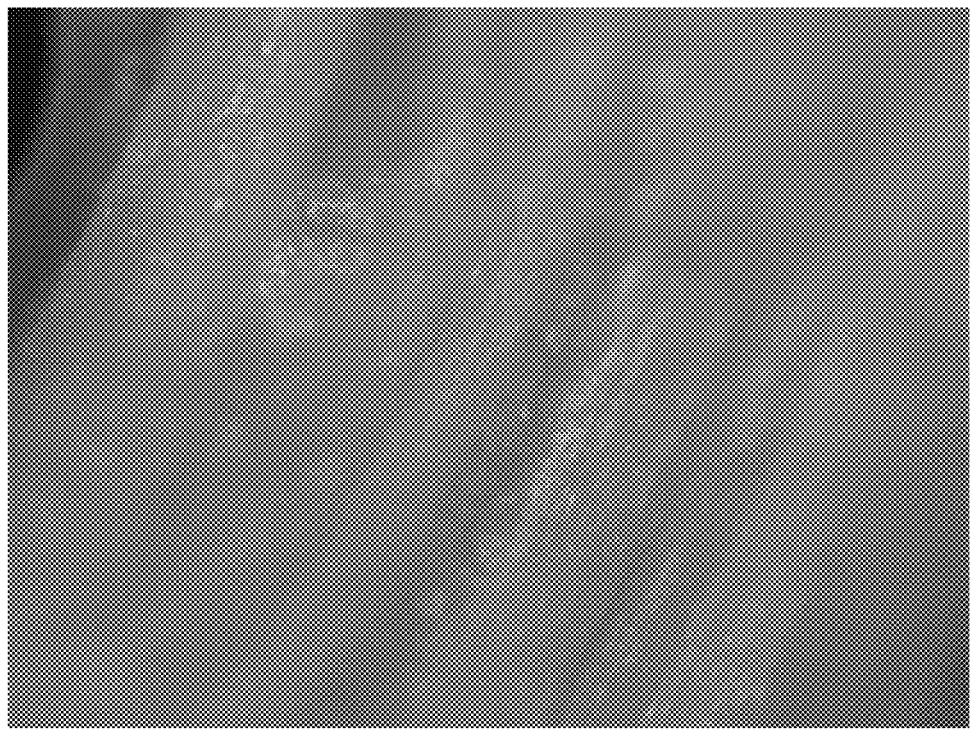
Figure 14J:
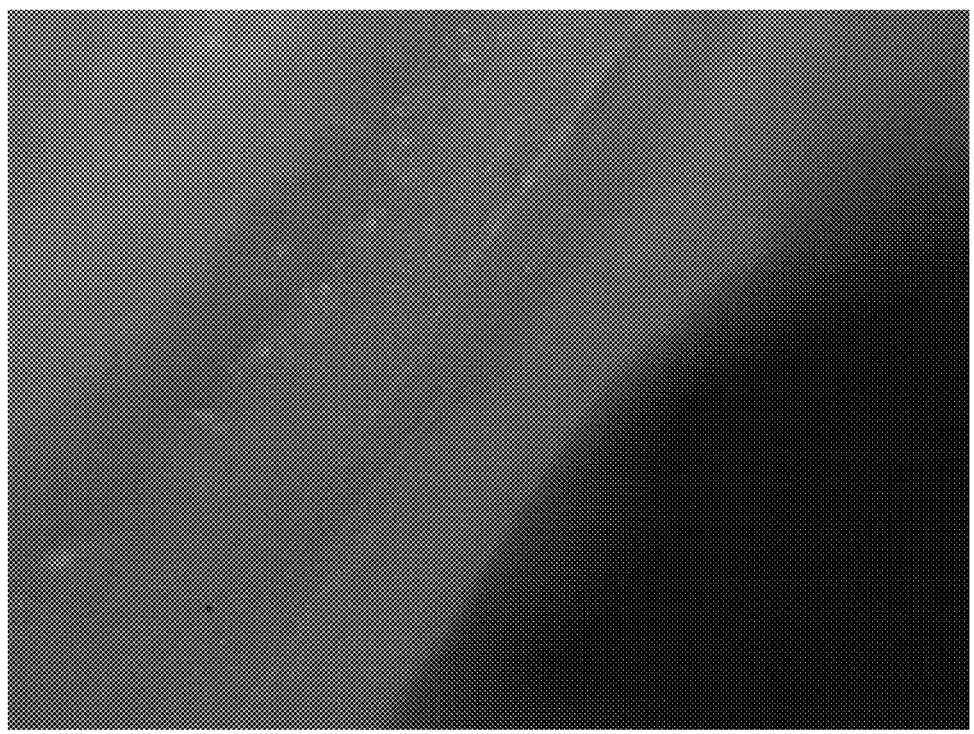
Figure 14K:
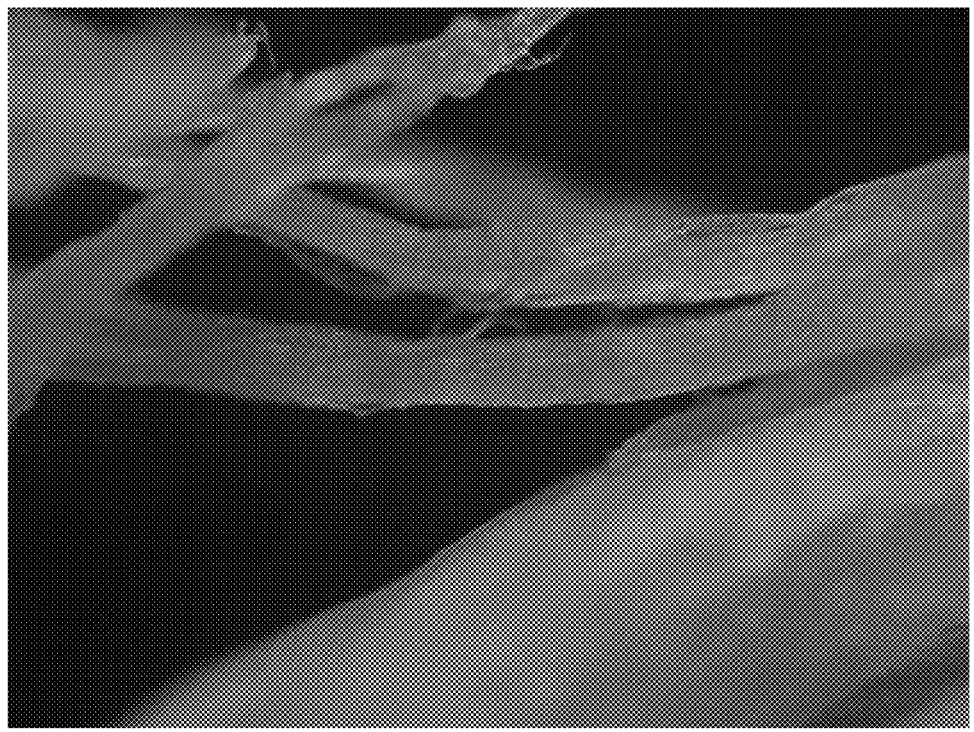
Figure 14L:
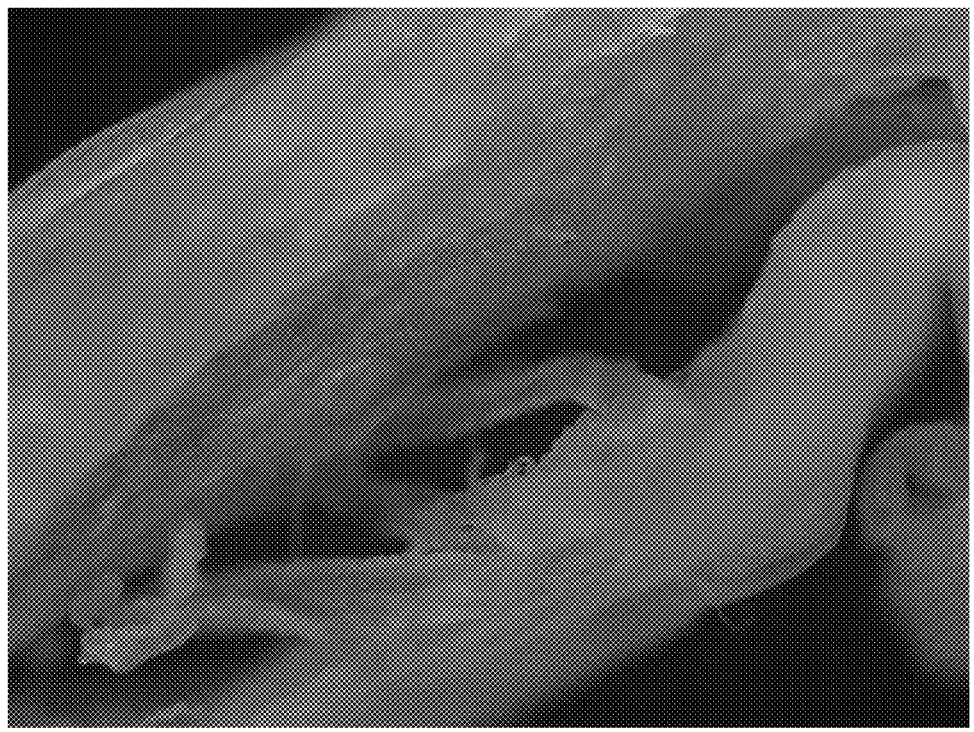
Figure 14M:
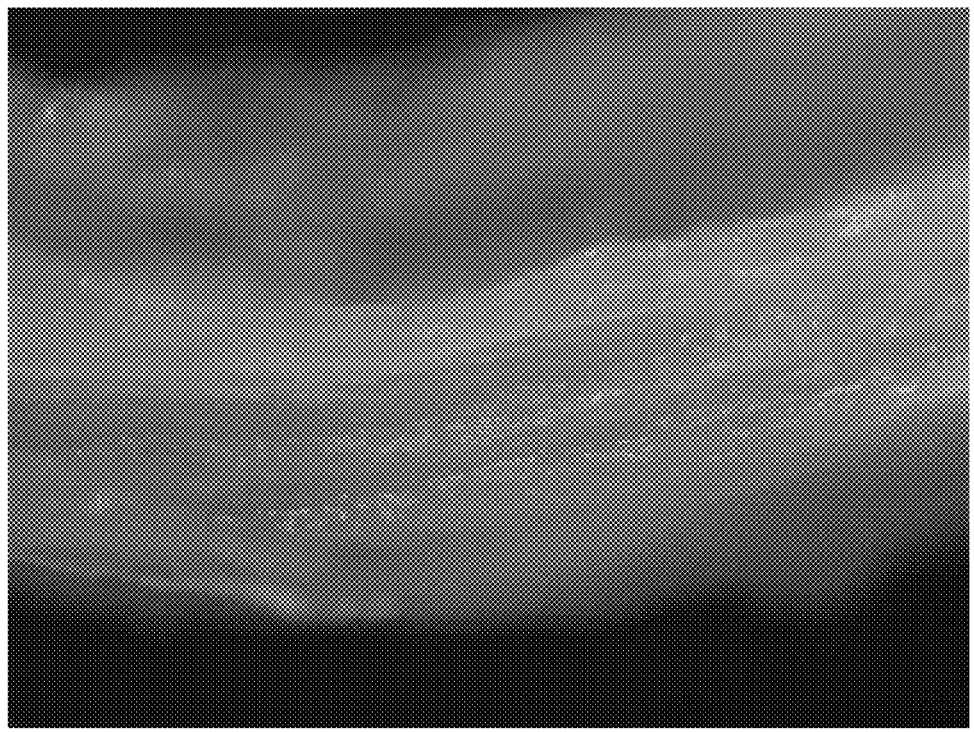
Figure 14N:
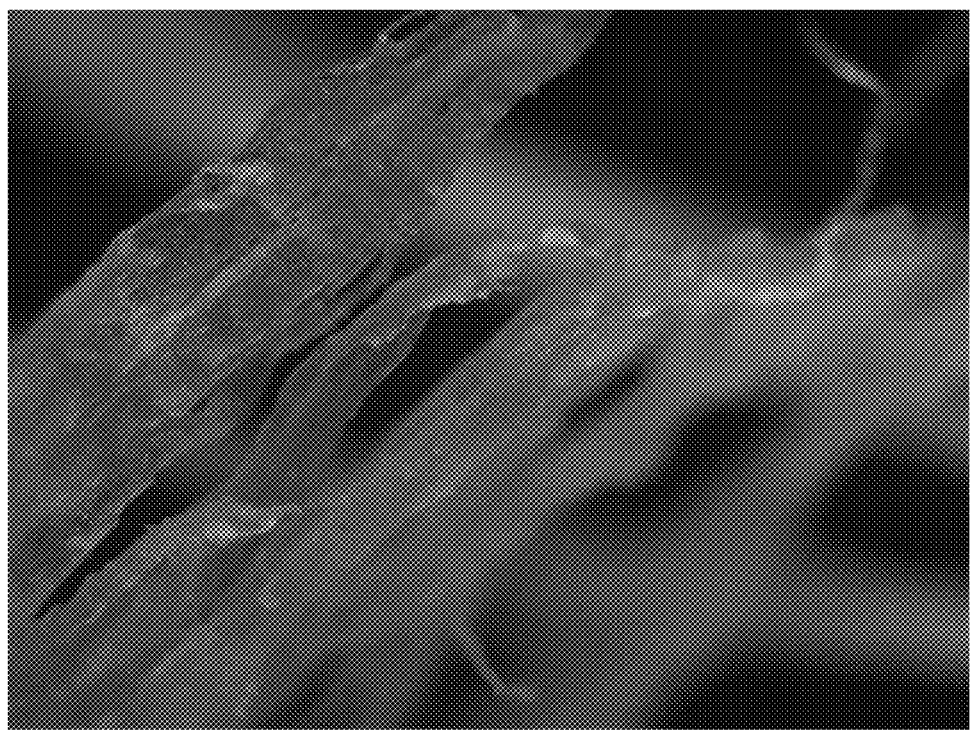
Figure 14O:
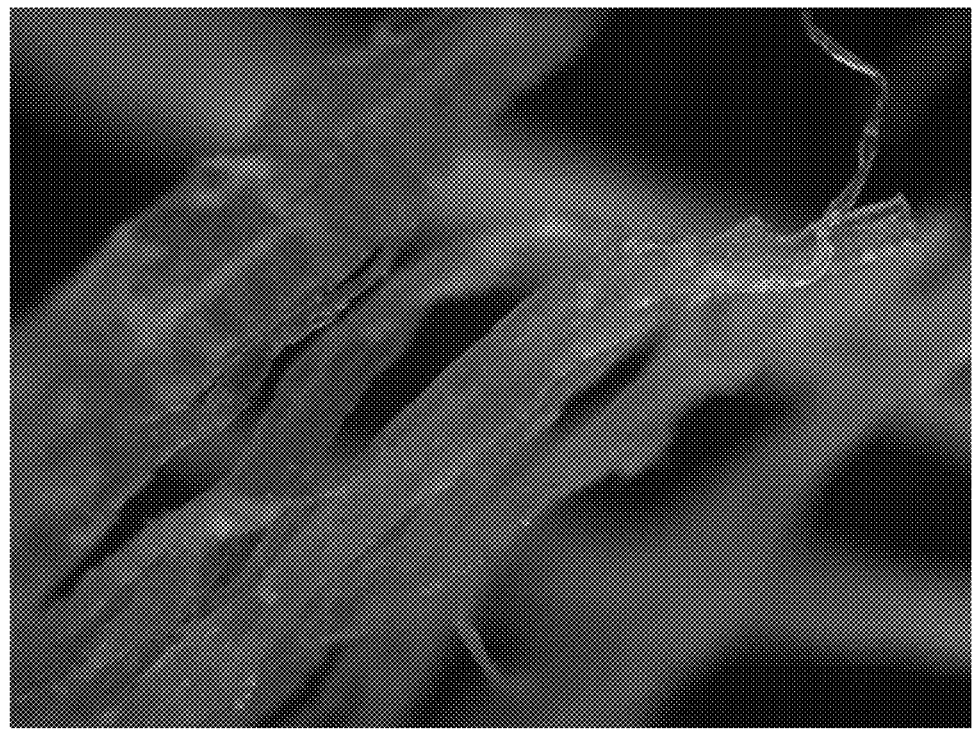
Figure 14P:
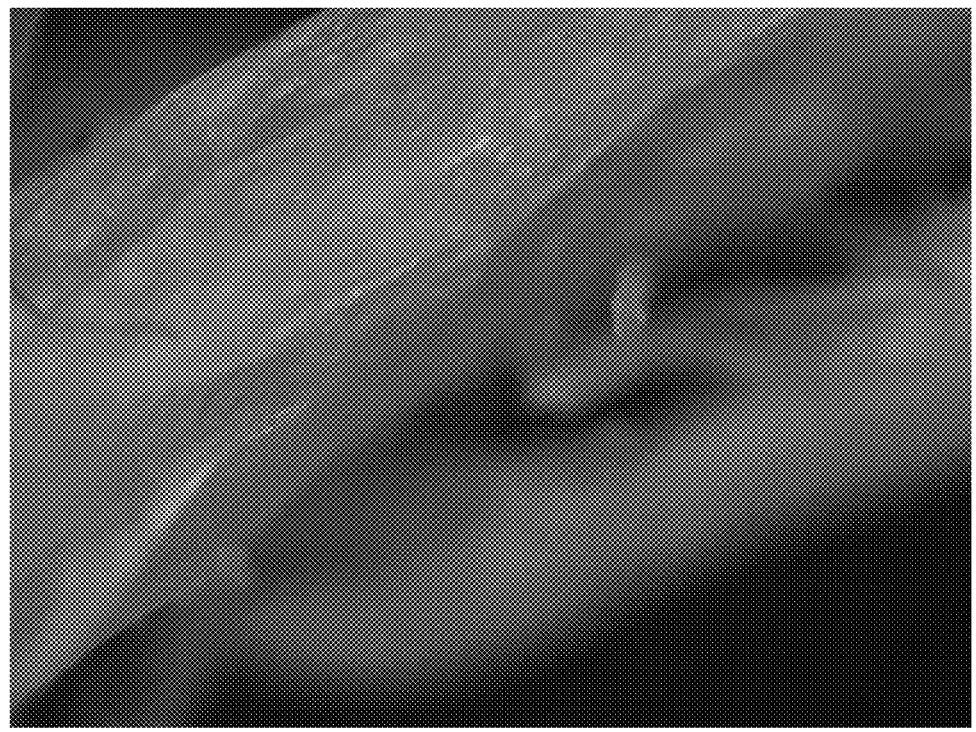
Figure 14Q:
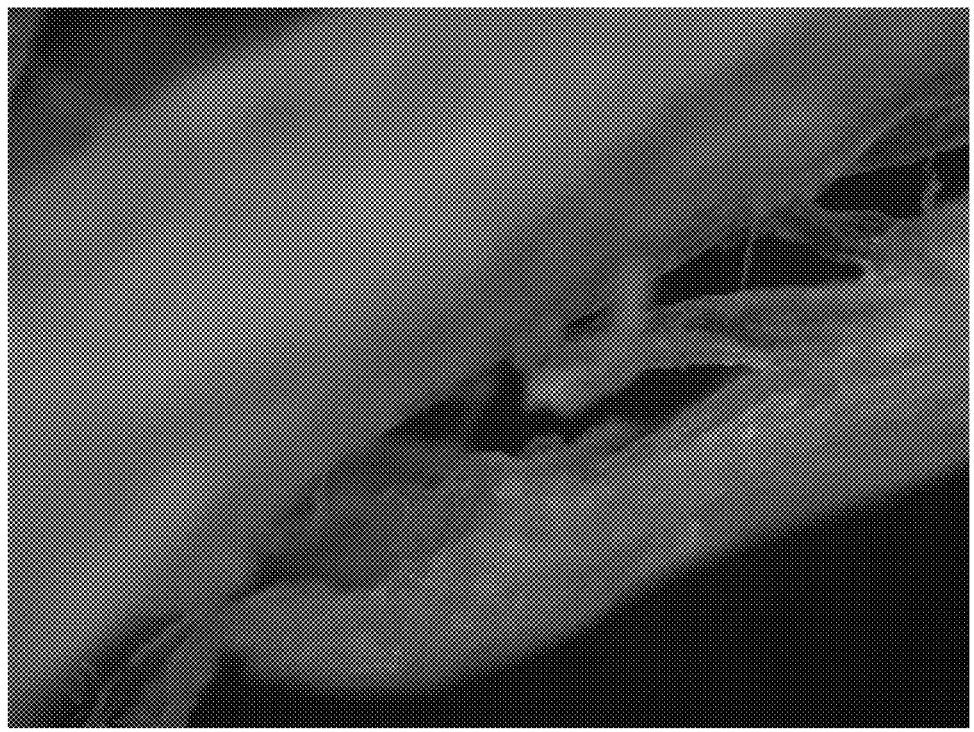
Figure 14R:
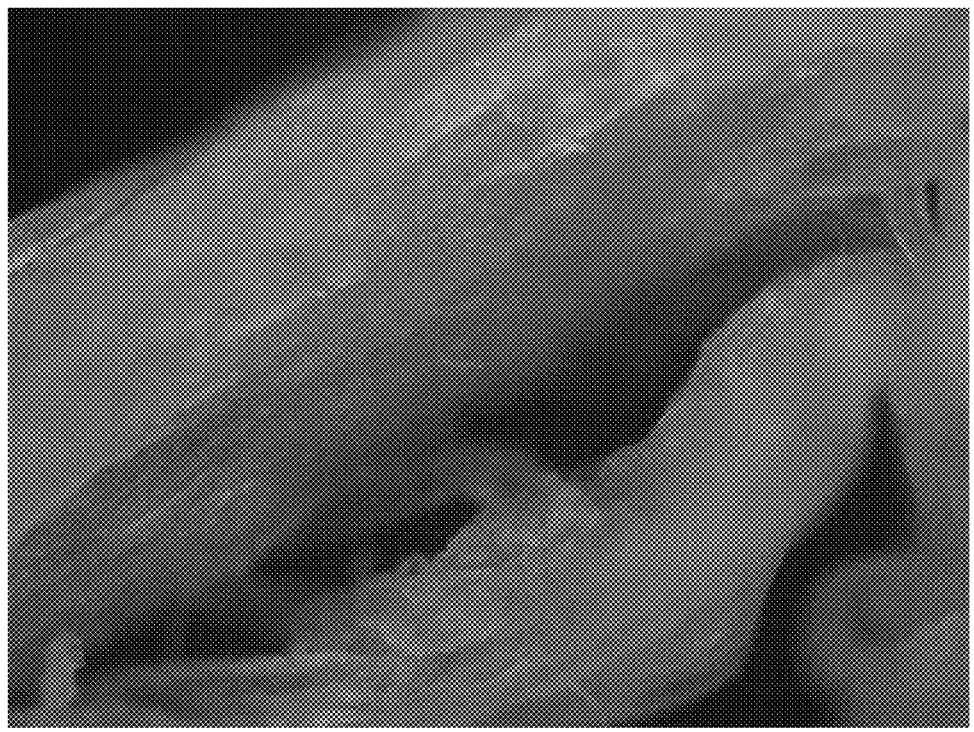
Figure 14S:
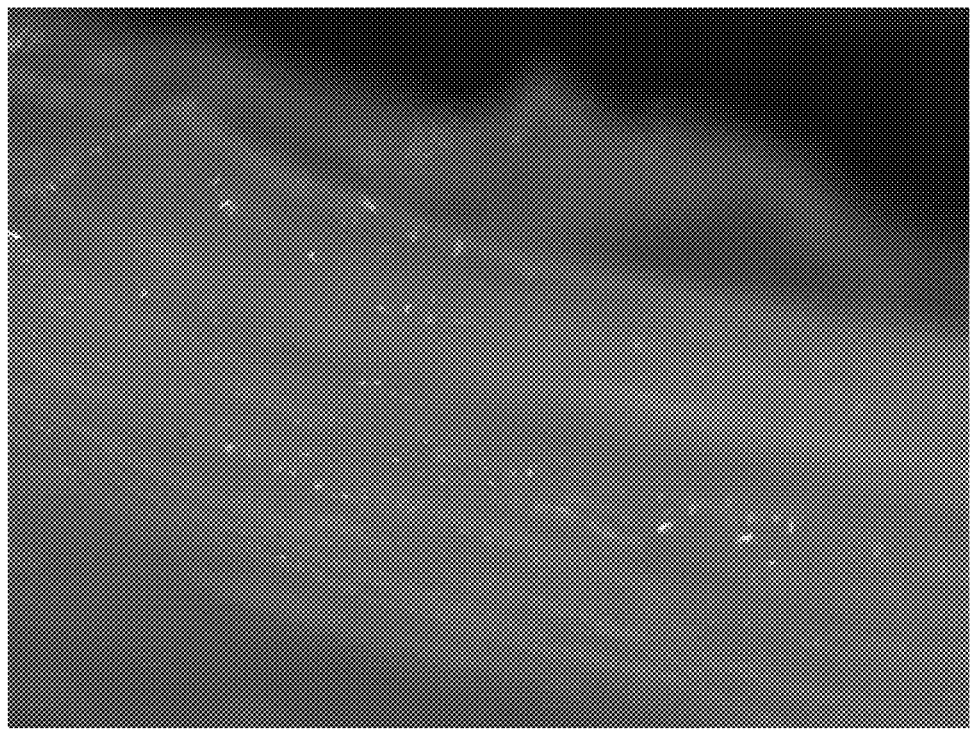
Figure 14T:
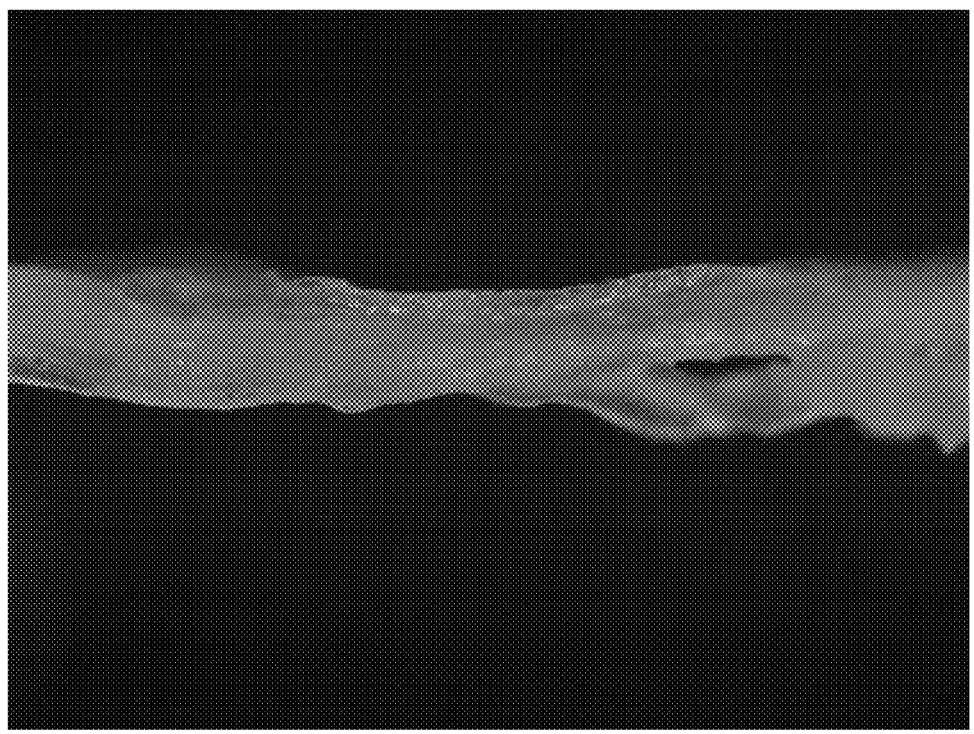
Figure 14U:
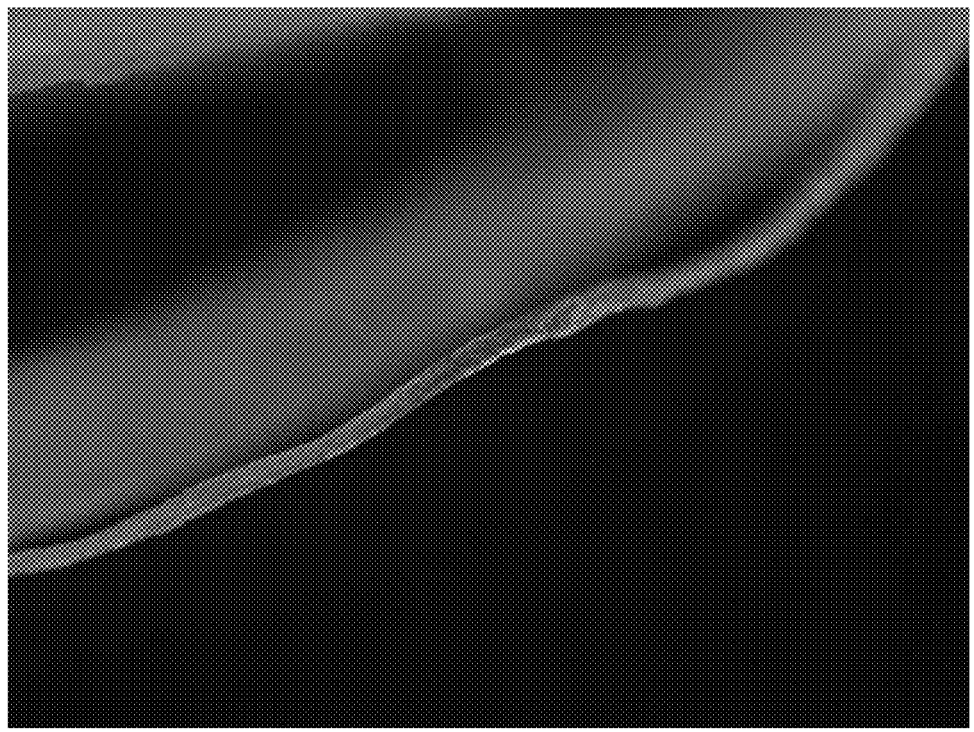
Figure 14V:
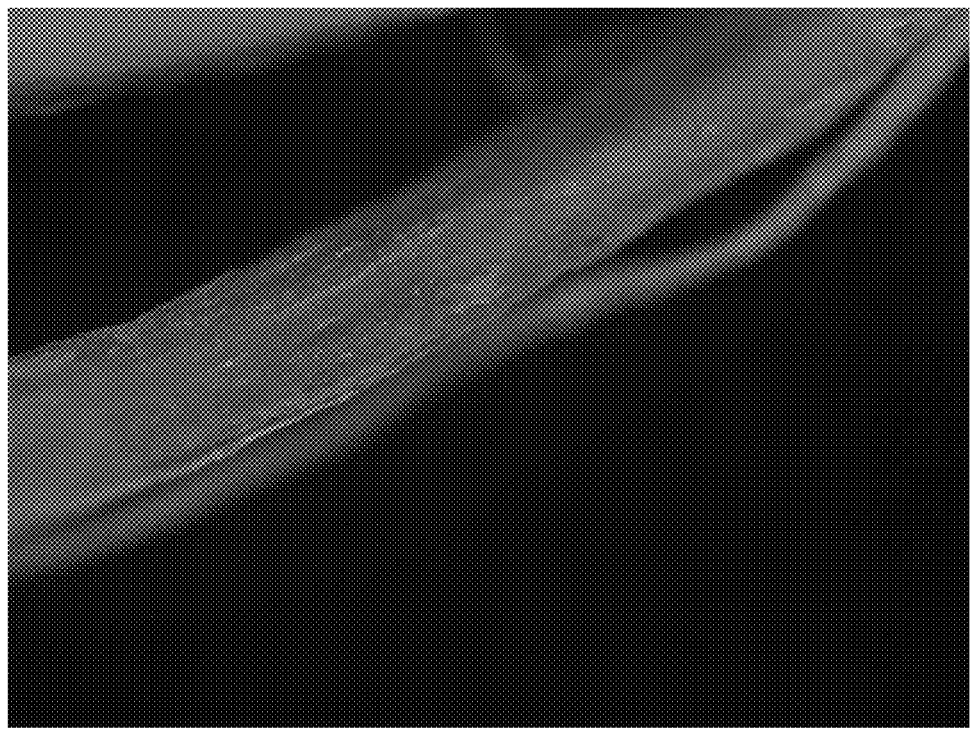
Figure 14W:
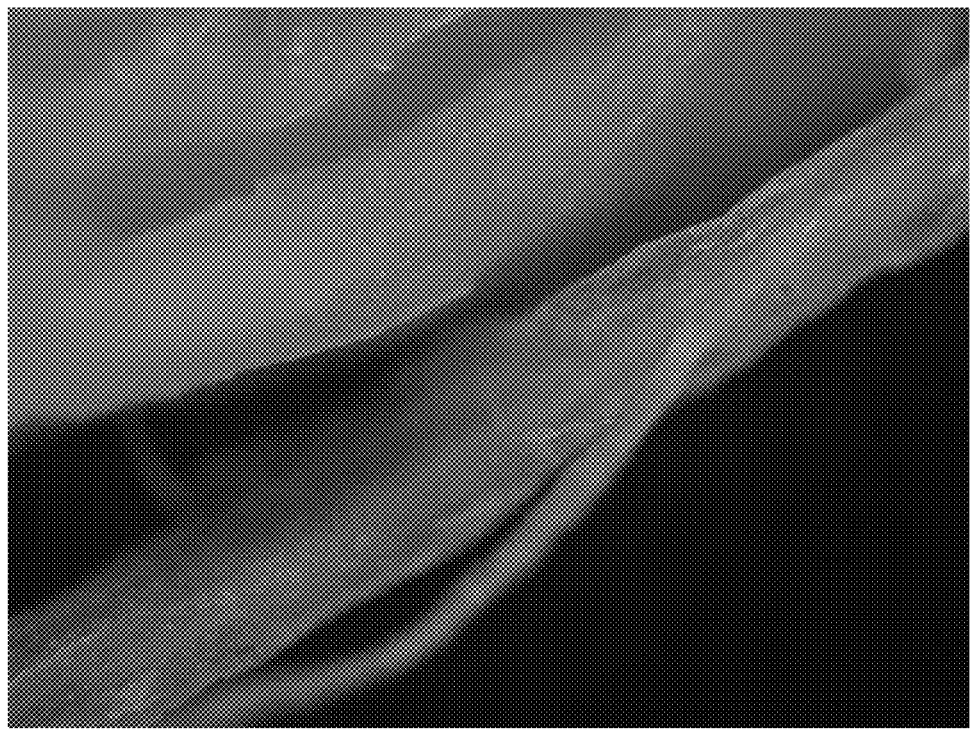
Figure 14X:
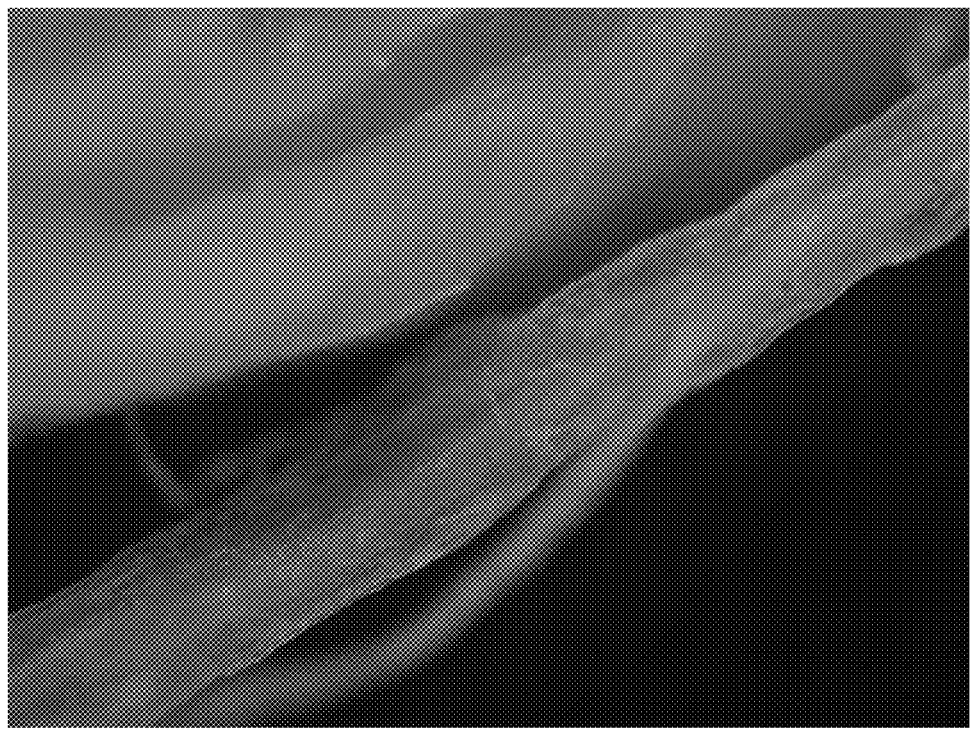
Figure 14Y:
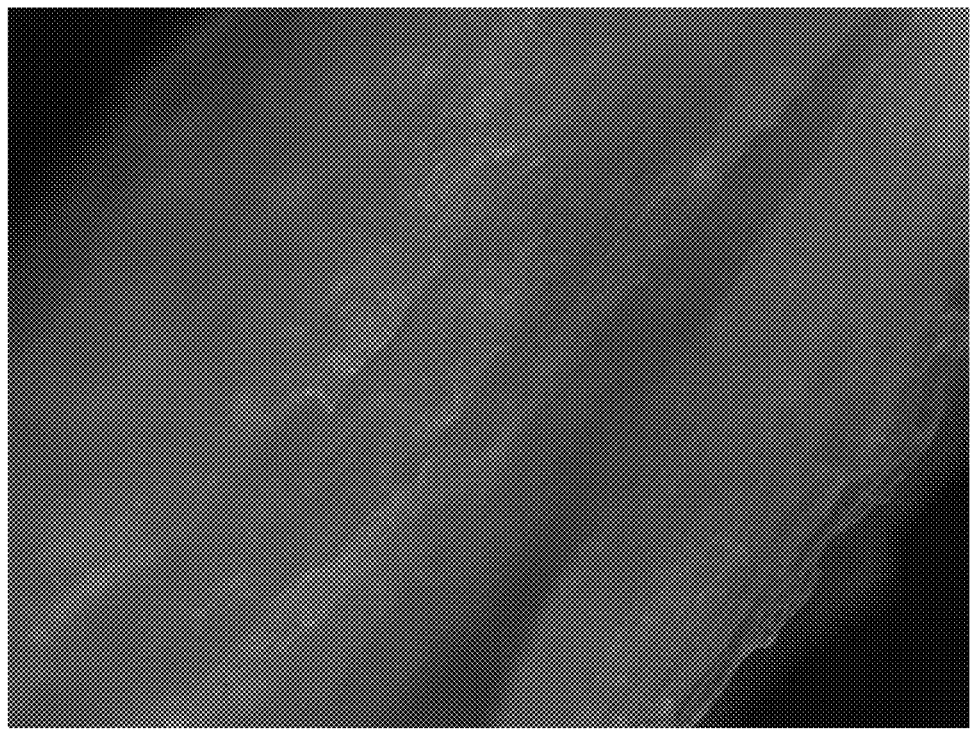
Figure 14Z:
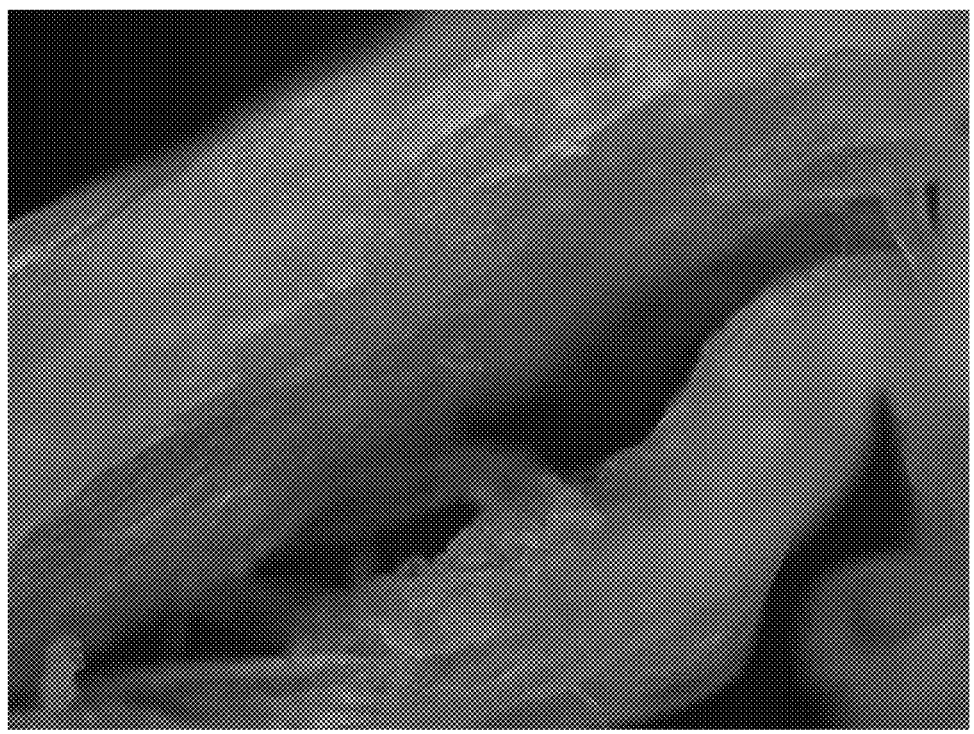
Figure 14A:
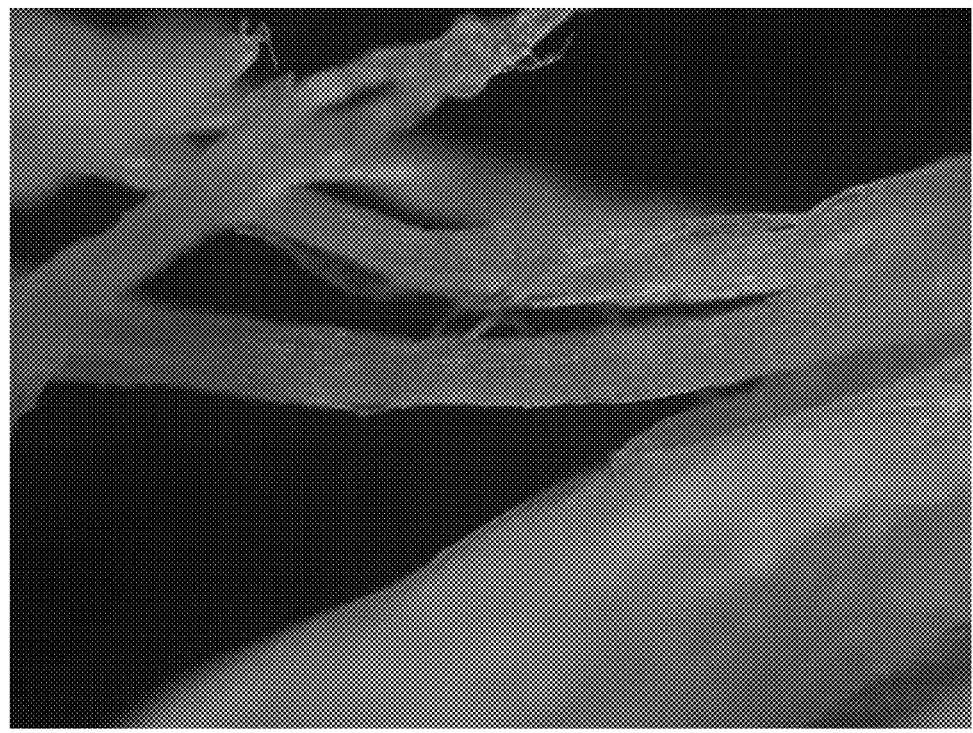
Figure 15A:
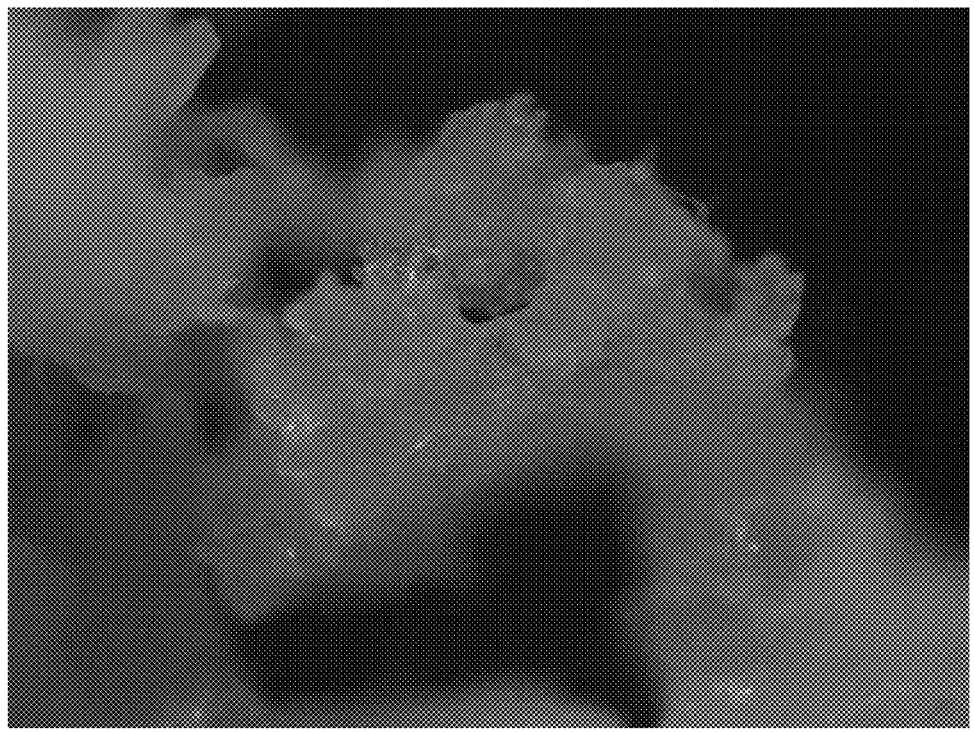
FIGS. 15A-15D depict example images of a product manufactured using pumpkin-derived SPIs. The images were captured using a 18 MP AmScope digital microscope camera and an optical microscope with a 4× lens.
Figure 15B:
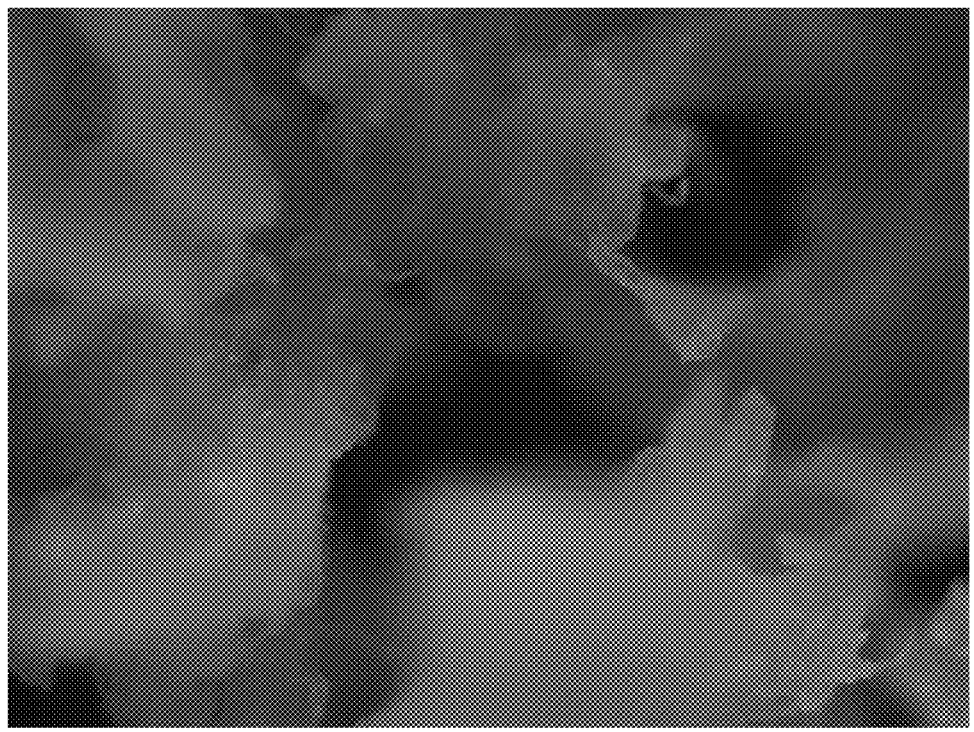
Figure 15C:
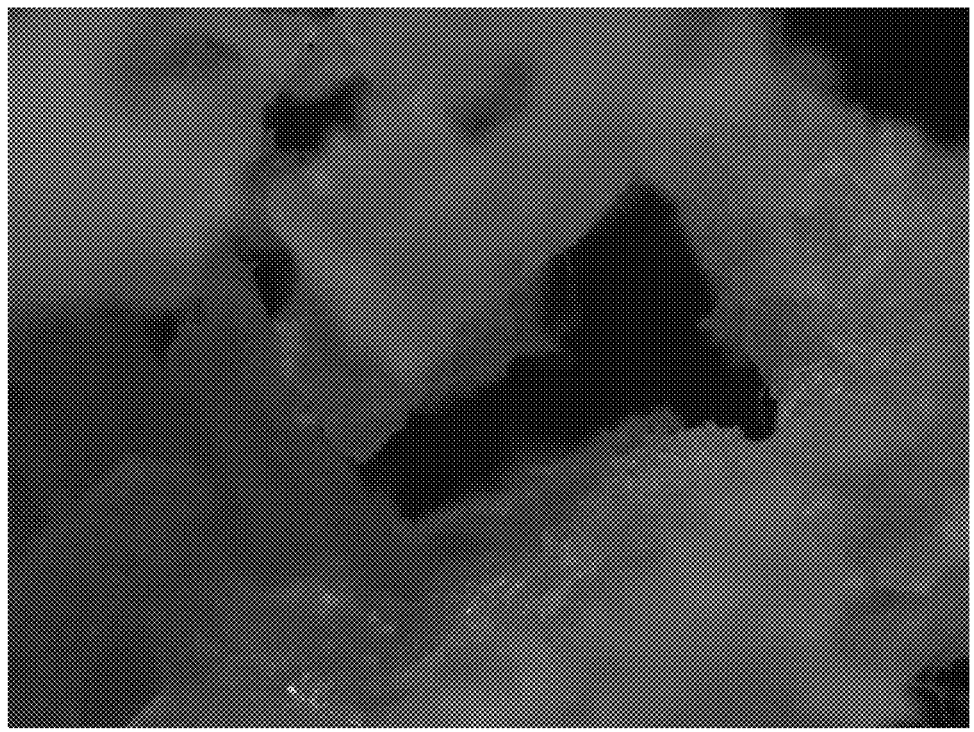
Figure 15D:
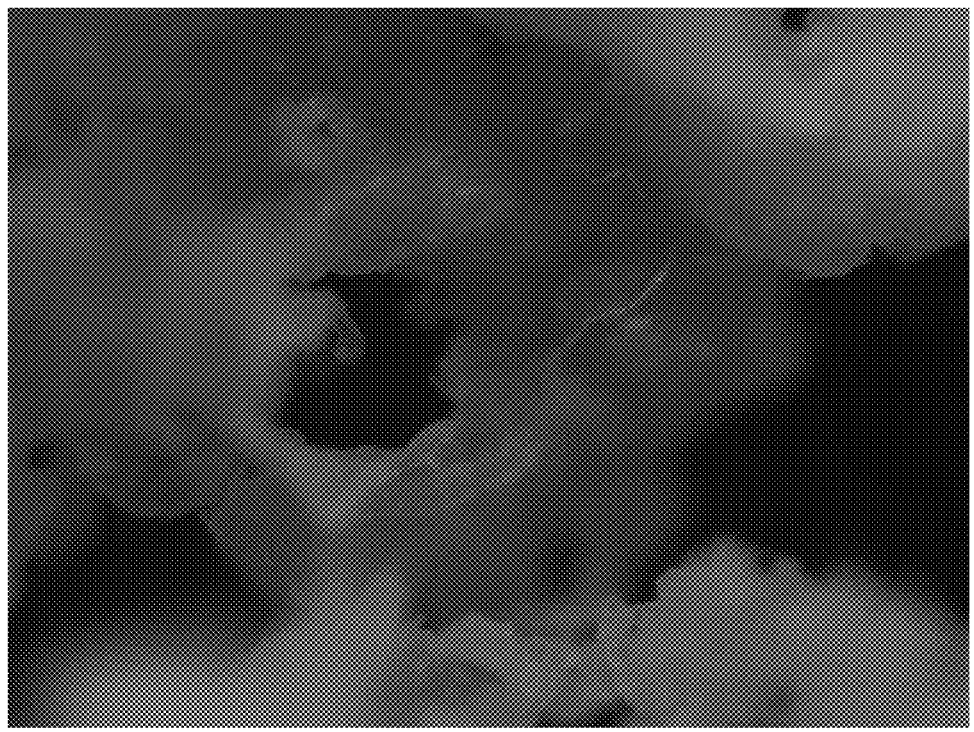
Figure 18:
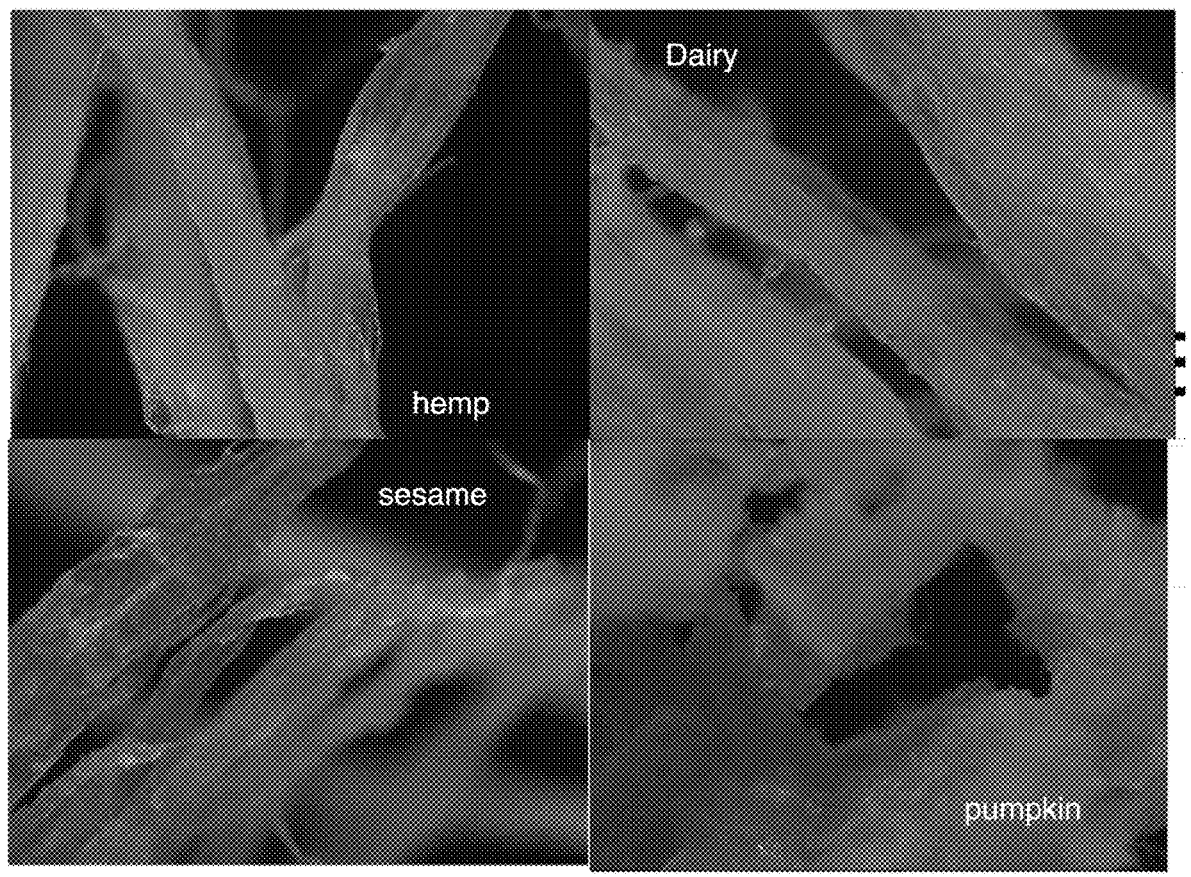
FIG. 18 depicts example images of products manufactured using SPIs compared to mozzarella.

Example images of stretched products (e.g., gels) manufactured using SPIs are shown in FIGS. 13A-13N, FIGS. 14A-14AA, FIGS. 15A-15D, and FIGS. 16A-16F. In variants, the plant-based product (e.g., vegan product, hemp-protein-based products, sesame-protein-based products, etc.) can have the same or similar structure as dairy products. Example images of stretched dairy products (e.g., target products) are shown in FIGS. 17A-17L. An example of a comparison between stretched products and a dairy product is shown in FIG. 18.

Figure 4:
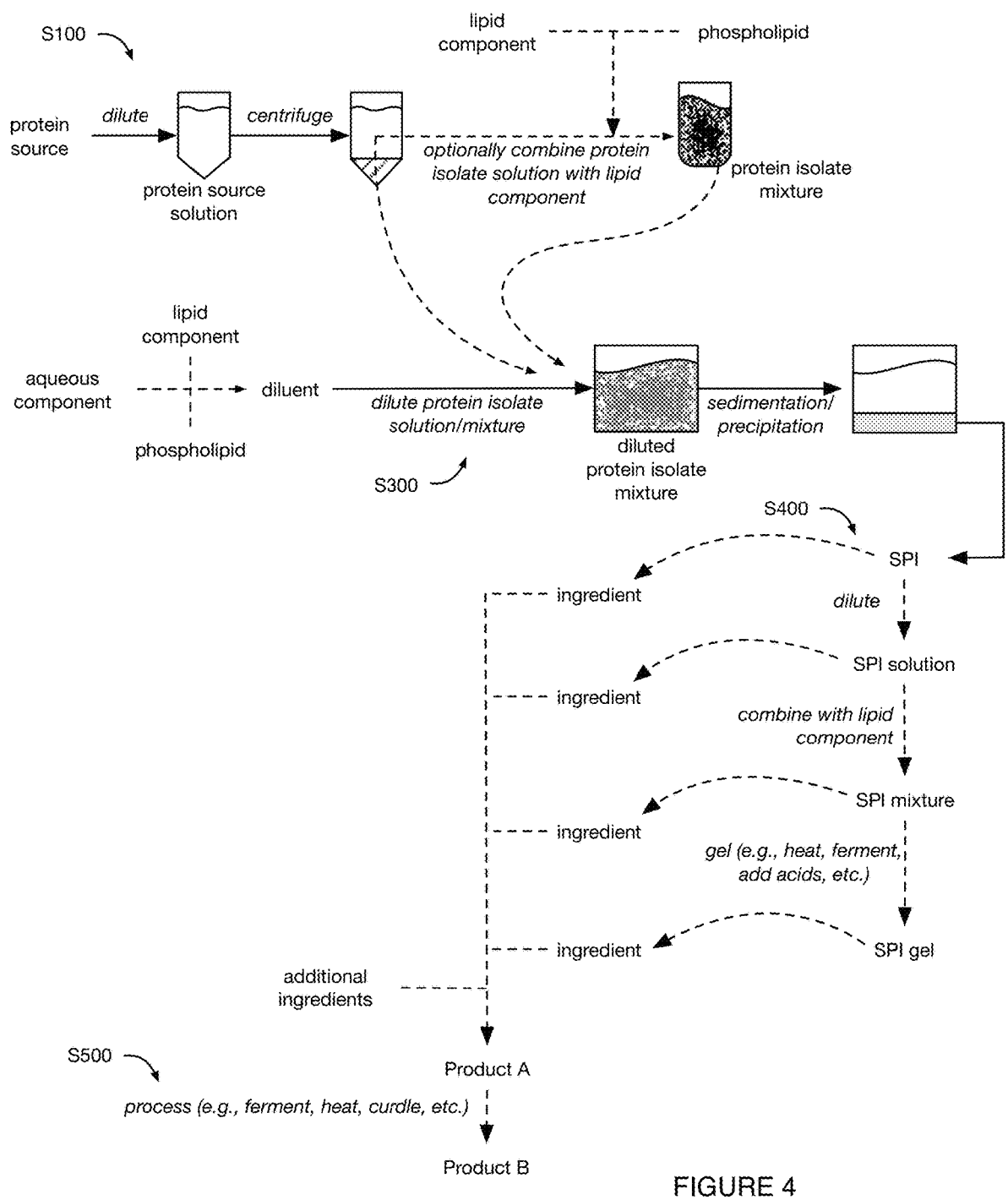
FIG. 4 depicts a third example of the method.

In a first variant, producing the product can include producing a mixture (e.g., a gel) including SPIs and a lipid component (e.g., the mixture is the product). For example, producing the product can include collecting SPIs (e.g., insoluble fraction) via S400; diluting the SPIs with an aqueous solution via S500 to form an SPI solution (e.g., an insoluble fraction solution); mixing (e.g., emulsifying) the SPI solution with a lipid component to form a mixture (e.g., an emulsion) via S500; optionally heating the mixture via S500; and optionally molding the heated mixture via S500. An example is shown in FIG. 4. The mixture (e.g., after heating and cooling) preferably forms a gel, wherein the gel can exhibit target characteristics after the initial heating, after reheating, and/or at any other time. In a specific example, the target temperature (e.g., target heating temperature and/or the target temperature of the mixture) for reheating can be between 30° C.-300° C. or any range or value therebetween (e.g., 200° C.), but can alternatively be less than 30° C. or greater than 300° C. The target time for reheating can be between 1 min-24 hrs (e.g., 5-20 min, greater than 10 min, etc.), but can alternatively be less than 1 min or greater than 24 hrs. Producing the product can optionally include adding microbial cultures (e.g., to the SPIs, to the SPI solution, to the mixture, etc.) and fermenting. Fermenting can be performed prior to heating the mixture, concurrently with heating the mixture (e.g., wherein heating the mixture includes fermenting the mixture), after heating the mixture, without heating the mixture (e.g., wherein fermenting the mixture can gel the mixture), and/or at any other time. Fermenting after heating the mixture can include inoculating the gelled mixture using a culture broth, wherein the microbial cultures in the broth can permeate the gel. However, fermenting can be otherwise performed. The resultant product can be stretchable at room temperature and/or when heated. The resultant product can melt at higher temperatures (e.g., 100° C., 200° C., etc.). The resultant product can retain stretch and melt characteristics despite repeated heat/cool cycles. However, the resultant product can have any other suitable set of characteristics.

In a second variant, producing the product includes using the SPIs as an ingredient in the product. The SPIs (e.g., SPI solution, a mixture including SPIs, etc.) can be combined with other ingredients (e.g., other proteins, carbohydrates, lipid components, any ingredient in S500, etc.), wherein the resulting mixture can be processed (e.g., via S500 methods, via other food manufacturing methods, etc.) to form the product.

In a third variant, producing the product includes manufacturing an ingredient including SPIs (e.g., wherein the ingredient is the product). In a first example, SPIs can be dried via S500, wherein the ingredient includes the dried SPIs. In a second example, SPIs undergo protein modifications, wherein the ingredient includes the modified SPIs. However, SPIs can be otherwise processed (e.g., using S500 methods) to produce an ingredient.

However, the product can be otherwise manufactured.

In a first variant, the product is a liquid mixture. For example, the product can be an emulsion of the lipid component and an SPI solution, wherein the emulsion can optionally be subsequently heated to induce product gelation and/or to induce stretch and/or melt characteristics in the product. In a first illustrative example, the liquid mixture can be poured and/or spread onto a food (e.g., pizza, bread, etc.), wherein subsequent heating (e.g., baking, broiling, grilling, etc.) causes the product to form a stretchy, melted cheese-like structure. In a second illustrative example, the liquid mixture can be a milk analog (e.g., a functional milk).

In a second variant, the product is a gel. For example, the product can be a mixture including SPIs that is heated and optionally cooled to form a cohesive gel. In this example, the SPIs can optionally form SPI aggregates. This gelation can optionally provide product stability (e.g., to enable transport, for use in food manufacture, etc.). The gel product can optionally be subsequently heated (e.g., via a second heating stage) to induce stretch and/or melt characteristics in the product. In another example, the product can be a cooled emulsion, wherein the emulsion is formed from a fat that is heated to or above the melting point before emulsification with the SPIs. In an illustrative example, this variant of the product can be cut, shaved, grated, shredded, otherwise comminuted, or used as a unitary block. Pieces of the product can be placed on a food (e.g., pizza, bread, etc.) and heated (e.g., baked, broiled, grilled, etc.), wherein subsequent heating (e.g., baking, broiling, grilling, etc.) causes the product to form a stretchy, melted cheese-like structure.

Figure 10A:
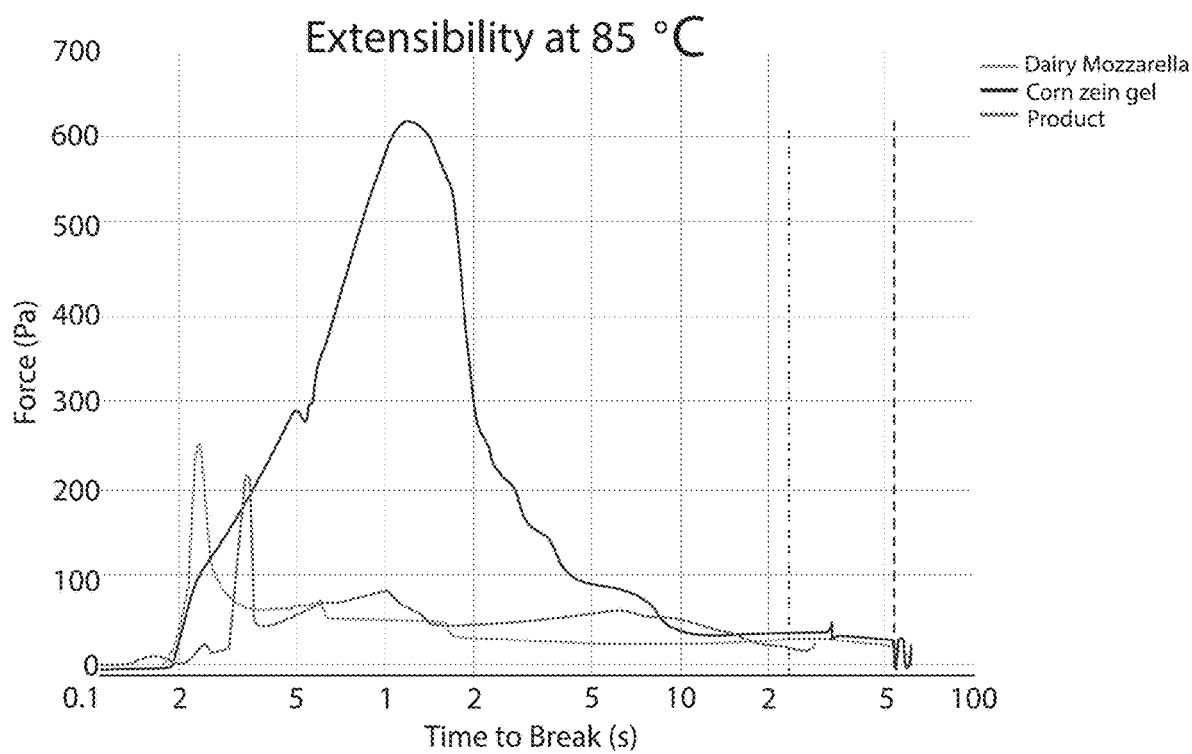
FIG. 10A depicts an example of force versus time data (e.g., from an extensibility probe) for the product, a dairy cheese, and a corn zein gel.
Figure 10B:
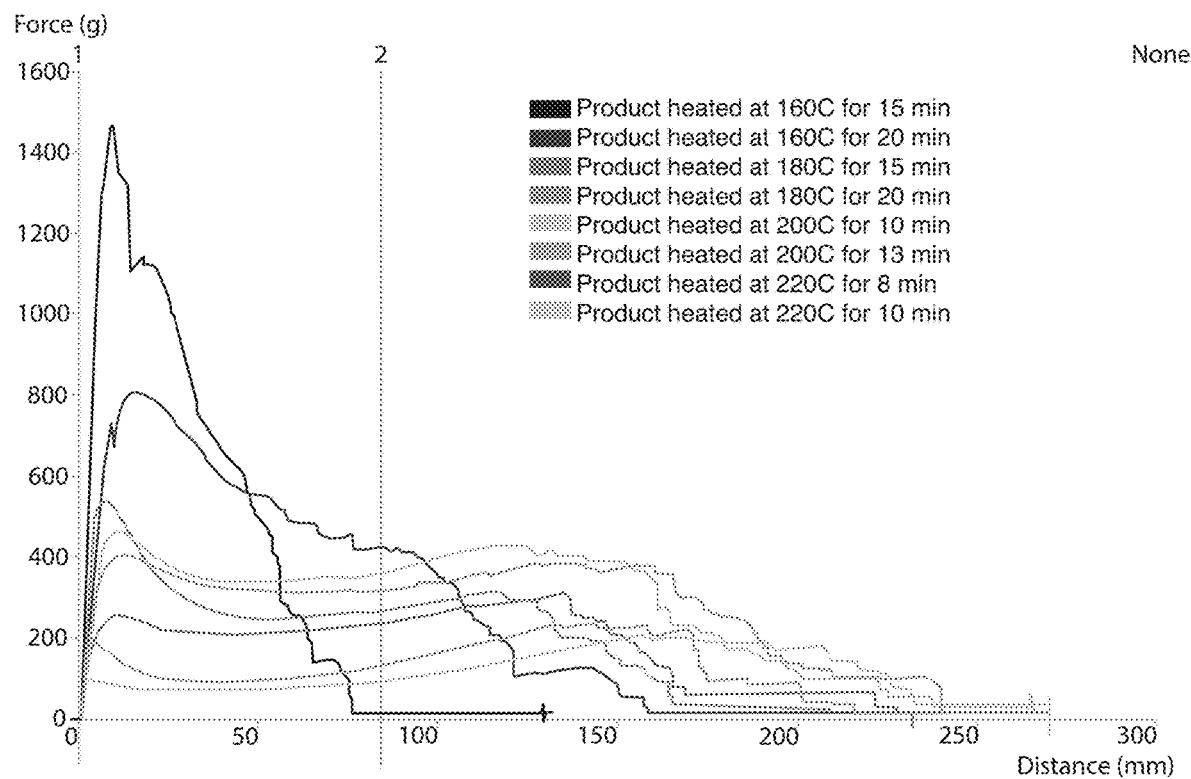
FIG. 10B depicts an example of force versus time data (e.g., from an extensibility probe) for products heated at different temperatures.

In a third variant, the product is a stretchy and/or melted product. For example, the product can be a mixture of the SPIs and the lipid component that is heated to form a stretchy gel and/or a melted product. Examples of a stretchy gel product are shown in FIG. 8A, FIG. 8B, FIG. 8C, and FIG. 22. Examples of extensibility data for stretchy gel products are shown in FIG. 10A and FIG. 10B. Examples of melted products are shown in FIG. 9A, FIG. 9B, FIG. 21, and FIG. 24. Examples of differential scanning calorimetry data for stretchy gel products are shown in FIG. 12. In a specific example, the product can be heated to and/or maintained at an internal temperature of 50° C.-300° C. (e.g., 70° C.-100° C., 85° C., 200° C., 250° C., etc.).

In a fourth variant, the product includes dried SPIs (e.g., dried using S500 methods). The dried SPIs can be in powdered form and/or any other form. The dried SPIs can be subsequently rehydrated, used as an ingredient in producing a product, and/or otherwise used.

The product can be implemented in a variety of food manufacture use cases. In a first embodiment, the product is used directly as a food product (e.g., the product is a final food product, the product is a primary basis for a final food product, etc.). In a first illustrative example, the product is a liquid product (e.g., emulsion and/or other mixture) that acts as a liquid dairy analog (e.g., a liquid mozzarella analog), wherein the liquid product can be subsequently heated to form a melted dairy analog (e.g., a melted mozzarella analog). In a second illustrative example, the product is a dairy analog that is stretchy at or near room temperature (e.g., a soft cheese analog). In a third illustrative example, the product is a cohesive gel (e.g., wherein the cohesive gel is not stretchy at room temperature, wherein the cohesive gel is stretchy at room temperature, etc.), wherein the cohesive gel stretches and/or melts when heated (e.g., wherein the product can be a cheese alternative for shredded, sliced, and/or block cheese). In a second embodiment, the product is used as a primary substrate in food manufacture. In a third embodiment, the product is used as an additive ingredient in food product manufacture, wherein the product functions to increase stretch and/or melt characteristics in the final food product. For example, a final food product can be manufactured using a mixture of the SPIs, other proteins, lipid components, microbes, and/or any other ingredients (e.g., wherein fermentation can optionally be performed at any time during the food manufacture process). However, the product can be otherwise used.

In a first example, the product (e.g., Product A; 15% total protein by weight, and 35% lipid by weight) includes an emulsion containing: a lipid component and an SPI mixture, wherein the SPI mixture is an insoluble fraction of a protein isolate solution, collected using dilution and sedimentation/precipitation, and, in variants, without denaturing all or most of the extracted protein. In a second example, the product (e.g., Product H; 18% total protein by weight, and 35% lipid by weight) includes an emulsion containing: a lipid component and an SPI mixture, wherein the SPI mixture is an insoluble fraction of a protein isolate solution, collected using dilution and sedimentation/precipitation, and, in variants, without denaturing all or most of the extracted protein. In specific examples, the insoluble fraction is extracted from a hemp protein isolate solution (e.g., for Product A and Product H; wherein the SPIs contain aggregates of hemp protein isolates), a sesame protein isolate solution, a pumpkin protein isolate solution, a combination thereof, and/or any other protein isolate solution.

In a third example, the product (e.g., Product B; 15% total protein by weight) includes a solution containing: an SPI mixture, wherein the SPI mixture is an insoluble fraction of a protein isolate solution, collected using dilution and sedimentation/precipitation, and, in variants, without denaturing all or most of the extracted protein. In a fourth example, the product (e.g., Product I; 15% total protein by weight) includes a solution containing: an SPI mixture, wherein the SPI mixture is an insoluble fraction of a protein isolate solution, collected using dilution and sedimentation/precipitation, and, in variants, without denaturing all or most of the extracted protein. In a fifth example, the product (e.g., Product M) includes a solution containing: an SPI mixture (8% by weight), wherein the SPI mixture is an insoluble fraction of a protein isolate solution, collected using dilution and sedimentation/precipitation, and, in variants, without denaturing all or most of the extracted protein. In specific examples, the insoluble fraction is extracted from a hemp protein isolate solution (e.g., for Product B, Product I, and Product M), a sesame protein isolate solution, a pumpkin protein isolate solution, a combination thereof, and/or any other protein isolate solution.

In a sixth example, the product (e.g., Product C; 15% total protein by weight, and 35% lipid by weight) includes an emulsion containing: a lipid component and an IPI mixture, wherein the IPI mixture is an insoluble fraction (e.g., precipitate) of a protein isolate solution, collected using isoelectric precipitation, and, in variants, without denaturing all or most of the extracted protein. In a seventh example, the product (e.g., Product J; 18% total protein by weight, and 35% lipid by weight) includes an emulsion containing: a lipid component and an IPI mixture, wherein the IPI mixture is an insoluble fraction (e.g., precipitate) of a protein isolate solution, collected using isoelectric precipitation, and, in variants, without denaturing all or most of the extracted protein. In specific examples, the insoluble fraction is extracted from a hemp protein isolate solution, a sesame protein isolate solution, a pumpkin protein isolate solution, a combination thereof, and/or any other protein isolate solution.

In an eighth example, the product (e.g., Product D; 15% total protein by weight) includes a solution containing: an IPI mixture, wherein the IPI mixture is an insoluble fraction (e.g., precipitate) of a protein isolate solution, collected using isoelectric precipitation, and, in variants, without denaturing all or most of the extracted protein. In a ninth example, the product (e.g., Product K; 18% total protein by weight) includes a solution containing: an IPI mixture, wherein the IPI mixture is an insoluble fraction (e.g., precipitate) of a protein isolate solution, collected using isoelectric precipitation, and, in variants, without denaturing all or most of the extracted protein. In a tenth example, the product (e.g., Product 0) includes a solution containing: an IPI mixture (8% by weight), wherein the IPI mixture is an insoluble fraction (e.g., precipitate) of a protein isolate solution, collected using isoelectric precipitation, and, in variants, without denaturing all or most of the extracted protein. In specific examples, the insoluble fraction is extracted from a hemp protein isolate solution (e.g., for Product D, Product K, and Product 0), a sesame protein isolate solution, a pumpkin protein isolate solution, a combination thereof, and/or any other protein isolate solution.

In an eleventh example, the product (e.g., Product E; 15% total protein by weight, and 35% lipid by weight) includes an emulsion containing: a lipid component and an ASP mixture, wherein the ASP mixture is an insoluble fraction of a protein isolate solution, collected using anti-solvent precipitation, and, in variants, without denaturing all or most of the extracted protein. In specific examples, the insoluble fraction is extracted from a hemp protein isolate solution (e.g., for Product E), a sesame protein isolate solution, a pumpkin protein isolate solution, a combination thereof, and/or any other protein isolate solution.

In a twelfth example, the product (e.g., Product F; 15% total protein by weight) includes a solution containing: an ASP mixture, wherein the ASP mixture is an insoluble fraction of a protein isolate solution, collected using anti-solvent precipitation, and, in variants, without denaturing all or most of the extracted protein. In a thirteenth example, the product (e.g., Product N) includes a solution containing: an ASP mixture (8% by weight), wherein the ASP mixture is an insoluble fraction of a protein isolate solution, collected using anti-solvent precipitation, and, in variants, without denaturing all or most of the extracted protein. In specific examples, the insoluble fraction is extracted from a hemp protein isolate solution (e.g., for Product F and Product N), a sesame protein isolate solution, a pumpkin protein isolate solution, a combination thereof, and/or any other protein isolate solution.

In a fourteenth example, the product (e.g., Product G; 15% total protein by weight, and 35% lipid by weight) includes an emulsion containing: a lipid component and hemp powder. In a twelfth example, the product (e.g., Product L; 18% total protein by weight, and 35% lipid by weight) includes an emulsion containing: a lipid component and hemp powder.

In a first specific example, the method includes: obtaining a protein isolate solution (e.g., containing protein isolate units) from a protein source (e.g., plant, microbial, algal, fungal, seaweeds or other non-dairy/non-animal matters); using the protein isolate solution, preparing/creating structured protein isolates via precipitation/separation/sedimentation, etc., (i.e. by diluting soluble protein with aqueous or non-aqueous solvent i.e. water, an antisolvent, and/or any other diluent; isoelectric precipitation, heat or shear induced precipitation, etc.); fractionation of structured protein isolates from solution (e.g., filtration, centrifugation, dialysis, drying, etc.); and collecting structured protein isolates (e.g., aggregates of structured protein isolates) as an ingredient. In a second specific example, the method includes: obtaining a protein isolate solution from a protein sources; mixing (e.g., emulsifying) the protein isolate solution with a lipid component with a different protein: lipid ratios (i.g. 0-50% protein: 0-40% lipid, etc.) to form a lipid-protein isolate mixture (i.g. oil-water emulsion); precipitation/separation/sedimentation of lipid protein mixture by diluting with aqueous or non-aqueous solvent i.e. water, an antisolvent, and/or any other diluent; isoelectric precipitation, heat or shear induced precipitation, etc.; allowing fractionation of lipid protein isolates (e.g., structured protein isolates that include a lipid component) from solution (e.g., filtration, centrifugation, dialysis, drying, etc; and collecting lipid protein isolates as an ingredient. In a third specific example, the method includes: obtaining a protein isolate solution from a protein sources; diluting the protein isolate solution using a diluent containing an aqueous solution mixed (e.g., emulsified) with a lipid component; allowing fractionation of structured isolates from solution (e.g., filtration, centrifugation, dialysis, drying, etc); and collecting the structured isolates as an ingredient.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 2%, 5%, 10%, 15%, 20%, 30%, any range or value therein, of a reference).

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We Claim:

1. A composition comprising a protein mixture comprising structured protein isolates, each structured protein isolate comprising an aggregate of at least three protein isolate units, wherein the protein isolate units are obtained from a plant source comprising hemp, wherein at least 20% of protein isolate units in the protein mixture are arranged into the structured protein isolates, wherein the structured protein isolates are extracted from an insoluble fraction of a solution of protein isolates, wherein a pH of the solution of protein isolates is at least 8 during extraction of the structured protein isolates, wherein the composition is characterized by a distance to failure of at least 100 mm.

2. The composition of claim 1, further comprising a plant-derived lipid component.

3. The composition of claim 1, wherein the protein mixture is spray dried.

4. The composition of claim 1, wherein the structured protein isolates have an increased surface hydrophobicity relative to unaggregated protein isolate units.

5. The composition of claim 1, wherein a diameter of the structured protein isolates is at least 50 nm.

6. The composition of claim 1, wherein the plant source comprises a single plant source.

7. The composition of claim 1, wherein the distance to failure is determined by an extensibility assay procedure comprising: heating an about 30 g sample at about 200° C. for about 15 min; and stretching the sample at about 5.00 mm/sec at about 20° C.

8. The composition of claim 1, wherein the insoluble fraction is a sediment.

9. A composition comprising a protein component and a lipid component, the protein component comprising structured protein isolates, each structured protein isolate comprising an aggregate of at least three protein isolate units, wherein the protein isolate units are obtained from a plant source comprising hemp, wherein at least 90% of protein isolate units in the protein component are not denatured, wherein the structured protein isolates are extracted from a sediment of a solution of protein isolates, wherein a pH of the solution of protein isolates is at least 8 during extraction of the structured protein isolates, wherein the composition is characterized by a distance to failure of at least 100 mm.

10. The composition of claim 9, wherein the protein component excludes animal proteins.

11. The composition of claim 9, wherein the protein component excludes soy derivatives.

12. The composition of claim 9, wherein the composition comprises a fermented cheese replicate, wherein the composition further comprises a microbial culture, wherein the composition is fermented.

13. The composition of claim 9, wherein the composition comprises a fresh cheese replicate, wherein the composition is a gelled emulsion.

14. The composition of claim 9, wherein the composition is shreddable.

15. The composition of claim 9, wherein the composition is characterized by a change in area/mass from about 1 $cm^2/g$ to about 6 $cm^2/g$ as determined by a Schreiber Test (about 25 mm initial diameter; about 3.5 g initial mass; heated at about 230° C. for about 6 min).

16. The composition of claim 9, wherein the distance to failure is determined by an extensibility assay procedure comprising: heating an about 30 g sample at about 200° C. for about 15 min; and stretching the sample at about 5.00 mm/sec extension at about 20° C.

* * * * *